(12) United States Patent
Toyoda et al.

(10) Patent No.: US 8,936,894 B2
(45) Date of Patent: *Jan. 20, 2015

(54) MAGENTA TONER CONTAINING COMPOUND HAVING AZO SKELETON

(71) Applicant: Canon Kabushiki Kaisha, Tokyo (JP)

(72) Inventors: Takayuki Toyoda, Yokohama (JP); Yasuaki Murai, Kawasaki (JP); Waka Hasegawa, Kawasaki (JP); Yuki Hasegawa, Yokohama (JP); Masashi Kawamura, Yokohama (JP); Taiki Watanabe, Akishima (JP); Masanori Seki, Yokohama (JP); Chiaki Nishiura, Kawasaki (JP); Ayano Mashida, Kawasaki (JP); Masashi Hirose, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/777,764

(22) Filed: Feb. 26, 2013

(65) Prior Publication Data

US 2013/0224645 A1    Aug. 29, 2013

(30) Foreign Application Priority Data

Feb. 29, 2012   (JP) ................. 2012-043073

(51) Int. Cl.
  $G03G\ 9/09$   (2006.01)
  $G03G\ 9/08$   (2006.01)
  $G03G\ 9/087$  (2006.01)

(52) U.S. Cl.
  CPC .............. $G03G\ 9/08$ (2013.01); $G03G\ 9/08768$ (2013.01); $G03G\ 9/092$ (2013.01); $G03G\ 9/0924$ (2013.01)
  USPC ................. 430/108.22; 430/108.21

(58) Field of Classification Search
  CPC ... G03G 9/092; G03G 9/091; G03G 9/08751; G03G 9/08768
  USPC ....................... 430/108.21, 108.22
  See application file for complete search history.

(56) References Cited

U.S. PATENT DOCUMENTS

| | | | | |
|---|---|---|---|---|
| 6,117,605 | A * | 9/2000 | Chiba ................. | 430/108.21 |
| 8,377,616 | B2 * | 2/2013 | Tani et al. ............. | 430/108.23 |
| 2002/0102485 | A1 | 8/2002 | Abe | |
| 2005/0084785 | A1 * | 4/2005 | Nakamura et al. ....... | 430/108.21 |
| 2009/0239168 | A1 * | 9/2009 | Kouyama et al. ......... | 430/107.1 |
| 2013/0224644 | A1 * | 8/2013 | Hasegawa et al. ....... | 430/108.22 |
| 2013/0224646 | A1 * | 8/2013 | Murai et al. ........... | 430/108.22 |

FOREIGN PATENT DOCUMENTS

| | | |
|---|---|---|
| CN | 101359190 A | 2/2009 |
| JP | 2-210459 A | 8/1990 |
| JP | 11-231572 A | 8/1999 |
| JP | 2003-202697 A | 7/2003 |
| JP | 2006-030760 A | 2/2006 |
| JP | 2009-210701 A | 9/2009 |
| WO | WO-2012026378 A1 * | 3/2012 |

OTHER PUBLICATIONS

Diamond, Arthur S & David Weiss (eds.) Handbook of Imaging Materials, 2nd ed.. New York: Marcel-Dekker, Inc. (Nov. 2001) pp. 173-191.*

* cited by examiner

*Primary Examiner* — Christopher Rodee
(74) *Attorney, Agent, or Firm* — Canon U.S.A. Inc., IP Division

(57) ABSTRACT

A toner comprising toner particles, each of which contains a binder resin, a compound in which a polymer portion is bound to an azo skeleton structure, and a magenta pigment. The azo skeleton structure and a monomer unit of the polymer portion are represented by the following formulas (1) and (2), respectively:

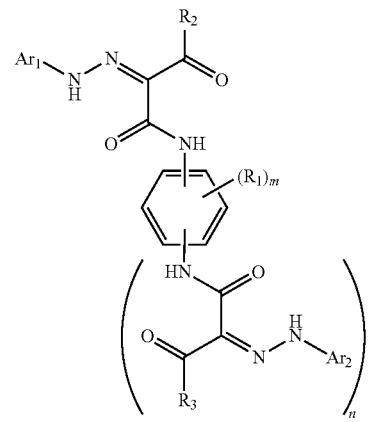

FORMULA (1)

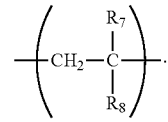

FORMULA (2)

10 Claims, 4 Drawing Sheets

MAGENTA TONER CONTAINING COMPOUND HAVING AZO SKELETON

BACKGROUND OF THE INVENTION

1. Field of the Invention

The present invention relates to a magenta toner for use in electrophotography, electrostatic recording, electrostatic printing, or toner jet recording, the magenta toner containing a compound having an azo skeleton as a dispersant.

2. Description of the Related Arts

Magenta pigments typically used as colorants for magenta toners are difficult to disperse due to small pigment particle size. If the pigment is not sufficiently dispersed in the toner particles, the coloring power of the toner particles is degraded. This has also led to other problems such as significant fluctuation in charging properties due to environmental changes such as changes in temperature and humidity and a high incidence of "fogging", that is, development of the toner on background portions of images.

Japanese Patent Laid-Open No. 2006-30760 discloses a technique for dispersing a pigment in a toner. According to this technique, a particular polymer dispersant is used in combination with a magenta pigment to enhance the dispersibility of the magenta pigment and improve the coloring property and charging property of the toner. Japanese Patent Laid-Open No. 11-231572 discloses a method for satisfactorily dispersing a coloring material in a toner by use of a pigment derivative and a polymer dispersant. Japanese Patent Laid-Open No. 2003-202697 discloses a pigment dispersant in which a quinacridone is covalently bonded to a polymer.

Japanese Patent Laid-Open No. 2-210459 proposes a method that uses a diketopyrrolopyrrole-based pigment instead of a quinacridone pigment in order to improve the charging stability of the magenta toner and suppress fogging.

SUMMARY OF THE INVENTION

The polymer dispersant disclosed in Japanese Patent Laid-Open No. 2006-30760 generally has poor compatibility with hydrophobic binder resins (such as polystyrene) and has a problem in that the pigment is not sufficiently dispersed.

The method that uses the pigment derivative and the polymer dispersant disclosed in Japanese Patent Laid-Open No. 11-231572 results in formation of a highly polar salt on a pigment surface because the pigment is dispersed by acid-base interaction. Thus, when a toner is produced in water, the pigment localizes on the toner surfaces and causes dispersion failure. This results in instable charging, which has been a problem.

The method that uses a dispersant in which a quinacridone is covalently bonded to a polymer disclosed in Japanese Patent Laid-Open No. 2003-202697 needs further improvements since the recent requirements for higher image quality are not sufficiently met although a certain dispersing effect is exhibited for quinacridone pigments.

According to the method disclosed in Japanese Patent Laid-Open No. 2-210459, the dispersibility of the diketopyrrolopyrrole-based pigment in the toner is still insufficient and fogging on images has not been satisfactorily prevented.

The present invention provides a magenta toner having high coloring power in which the dispersibility of a magenta pigment in the binder resin is improved. A magenta toner that suppresses fogging and offers high transfer efficiency is also provided. A magenta toner comprising toner particles, each of which includes a binder resin, a compound and a magenta pigment, the compound has a structure, a polymer portion of which has a monomer unit represented by formula (2) and is bound to a structure represented by formula (1);

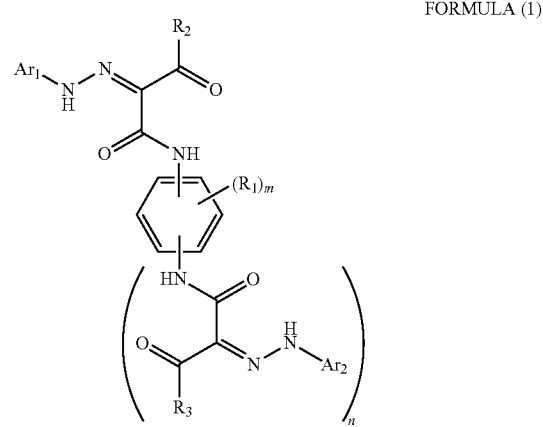

FORMULA (1)

where, in formula (1), at least one of $R_2$, $R_3$, $Ar_1$, and $Ar_2$ is bound to the polymer portion directly or through a linking group, wherein each $R_1$ independently represents a hydrogen atom, a halogen atom, an alkyl group, an alkoxy group, a trifluoromethyl group, a cyano group, or a hydroxyl group; $R_2$ and $R_3$ not bound to the polymer portion independently represent a monovalent group selected from the group consisting of an alkyl group, a phenyl group, an $OR_4$ group, and an $NR_5R_6$ group; $R_4$ to $R_6$ independently represent a hydrogen atom, an alkyl group, a phenyl group, or an aralkyl group; $Ar_1$ and $Ar_2$ not bound to the polymer portion independently represent an aryl group; wherein any one of $R_2$ and $R_3$ bound to the polymer portion independently represents a divalent group, a hydrogen atom of which is removed from the corresponding monovalent group of any one of $R_2$ and $R_3$; any one of $Ar_1$ and $Ar_2$ bound to the polymer portion independently represents a divalent group, a hydrogen atom of which is removed from the corresponding aryl group of any one of $Ar_1$ and $Ar_2$; m represents an integer of 3 or 4; n represents an integer of 1 or 2; and n+m=5,

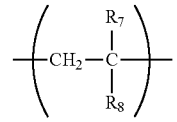

FORMULA (2)

where, in formula (2), $R_7$ represents a hydrogen atom or an alkyl group; and $R_8$ represents a phenyl group, a carboxyl group, a carboxylic acid ester group, or a carboxylic acid amide group.

Further features of the present invention will become apparent from the following description of exemplary embodiments (with reference to the attached drawings).

DESCRIPTION OF THE EMBODIMENTS

Figure 1:
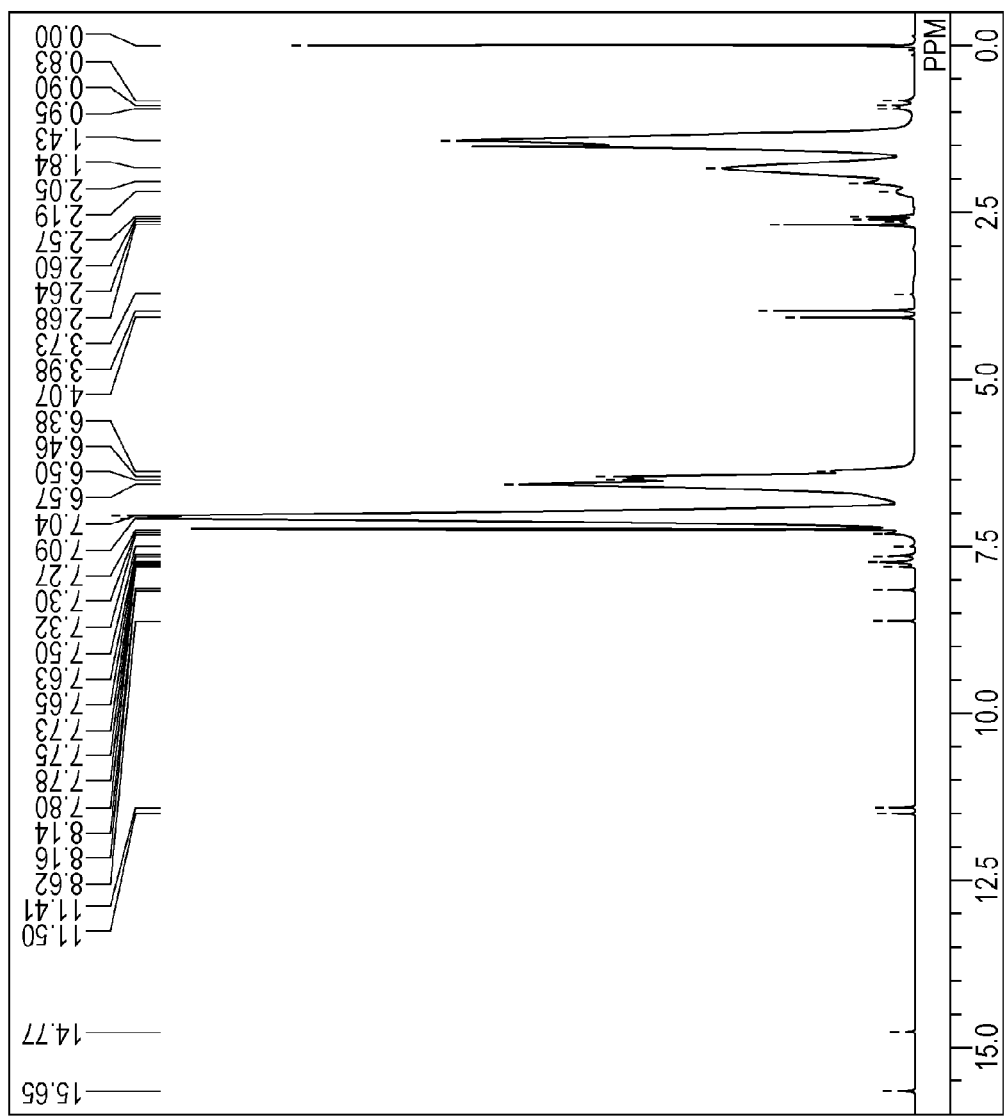
FIG. 1 is a graph showing a $^1$H NMR spectrum of a compound (116) having an azo skeleton in $CDCl_3$ at room temperature at 400 MHz.

The present invention will now be described in detail through embodiments.

A toner according to the present invention comprises toner particles, each of which includes a magenta pigment, a binder resin, and a compound having a structure, a polymer portion of which has a monomer unit represented by formula (2) and is bound to a structure represented by formula (1) directly or through a linking group,

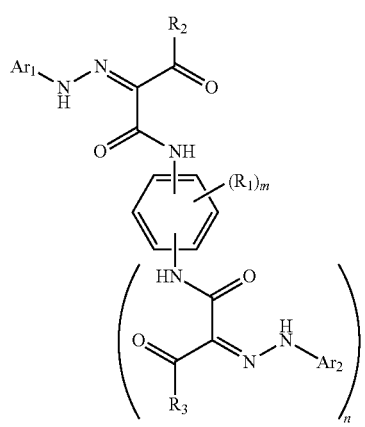

FORMULA (1)

[In formula (1), at least one of $R_2$, $R_3$, $Ar_1$, and $Ar_2$ is bound to the polymer portion directly or through a linking group, wherein each $R_1$ independently represents a hydrogen atom, a halogen atom, an alkyl group, an alkoxy group, a trifluoromethyl group, a cyano group, or a hydroxyl group; $R_2$ and $R_3$ not bound to the polymer portion independently represent a monovalent group selected from the group consisting of an alkyl group, a phenyl group, an $OR_4$ group, and an $NR_5R_6$ group; $R_4$ to $R_6$ independently represent a hydrogen atom, an alkyl group, a phenyl group, or an aralkyl group; $Ar_1$ and $Ar_2$ independently represent an aryl group; wherein any one of $R_2$ and $R_3$ bound to the polymer portion independently represents a divalent group, a hydrogen atom of which is removed from the corresponding monovalent group of any one of $R_2$ and $R_3$; any one of $Ar_1$ and $Ar_2$ bound to the polymer portion independently represents a divalent group, a hydrogen atom of which is removed from the corresponding aryl group of any one of $Ar_1$ and $Ar_2$; m represents an integer of 3 or 4; n represents an integer of 1 or 2; and n+m=5]

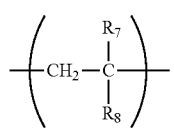

FORMULA (2)

[In formula (2), $R_7$ represents a hydrogen atom or an alkyl group; and $R_8$ represents a phenyl group, a carboxyl group, a carboxylic acid ester group, or a carboxylic acid amide group].

The present invention provides a magenta toner that contains, as a dispersant, a compound in which a structure represented by formula (1) is linked to a polymer portion having a monomer unit represented by formula (2). This compound has affinity to water-insoluble solvents, polymerizable monomers, and binder resins for toners and high affinity to magenta pigments. Thus, when this compound is used as a pigment dispersant, the magenta pigment is satisfactorily dispersed in the binder resin and a magenta toner having high coloring power is provided. Moreover, addition of the compound to the magenta toner suppresses fogging and a magenta toner that offers high transfer efficiency is provided.

The structure represented by formula (1) may also be referred to as "azo skeleton structure". The compound in which the azo skeleton structure is bonded to a polymer portion having a monomer unit represented by formula (2) may also be referred to as "compound having an azo skeleton structure". The polymer portion having a monomer unit represented by formula (2) not bonded to the azo skeleton structure may be simply referred to as "polymer portion".

The present invention will now be described in detail.

First, the structure of the compound having an azo skeleton structure is described. The compound having an azo skeleton structure is constituted by an azo skeleton structure represented by formula (1) above having high affinity to magenta pigments and a polymer portion having a monomer unit represented by formula (2) above having high affinity to water-insoluble solvents.

The azo skeleton structure is first described in detail.

Examples of the halogen atom for $R_1$ in formula (1) above include a fluorine atom, a chlorine atom, a bromine atom, and an iodine atom.

Examples of the alkyl group for $R_1$ in formula (1) above include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

Examples of the alkoxy group for $R_1$ in formula (1) include linear or branched alkoxy groups such as a methoxy group, an ethoxy group, an n-propoxy group, an n-butoxy group, and an isopropoxy group.

$R_1$ in formula (1) can be freely selected from the above-listed substituents, a trifluoromethyl group, a cyano group, a hydroxyl group, and a hydrogen atom but is preferably a hydrogen atom in view of affinity to the magenta pigment.

Examples of the substitution positions of the acylacetamide groups in formula (1) when m is 4 and n is 1 include cases where the acylacetamide groups are ortho, meta, or para to each other. The affinity to the magenta pigment is the same irrespective of whether the positions are ortho, meta, or para. When m is 3 and n is 2, the acylacetamide groups may be substituted in the 1, 2, and 3 positions, 1, 2, and 4 positions, or 1, 3, and 5 positions, for example. The affinity to the magenta pigment is also the same irrespective of whether the acylacetamide groups are substituted in the 1, 2, and 3 positions, 1, 2, and 4 positions, or 1, 3, and 5 positions.

Examples of the alkyl group for $R_2$ and $R_3$ in formula (1) include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

The substituents $R_2$ and $R_3$ in formula (1) may be further substituted with substituents as long as the affinity to the magenta pigments is not significantly degraded. Examples of such substituents include a halogen atom, a nitro group, an amino group, a hydroxyl group, a cyano group, and a trifluoromethyl group.

Examples of the alkyl group for $R_4$ to $R_6$ in formula (1) include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

Examples of the aralkyl group for $R_4$ to $R_6$ in formula (1) include a benzyl group and a phenethyl group.

$R_4$ to $R_6$ in formula (1) can be freely selected from the substituents listed above, a hydrogen atom, and a phenyl group.

$Ar_1$ and $Ar_2$ in formula (1) each represent an aryl group such as a phenyl group or a naphthyl group. These substituents may be further substituted with substituents as long as the affinity to the magenta pigment is not significantly degraded. Examples of such substituents include an alkyl group, an alkoxy group, a halogen atom, a hydroxyl group, a cyano group, a trifluoromethyl group, a carboxyl group, a carboxylic acid ester group, and a carboxylic acid amide group.

At least one of $R_2$, $R_3$, $Ar_1$, and $Ar_2$ in formula (1) is bound to the polymer portion directly or through a linking group. At least one of $R_2$, $R_3$, $Ar_1$, and $Ar_2$ in formula (1) is preferably bound to the polymer portion through a linking group. Any one of $R_2$ and $R_3$ bound to the polymer portion independently represents a divalent group, a hydrogen atom of which is removed from the corresponding monovalent group of any one of $R_2$ and $R_3$. Any one of $Ar_1$ and $Ar_2$ bound to the polymer portion independently represents a divalent group, a hydrogen atom of which is removed from the corresponding aryl group of any one of $Ar_1$ and $Ar_2$. In view of affinity to the magenta pigment, the structure represented by formula (1) may be a structure represented by formula (3) below. In other words, in formula (1), $Ar_1$ and $Ar_2$ may each represent a phenyl group, and at least one of hydrogen atoms of the phenyl groups may be substituted with a linking group to form a link to the polymer portion.

FORMULA (3)

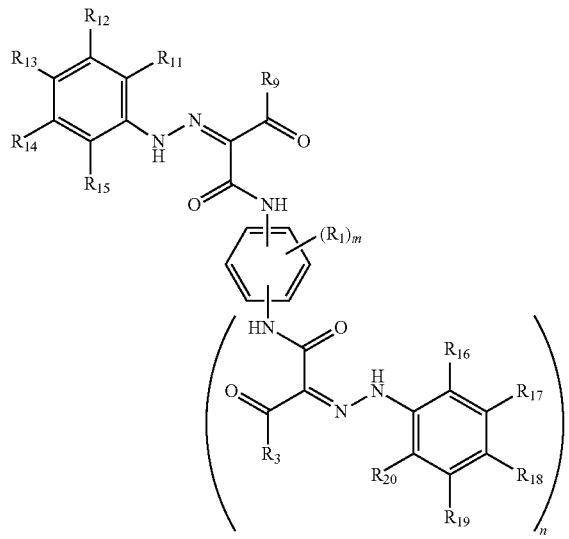

[In formula (3), $R_2$ is the same as $R_2$ in formula (1); $R_9$ and $R_{10}$ independently represent an alkyl group, a phenyl group, an $OR_4$ group, or an $NR_5R_6$ group; $R_4$ to $R_6$ are the same as $R_4$ to $R_6$ in formula (1); $R_{11}$ to $R_{20}$ independently represent a linking group or a monovalent group selected from the group consisting of a hydrogen atom, a $COOR_{21}$ group, a $CONR_{22}R_{23}$ group, a $NHCOR_{24}$ group, and an $OR_{25}$ group; $R_{21}$ to $R_{25}$ each independently represent a hydrogen atom, an alkyl group, an aryl group, or an aralkyl group; wherein at least one of $R_{11}$ to $R_{20}$ is the linking group that binds to the polymer portion; m represents an integer of 3 or 4; n represents an integer of 1 or 2; and n+m=5].

In formula (3), $R_{11}$ to $R_{20}$ may each be freely selected from a hydrogen atom, a $COOR_{21}$ group, a $CONR_{22}R_{23}$ group, a $NHCOR_{24}$ group, and an $OR_{25}$ group but preferably at least one of $R_{11}$ to $R_{20}$ is a $COOR_{21}$ group or a $CONR_{22}R_{23}$ group from the viewpoint of affinity to the magenta pigment.

Examples of the alkyl group for $R_{21}$ to $R_{25}$ in formula (3) include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

Examples of the aryl group for $R_{21}$ to $R_{25}$ in formula (3) include a phenyl group and a naphthyl group.

Examples of the aralkyl group for $R_{21}$ to $R_{25}$ in formula (3) include a benzyl group and a phenethyl group.

$R_{21}$ to $R_{25}$ in formula (3) may be freely selected from the substituents listed above and a hydrogen atom. From the viewpoint of the affinity to the magenta pigment, $R_{21}$ is preferably a methyl group and $R_{22}$ and $R_{23}$ are preferably each independently a methyl group or a hydrogen atom.

Examples of the alkyl group for $R_9$ and $R_{10}$ in formula (3) include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

The substituents $R_9$ and $R_{10}$ in formula (3) may be further substituted with substituents as long as affinity to the magenta pigment is not significantly degraded. Examples of such substituents include a halogen atom, a nitro group, an amino group, a hydroxyl group, a cyano group, and a trifluoromethyl group.

$R_9$ and $R_{10}$ in formula (3) can each be freely selected from the substituents listed above but are preferably each independently a methyl group from the viewpoint of affinity to the magenta pigment.

The structure represented by formula (3) is more preferably a structure represented by any one of formulae (4) to (7) below from the viewpoint of affinity to the magenta pigment. In other words, the azo skeleton structure portion is preferably bonded to the polymer portion through a linking group L as shown in formulae (4) to (7) below.

FORMULA (4)

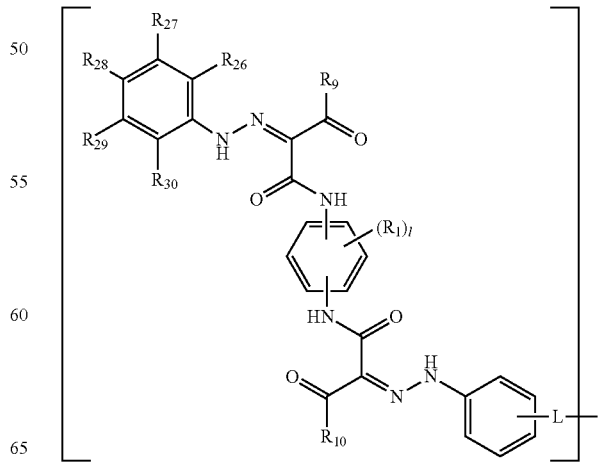

[In formula (4), $R_2$ is the same as $R_2$ in formula (1); $R_9$ and $R_{10}$ are the same as $R_9$ and $R_{10}$ in formula (3); $R_{26}$ to $R_{30}$ independently represent a hydrogen atom, a $COOR_{21}$ group, a $CONR_{22}R_{23}$ group, a $NHCOR_{24}$ group, or an $OR_{25}$ group; $R_{21}$ to $R_{25}$ are the same as $R_{21}$ to $R_{25}$ in formula (3); l represents 4; and L represents a divalent linking group that binds to the polymer portion.]

FORMULA (5)

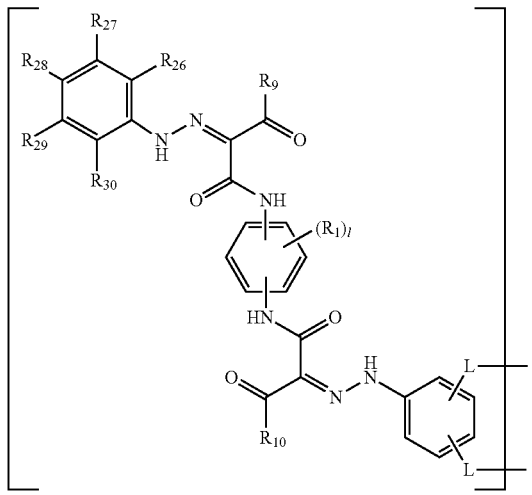

[In formula (5), $R_1$ is the same as $R_1$ in formula (1); $R_9$ and $R_{10}$ are the same as $R_9$ and $R_{10}$ in formula (3); $R_{26}$ to $R_{30}$ independently represent a hydrogen atom, a $COOR_{21}$ group, a $CONR_{22}R_{23}$ group, a $NHCOR_{24}$ group, or an $OR_{25}$ group; $R_{21}$ to $R_{25}$ are the same as $R_{21}$ to $R_{25}$ in formula (3); l represents 4; and L represents a divalent linking group that binds to the polymer portion.]

FORMULA (6)

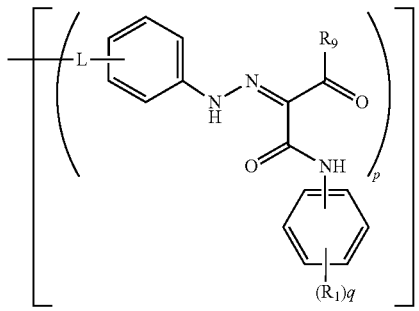

[In formula (6), $R_1$ is the same as $R_1$ in formula (1); $R_9$ is the same as $R_9$ in formula (3); p represents an integer of 2 or 3; q represents an integer of 3 or 4; p+q=6; and L represents a divalent linking group that binds to the polymer.]

FORMULA (7)

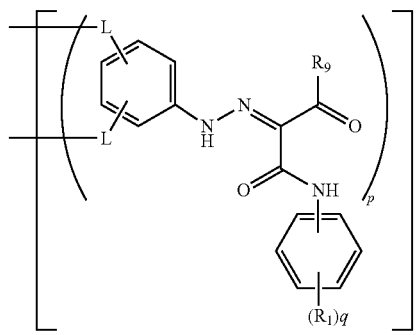

[In formula (7), $R_1$ is the same as $R_1$ in formula (1); $R_9$ is the same as $R_9$ in formula (3); p represents an integer of 2 or 3; q represents an integer of 3 or 4; p+q=6; and L represents a divalent linking group that binds to the polymer portion.].

L in formulae (4) to (7) above is a divalent linking group and links the azo skeleton structure portion to the polymer portion.

According to the structures represented by formulae (4) and (6), the azo skeleton structure is linked to the polymer portion through L at one position. According to the structures of formulae (5) and (7), links are formed at two positions.

L in formulae (4) to (7) may be any divalent linking group but preferably includes a carboxylic acid ester bond, a carboxylic acid amide bond, or a sulfonic acid ester bond. This is because the reaction that can induce formation of such bonds is convenient as the reaction for linking the azo skeleton structure to the polymer portion.

The substitution position of L in formulae (4) to (7) may be that at least one L is in meta or para position with respect to the hydrazo group from the viewpoint of the affinity to the magenta pigment.

$R_{26}$ to $R_{30}$ in formula (4) or (5) may be selected from a hydrogen atom, a $COOR_{21}$ group, a $CONR_{22}R_{23}$ group, a $NHCOR_{24}$ group, and an $OR_{25}$ group. From the viewpoint of affinity to the magenta pigment, at least one of $R_{26}$ to $R_{30}$ is preferably a $COOR_{21}$ group or a $CONR_{22}R_{23}$ group.

The polymer portion will now be described in detail.

The alkyl group for $R_7$ in formula (2) may be any alkyl group. Examples thereof include linear, branched, or cyclic alkyl groups such as a methyl group, an ethyl group, an n-propyl group, an n-butyl group, an n-pentyl group, an n-hexyl group, an isopropyl group, an isobutyl group, a sec-butyl group, a tert-butyl group, and a cyclohexyl group.

$R_7$ in formula (2) may be freely selected from the substituents listed above and a hydrogen atom but is preferably a hydrogen atom or a methyl group from the viewpoint of polymerizability of the monomer unit.

The carboxylic acid ester group for $R_8$ in formula (2) may be any carboxylic acid ester group. Examples thereof include linear or branched ester groups such as a methyl ester group, an ethyl ester group, an n-propyl ester group, an isopropyl ester group, an n-butyl ester group, an isobutyl ester group, a sec-butyl ester group, a tert-butyl ester group, a dodecyl ester group, a 2-ethylhexyl ester group, a stearyl ester group, a phenyl ester group, a 2-hydroxyethyl ester group, an octyl ester group, a nonyl ester group, a decyl ester group, an undecyl ester group, a dodecyl ester group, a hexadecyl ester group, an octadecyl ester group, an eicosyl ester group, and a behenyl ester group.

Examples of the carboxylic acid amide group for $R_8$ in formula (2) include amide groups such as a N-methylamide group, a N,N-dimethylamide group, a N,N-diethylamide group, a N-isopropylamide group, a N-tert-butylamide group, a N-phenylamide group, a N-(2-ethylhexyl)amide group, and a N,N-di(2-ethylhexyl)amide group.

The substituent $R_8$ in formula (2) may be further substituted as long as the polymerizability of the monomer unit is not impaired and the solubility of the compound having the azo skeleton structure is not significantly degraded. Examples of the substituents include alkoxy groups such as a methoxy group and an ethoxy group, amino groups such as N-methylamino group and a N,N-dimethylamino group, acyl groups such as an acetyl group, and halogen atoms such as a fluorine atom and a chlorine atom.

$R_8$ in formula (2) may be freely selected from the substituents listed above, a phenyl group, and a carboxyl group but is preferably a phenyl group or a carboxylic acid ester group from the viewpoints of the dispersibility of the compound having an azo skeleton structure into the binder resin of the toner and the compatibility between the compound and the binder resin.

The affinity of the polymer portion to the dispersion medium can be controlled by changing the content of the monomer unit represented by formula (2). When the dispersion medium is a nonpolar solvent such as styrene, the content of the monomer unit represented by formula (2) with $R_8$ representing a phenyl group may be increased from the viewpoint of affinity to the dispersion medium. When the dispersion medium is a solvent that has a particular degree of polarity such as an acrylic acid ester, the content of the monomer unit represented by formula (2) with $R_8$ representing a carboxyl group, a carboxylic acid ester group, or a carboxylic acid amide group may be increased from the viewpoint of affinity to the dispersion medium.

The number-average molecular weight of the polymer portion may be 500 or more from the viewpoint of improving the dispersibility of the magenta pigment. The larger the molecular weight, the higher the effect of improving the dispersibility of the magenta pigment. However, at an excessively high molecular weight, the affinity to water-insoluble solvents tends to be degraded. Thus, the number-average molecular weight of the polymer portion is preferably up to 200000 and more preferably in the range of 2000 to 50000 considering the ease of production.

As disclosed in PCT Japanese Translation Patent Publication No. 2003-531001, the dispersibility can be improved by using a polyoxyalkylene carbonyl-based dispersant having a branched aliphatic chain introduced at a terminus. If the above-described polymer portion can be made telechelic by a method such as atom transfer radical polymerization (ATRP) described below, a branched aliphatic chain can be introduced to a terminus and the dispersibility may be improved in some cases.

The substitution positions of the azo skeleton structures in the compound having the azo skeleton structure may be scattered at random or may be localized to form one or more blocks at a terminus.

The larger the number of azo skeleton structures substituted in the compound having the azo skeleton structure, the higher the affinity to the magenta pigment. However, if the number of the azo skeleton structures is excessively large, affinity to water-insoluble solvents is degraded. Thus, the number of the azo skeleton structures is preferably within the range of 0.2 to 10 and more preferably within the range of 0.2 to 5 per 100 of monomers constituting the polymer portion.

The azo skeleton structure represented by formula (1) has tautomers represented by formulae (10) and (11) below as shown below. These tautomers are also within the range of the present invention.

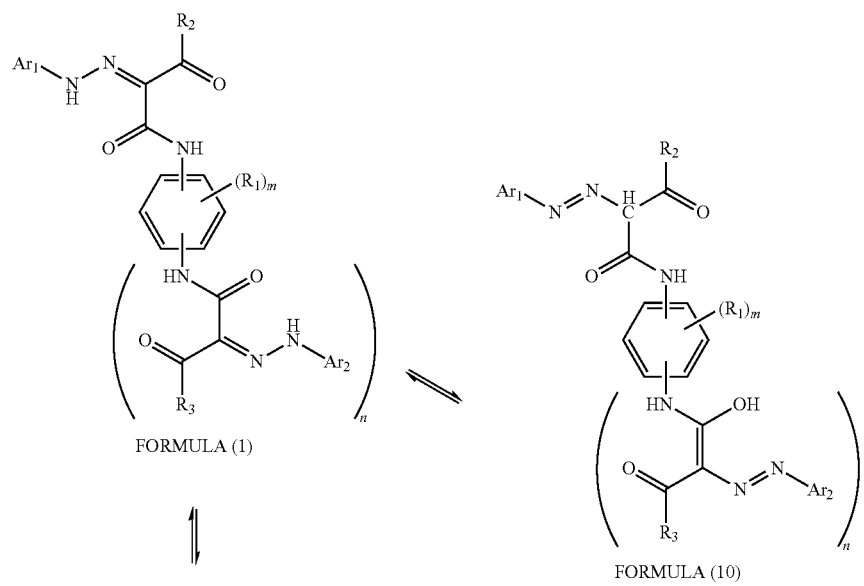

FORMULA (1)

FORMULA (10)

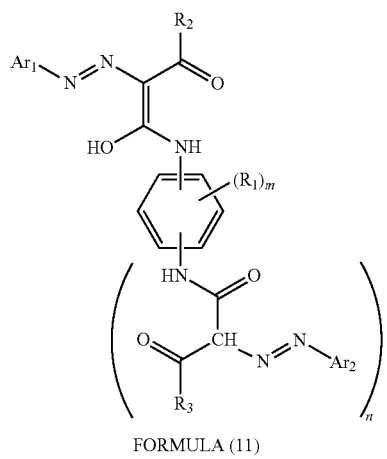

FORMULA (11)

[In formulae (10) and (11), $R_1$ to $R_3$, $Ar_1$, $Ar_2$, m, and n are the same as $R_2$ to $R_3$, $Ar_1$, $Ar_2$, m, and n in formula (1)].

Examples of the method for synthesizing the compound having an azo skeleton structure include the following methods (i) to (iv).

Method (i): An example scheme of method (i) is described below in detail. First, an azo skeleton structure and a polymer portion are separately synthesized in advance and then linked to each other by condensation reaction or the like so as to synthesize a compound having an azo skeleton structure.

METHOD (i)

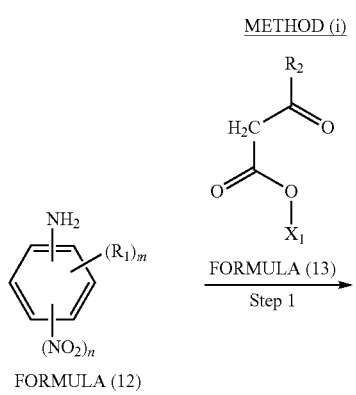

FORMULA (12)

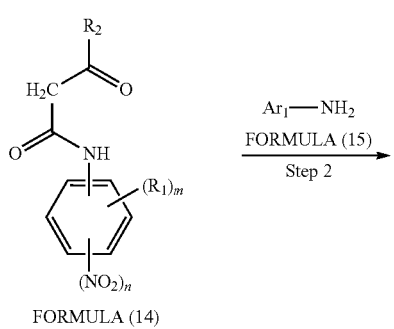

FORMULA (14)

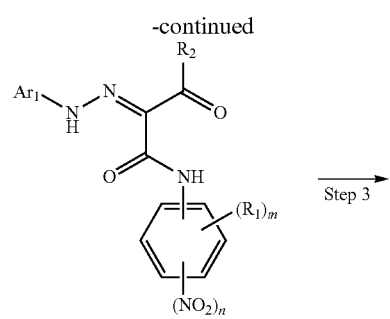

FORMULA (16)

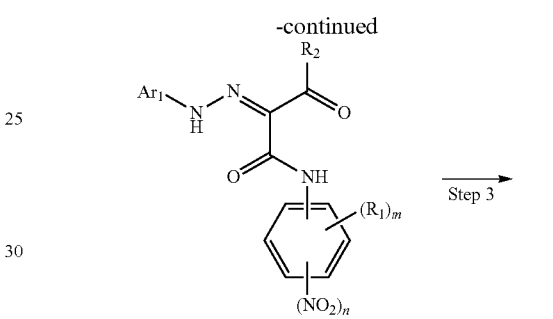

FORMULA (17)

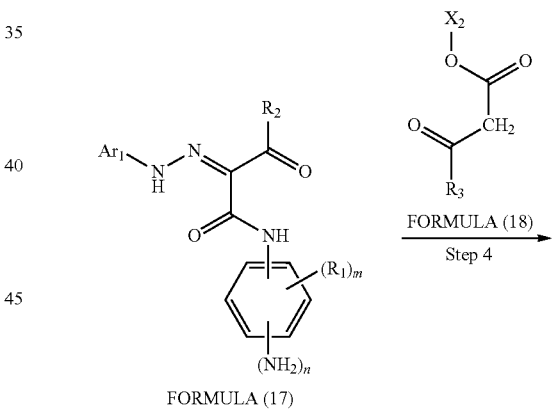

FORMULA (18)
Step 4

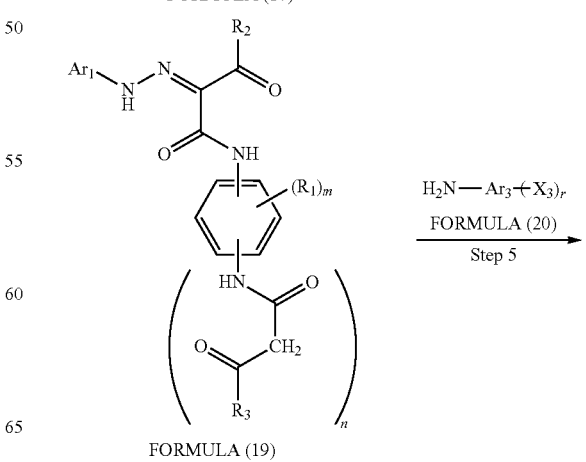

FORMULA (19)

-continued

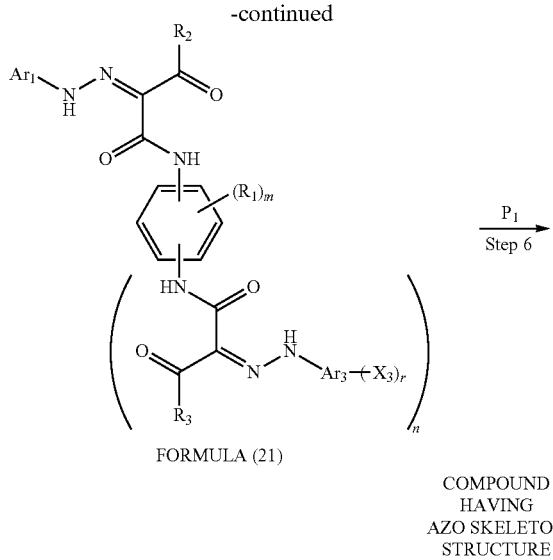

FORMULA (21)

→ COMPOUND HAVING AZO SKELETON STRUCTURE

[In formulae (12) to (21), $R_1$ to $R_3$, $Ar_1$, m, and n are the same as $R_1$ to $R_3$, $Ar_1$, m, and n in formula (1); $Ar_3$ in formulae (20) and (21) represents an arylene group; $X_1$ in formula (13) and $X_2$ in formula (18) each represent a leaving group; $P_1$ represents a polymer portion having a monomer unit represented by general formula (2); $X_3$ in formulae (20) and (21) represents a substituent that forms the divalent linking group L by reacting with $P_1$; and r represents an integer of 1 or 2.]

In the scheme described as an example above, the compound having an azo skeleton structure can be synthesized through step 1 of amidating a nitroaniline derivative represented by formula (12) and an acetoacetic acid analog represented by formula (13) to synthesize an intermediate (14) which is an acylacetanilide analog; step 2 of performing diazo coupling of the intermediate (14) and an aniline derivative (15) to synthesize an azo compound (16); step 3 of reducing the nitro groups in the azo compound (16) to synthesize an intermediate (17) which is an aniline analog; step 4 of amidating the intermediate (17) and an acetoacetic acid analog represented by formula (18) to synthesize an intermediate (19) which is an acylacetanilide analog; step 5 of performing diazo coupling of the intermediate (19) and an aniline derivative (20) to synthesize an azo compound (21); and step 6 of performing condensation reaction of the azo skeleton and a polymer portion $P_1$.

First, step 1 is described. A common method may be employed in step 1 (e.g., see Datta E. Ponde and four others, The Journal of Organic Chemistry, (USA), American Chemical Society, 1998, vol. 63, No. 4, pp. 1058-1063). When $R_2$ in formula (14) is a methyl group, synthesis is possible by using a diketone instead of the material (13) (e.g., see Kiran Kumar Solingapuram Sai and two others, The Journal of Organic Chemistry, (USA), American Chemical Society, 2007, vol. 72, No. 25, pp. 9761-9764).

There are a wide variety of commercially available products for the nitroaniline derivative (12) and the acetoacetic acid analog (13). The nitroaniline derivative (12) and the acetoacetic acid analog (13) are also easy to synthesize by common methods.

This step can be performed in the absence of any solvent but is preferably performed in the presence of a solvent to suppress rapid progress of the reaction. The solvent may be any solvent that does not inhibit the reaction and examples thereof include alcohols such as methanol, ethanol, and propanol, esters such as methyl acetate, ethyl acetate, and propyl acetate, ethers such as diethyl ether, tetrahydrofuran, and dioxane, hydrocarbons such as benzene, toluene, xylene, hexane, and heptane, halogen-containing hydrocarbons such as dichloromethane, dichloroethane, and chloroform, amides such as N,N-dimethylformamide, N-methylpyrrolidone, and N,N-dimethylimidazolidinone, nitriles such as acetonitrile and propionitrile, acids such as formic acid, acetic acid, and propionic acid, and water. Two or more of these solvents may be used as a mixture. In blending the solvents, the blend ratio may be freely determined depending on the solubility of the substrate. The amount of the solvent used may be freely determined but is preferably 1.0 to 20 times the amount of the compound represented by formula (12) on a mass basis from the viewpoint of the reaction rate.

This step is usually performed within the temperature range of 0° C. to 250° C. and is usually completed within 24 hours.

Next, step 2 is described. In step 2, a common method may be employed. For example, an aniline derivative (15) is reacted with a diazotizing agent such as sodium nitrite or nitrosylsulfuric acid in a methanol solvent in the presence of an inorganic acid such as hydrochloric acid or sulfuric acid so as to synthesize a corresponding a diazonium salt. This diazonium salt is coupled with the intermediate (14) to synthesize the azo compound (16).

There are a wide variety of commercially available products for the aniline derivative (15). The aniline derivative (15) is also easy to synthesize by common methods.

This step can be performed in the absence of any solvent but is preferably conducted in the presence of a solvent to suppress rapid progress of the reaction. The solvent may be any solvent that does not inhibit the reaction. Examples thereof include alcohols such as methanol, ethanol, and propanol, esters such as methyl acetate, ethyl acetate, and propyl acetate, ethers such as diethyl ether, tetrahydrofuran, and dioxane, hydrocarbons such as benzene, toluene, xylene, hexane, and heptane, halogen-containing hydrocarbons such as dichloromethane, dichloroethane, and chloroform, amides such as N,N-dimethylformamide, N-methylpyrrolidone, and N,N-dimethylimidazolidinone, nitriles such as acetonitrile and propionitrile, acids such as formic acid, acetic acid, and propionic acid, and water. Two or more of these solvents may be used as a mixture. In blending the solvents, the blend ratio may be freely determined depending on the solubility of the substrate. The amount of the solvent used may be freely determined but is preferably 1.0 to 20 times the amount of the compound represented by formula (15) on a mass basis from the viewpoint of the reaction rate.

This step is usually performed within the temperature range of −50° C. to 100° C. and is usually completed within 24 hours.

Step 3 will now be described. In step 3, a common method may be employed (an example of a method that uses a metal compound and the like is described in "Jikken Kagaku Kouza [Experimental Chemistry]", published by Maruzen Publishing Co., Ltd., first edition, vol. 17-2, pp. 162-179 and an example of a catalytic hydrogenation method is described in "Jikken Kagaku Kouza [Experimental Chemistry]", published by Maruzen Publishing Co., Ltd., first edition, vol. 15, pp. 390-448 or International Publication No. 2009/060886 pamphlet).

This step can be performed in the absence of any solvent but is preferably performed in the presence of a solvent to suppress rapid progress of the reaction. The solvent may be any solvent that does not inhibit the reaction and examples thereof include alcohols such as methanol, ethanol, and propanol, esters such as methyl acetate, ethyl acetate, and propyl acetate, ethers such as diethyl ether, tetrahydrofuran, and dioxane, hydrocarbons such as benzene, toluene, xylene, hexane, and heptane, and amides such as N,N-dimethylformamide, N-methylpyrrolidone, and N,N-dimethylimidazolidinone. Two or more of these solvents may be used as a mixture. In blending the solvents, the blend ratio may be freely determined. The amount of the solvent used may be freely determined depending on the solubility of the substrate but is preferably 1.0 to 20 times the amount of the compound represented by formula (16) on a mass basis from the viewpoint of the reaction rate.

This step is usually performed within the temperature range of 0° C. to 250° C. and is usually completed within 24 hours.

Next, step 4 is described. In step 4, the same method as in step 1 is employed to synthesize the intermediate (19) which is an acylacetanilide analog.

Next, step 5 is described. In step 5, the same method as in step 2 is employed to synthesize the azo compound (21).

There are a wide variety of commercially available products for the aniline derivative (20). The aniline derivative (20) is also easy to synthesize by common methods.

Next, a method for synthesizing the polymer portion $P_1$ used in step 6 is described. A common polymerization method may be employed in synthesizing the polymer portion $P_1$ (e.g., see Krzysztof Matyjaszewski and one other, Chemical Reviews, (USA), American Chemical Society, 2001, vol. 101, pp. 2921-2990).

Specific examples thereof include radical polymerization, cationic polymerization, and anionic polymerization. Preferably, radical polymerization is employed due to ease of production.

Radical polymerization may be conducted by using a radical polymerization initiator, by applying radiation, a laser beam, or the like, by using a photopolymerization initiator and applying light, or by heating, for example.

The radical polymerization initiator may be any that can generate a radical and initiate polymerization reaction and may be selected from among the compounds that generate radicals due to heat, light, radiation, redox reaction, and the like. Examples thereof include azo compounds, organic peroxides, inorganic peroxides, organic metal compounds, and photopolymerization initiators. Specific examples thereof include azo-based polymerization initiators such as 2,2'-azobis(isobutyronitrile), 2,2'-azobis(2-methylbutyronitrile), 2,2'-azobis(4-methoxy-2,4-dimethylvaleronitrile), and 2,2'-azobis(2,4-dimethylvaleronitrile), organic peroxide-based polymerization initiators such as benzoyl peroxide, di-tert-butyl peroxide, tert-butylperoxyisopropyl carbonate, tert-hexylperoxy benzoate, and tert-butylperoxy benzoate, inorganic peroxide-based polymerization initiators such as potassium persulfate and ammonium persulfate, and redox initiators such as those based on hydrogen peroxide-ferrous iron, benzoyl peroxide-dimethylaniline, and cerium(IV) salt-alcohol. Examples of the photopolymerization initiator include benzophenones, benzoin ethers, acetophenones, and thioxanthones. Two or more of these radical polymerization initiators may be used in combination.

The amount of the polymerization initiator used may be adjusted within the range of 0.1 to 20 parts by mass per 100 parts by mass of the monomers so that a copolymer having a desired molecular weight distribution is obtained.

The polymer portion represented by $P_1$ can be prepared by any method such as solution polymerization, suspension polymerization, emulsion polymerization, dispersion polymerization, precipitation polymerization, and bulk polymerization. Solution polymerization in a solvent that can dissolve all the components used in production is preferred. Examples of the solvent that can be used include polar organic solvents such as alcohols, e.g., methanol, ethanol, and 2-propanol, ketones, e.g., acetone and methyl ethyl ketone, ethers, e.g., tetrahydrofuran and diethyl ether, ethylene glycol monoalkyl ethers or acetates thereof, propylene glycol monoalkyl ethers or acetates thereof, and diethylene glycol monoalkyl ethers; and, if appropriate, nonpolar solvents such as toluene and xylene. These solvents can be used alone or in combination. Preferably, solvents having a boiling point within the range of 100° C. to 180° C. are used alone or in combination among these solvents.

The polymerization temperature is not particularly limited since a preferable temperature range differs depending on types of initiators used. The temperature range for polymerization is usually −30° C. to 200° C. and is preferably 40° C. to 180° C.

The molecular weight distribution and molecular structure of the polymer portion represented by $P_1$ can be controlled by common methods. Examples of such methods include a method in which an addition fragmentation type chain transfer agent is used (refer to Japanese Patent Nos. 4254292 and 3721617), a nitroxide-mediated polymerization (NMP) method in which dissociation and bonding of amine oxide radicals are utilized [see Craig J. Hawker and two others, Chemical Reviews, (USA), American Chemical Society, 2001, vol. 101, pp. 3661-3688], an atom transfer radial polymerization (ATRP) method in which polymerization is conducted by using a metal catalyst, a ligand, and a halogen compound as a polymerization initiator [see Masami Kamigaito and two others, Chemical Reviews, (USA), American Chemical Society, 2001, vol. 101, pp. 3689-3746], a reversible addition fragmentation chain transfer (RAFT) method that uses a dithiocarboxylic acid ester, a xanthate compound, or the like as a polymerization initiator (e.g., PCT Japanese Translation Patent Publication No. 2000-515181), a MADIX (macromolecular design via interchange of xanthates) method (e.g., see International Publication No. 99/05099 pamphlet), and a degenerative transfer (DT) method [for example, see Atsushi Goto and six others, Journal of The American Chemical Society, (USA), American Chemical Society, 2003, vol. 125, pp. 8720-8721]. A polymer portion $P_1$ with controlled molecular weight distribution and molecular structure can be produced by these methods.

Next, step 6 is described. In step 6, a common method may be employed. For example, a polymer portion $P_1$ having a carboxyl group and an azo compound (21) with $X_3$ representing a substituent having a hydroxyl group may be used to synthesize a compound having an azo skeleton structure with a linking group L having a carboxylic acid ester bond. Alternatively, a polymer portion $P_1$ having a hydroxyl group and an azo compound (21) with $X_3$ representing a substituent having a sulfonic acid group may be used to synthesize a compound having an azo skeleton structure with a linking group L having a sulfonic acid ester bond. Yet alternatively, a polymer portion $P_1$ having a carboxyl group and an azo compound (21) with $X_3$ representing a substituent having an amino group may be used to synthesize a compound having an azo skeleton structure with a linking group L having a carboxylic acid amide bond. Specific examples of such methods include a method that uses a dehydration condensation agent, e.g., 1-ethyl-3-(3-dimethylaminopropyl)carbodiimide hydrochloride (for example, see Melvin S, Newman and one other, The Journal of Organic Chemistry, (USA), American Chemical Society, 1961, vol. 26, No. 7, pp. 2525-2528) and a Schotten-Baumann method (for example, see Norman O. V. Sonntag, Chemical Reviews, (USA), American Chemical Society, 1953, vol. 52, No. 2, pp. 237-416).

This step can be performed in the absence of any solvent but is preferably performed in the presence of a solvent to suppress rapid progress of the reaction. The solvent may be any solvent that does not inhibit the reaction and examples thereof include ethers such as diethyl ether, tetrahydrofuran, and dioxane, hydrocarbons such as benzene, toluene, xylene, hexane, and heptane, halogen-containing hydrocarbons such as dichloromethane, dichloroethane, and chloroform, amides such as N,N-dimethylformamide, N-methylpyrrolidone, and N,N-dimethylimidazolidinone, and nitriles such as acetonitrile and propionitrile. Two or more of these solvents may be used as a mixture depending on the solubility of the substrate. In blending the solvents, the blend ratio may be freely determined. The amount of the solvent used may be freely determined but is preferably 1.0 to 20 times the amount of the compound represented by formula (21) on a mass basis from the viewpoint of the reaction rate.

This step is usually performed within the temperature range of 0° C. to 250° C. and is usually completed within 24 hours.

Next, method (ii) is described in detail by using an example scheme below. In method (ii), an azo compound having a polymerizable functional group is prepared in advance and then copolymerized with a polymerizable monomer that forms a monomer unit represented by formula (2) to thereby synthesize the compound having an azo skeleton structure.

[In formula (21), $R_1$ to $R_3$, $Ar_1$, $Ar_3$, $X_3$, m, n, and r are the same as $R_1$ to $R_3$, $Ar_1$, $Ar_3$, $X_3$, m, n, and r in formula (21) in the scheme of method (i) above; $R_{45}$ in formula (22) represents a hydrogen atom or an alkyl group; $X_4$ represents a substituent that reacts with $X_3$ in formula (21) to give $X_5$ in formula (23); $R_1$ to $R_3$, $R_{45}$, $Ar_1$, $Ar_3$, m, n, and r in formula (23) are the same as those in formulae (21) and (22); and $X_5$ represents a divalent linking group L formed by reaction between $X_3$ in formula (21) and $X_4$ in formula (22).]

In the scheme illustrated above, a compound having an azo skeleton structure is synthesized through step 7 of reacting an azo compound (21) with a vinyl group containing compound represented by formula (22) to synthesize an azo compound (23) having a polymerizable functional group and step 8 of copolymerizing the azo compound (23) having a polymerizable functional group and a polymerizable monomer that forms the monomer unit represented by formula (2).

First, step 7 is described. In step 7, the same method as in step 6 of method (i) above is employed to synthesize an azo compound (23) having a polymerizable functional group.

There are a wide variety of commercially available products for the vinyl group containing compound (22). The vinyl group containing compound (22) is also easy to synthesize by common methods.

Next, step 8 is described. In step 8, the method for synthesizing the polymer portion $P_1$ in method (i) can be used to synthesize a compound having an azo skeleton structure through copolymerization of the azo compound (23) having a polymerizable functional group and the polymerizable monomer that forms the monomer unit represented by formula (2).

Next, method (ii) is described in detail by using an example scheme below. In method (iii), an azo compound having a halogen atom synthesized in advance is used as a polymerization initiator and copolymerized with a polymerizable monomer that forms the monomer unit represented by formula (2) so as to synthesize a compound having the azo skeleton structure.

METHOD (ii)

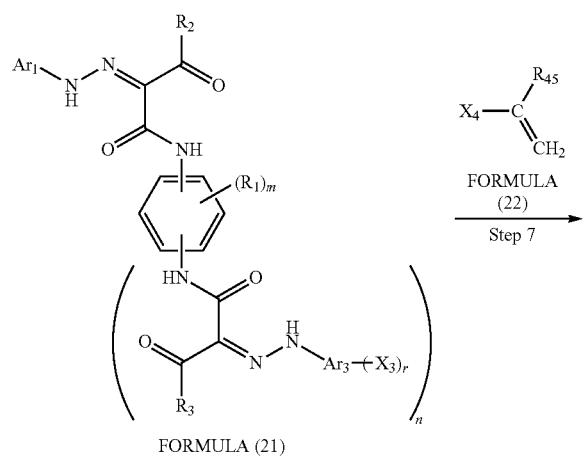

FORMULA (21)

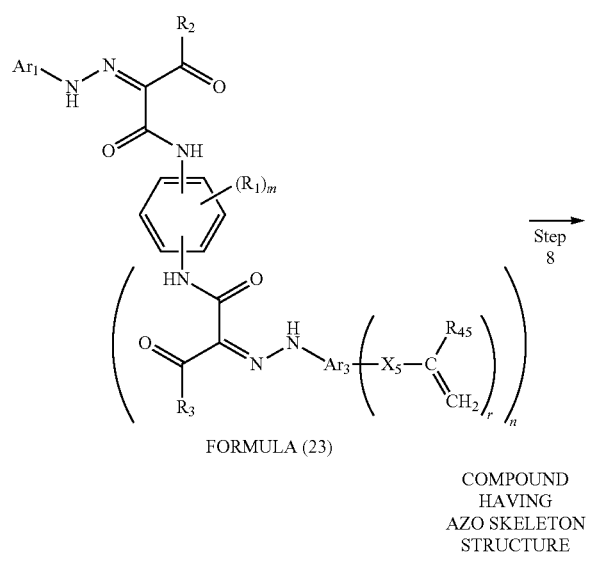

FORMULA (23)

COMPOUND HAVING AZO SKELETON STRUCTURE

METHOD (iii)

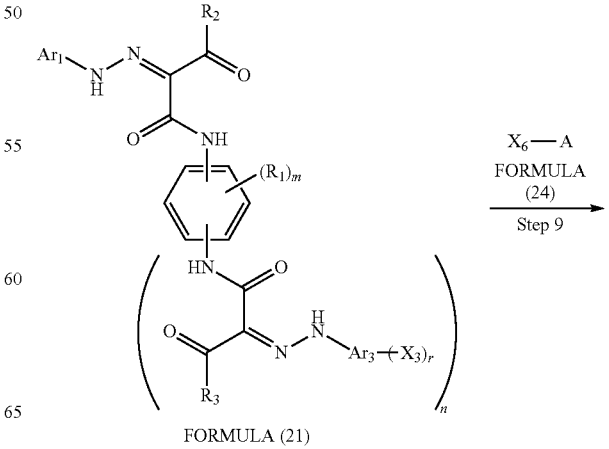

FORMULA (21)

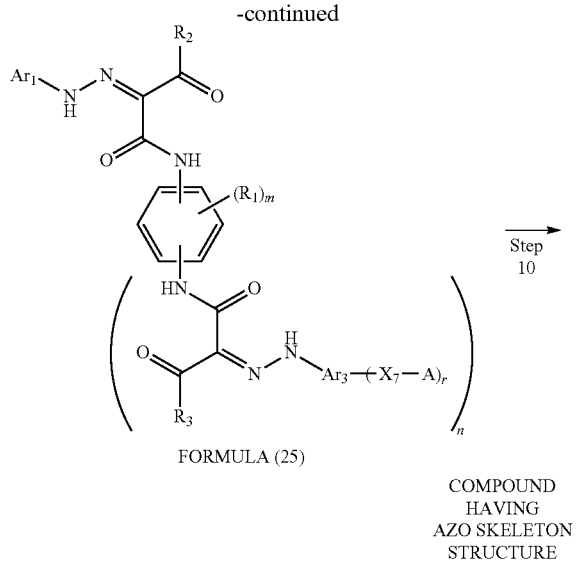

FORMULA (25)

COMPOUND HAVING AZO SKELETON STRUCTURE

[In formula (21), $R_1$ to $R_3$, $Ar_1$, $Ar_3$, $X_3$, m, n, and r are the same as $R_1$ to $R_3$, $Ar_1$, $Ar_3$, $X_3$, m, n, and r in formula (21) in method (i) above; $X_6$ in formula (24) represents a substituent that reacts with $X_3$ in formula (21) to give $X_7$ in formula (25); A represents a chlorine atom, a bromine atom, or an iodine atom; $R_1$ to $R_3$, $Ar_1$, $Ar_2$, $X_3$, m, n and r in formula (25) are the same as those in formula (21); and $X_7$ represents a divalent linking group L formed by reaction between $X_3$ in formula (21) and $X_6$ in formula (24).]

In the scheme illustrated above, a compound having an azo skeleton structure is synthesized through step 9 of reacting an azo compound (21) with a halogen atom-containing compound represented by formula (24) to synthesize an azo compound (25) having a halogen atom and step 10 of polymerizing the halogen atom-containing azo compound (25) serving as a polymerizing initiator with a polymerizable monomer that forms the monomer unit represented by formula (2).

First, step 9 is described. In step 9, the same method as in step 6 of method (i) above is employed to synthesize a halogen atom-containing azo compound (25). For example, a halogen atom-containing azo skeleton structure (25) having a linking group L containing a carboxylic acid ester bond can be synthesized by using a halogen atom-containing compound (24) having a carboxyl group and an azo compound (21) with $X_3$ representing a substituent having a hydroxyl group. Alternatively, a halogen atom-containing azo skeleton structure (25) having a linking group L containing a sulfonic acid ester bond can be synthesized by using a halogen atom-containing compound (24) having a hydroxyl group and an azo compound (21) with $X_3$ representing a substituent having a sulfonic acid group. Yet alternatively, a halogen atom-containing azo skeleton structure (25) having a linking group L containing a carboxylic acid amide bond can be synthesized by using a halogen atom-containing compound (24) having a carboxyl group and an azo compound (21) with $X_3$ representing a substituent having an amino group.

Examples of the halogen atom-containing compound (24) having a carboxyl group include chloroacetic acid, α-chloropropionic acid, α-chlorobutyric acid, α-chloroisobutyric acid, α-chlorovaleric acid, α-chloroisovaleric acid, α-chlorocaproic acid, α-chlorophenylacetic acid, α-chlorodiphenylacetic acid, α-chloro-α-phenylpropionic acid, α-chloro-β-phenylpropionic acid, bromoacetic acid, α-bromopropionic acid, α-bromobutyric acid, α-bromoisobutyric acid, α-bromovaleric acid, α-bromoisovaleric acid, α-bromocaproic acid, α-bromophenylacetic acid, α-bromodiphenylacetic acid, α-bromo-α-phenylpropionic acid, α-bromo-β-phenylpropionic acid, iodoacetic acid, α-iodopropionic acid, α-iodobutyric acid, α-iodoisobutyric acid, α-iodovaleric acid, α-iodoisovaleric acid, α-iodocaproic acid, α-iodophenylacetic acid, α-iododiphenylacetic acid, α-iodo-α-phenylpropionic acid, α-iodo-β-phenylpropionic acid, β-chlorobutyric acid, β-bromoisobutyric acid, iododimethylmethylbenzoic acid, and 1-chloroethylbenzoic acid. Acid halides and acid anhydrides thereof can also be used in the present invention.

Examples of the halogen atom-containing compound (24) having a hydroxyl group include 1-chloroethanol, 1-bromoethanol, 1-iodoethanol, 1-chloropropanol, 2-bromopropanol, 2-chloro-2-propanol, 2-bromo-2-methylpropanol, 2-phenyl-1-bromoethanol, and 2-phenyl-2-iodoethanol.

Next, step 10 is described. In step 10, the ATRP method described in method (i) above is used to synthesize a compound having an azo skeleton structure by polymerizing a halogen atom-containing azo skeleton structure (25) serving as a polymerization initiator with a polymerizable monomer that forms the monomer unit represented by formula (2) in the presence of a metal catalyst and a ligand.

The metal catalyst used in the ATRP method is not particularly limited but may be at least one transition metal selected from groups 7 to 11 in the periodic table. For a redox catalyst (redox conjugated complex) in which a low valence complex and a high valence complex change reversibly, the low valence metal specifically used is, for example, a metal selected from the group consisting of $Cu^+$, $Ni^0$, $Ni^+$, $Ni^{2+}$, $Pd^0$, $Pd^+$, $Pt^0$, $Pt^+$, $Pt^{2+}$, $Rh^+$, $Rh^{2+}$, $Rh^{3+}$, $Co^+$, $Co^{2+}$, $Ir^0$, $Ir^+$, $Ir^{2+}$, $Ir^{3+}$, $Fe^{2+}$, $Ru^{2+}$, $Ru^{3+}$, $Ru^{4+}$, $Ru^{5+}$, $Os^{2+}$, $Os^{3+}$, $Re^{2+}$, $Re^{3+}$, $Re^{4+}$, $Re^{6+}$, $Mn^{2+}$, and $Mn^{3+}$. Among these, $Cu^+$, $Ru^{2+}$, $Fe^{2+}$, or $Ni^{2+}$ is preferred and $Cu^+$ is particularly preferable due to its high availability. The monovalent copper compound may be cuprous chloride, cuprous bromide, cuprous iodide, or cuprous cyanide.

The ligand used in the ATRP method is typically an organic ligand. Examples thereof include 2,2'-bipyridyl and derivatives thereof, 1,10-phenanthroline and derivatives thereof, N,N,N',N'-tetramethylethylenediamine, N,N,N',N'',N''-pentamethyldiethylenetriamine, tris[2-(dimethylamino)ethyl]amine, triphenylphosphine, and tributylphosphine. Considering the ease of production, aliphatic polyamines such as N,N,N',N'',N''-pentamethyldiethylenetriamine may be used.

Next, method (iv) is described in detail by using an example scheme below. In method (iv), a polymer portion having a monomer unit represented by formula (2) bonded to an amino group-containing aryl group and an intermediate which is an acylacetanilide analog are separately synthesized in advance and then subjected to diazo coupling so as to form a compound having an azo skeleton structure.

METHOD (iv)

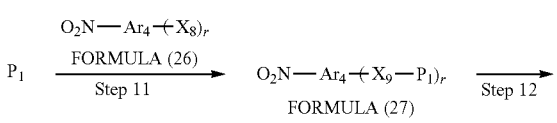

FORMULA (27)

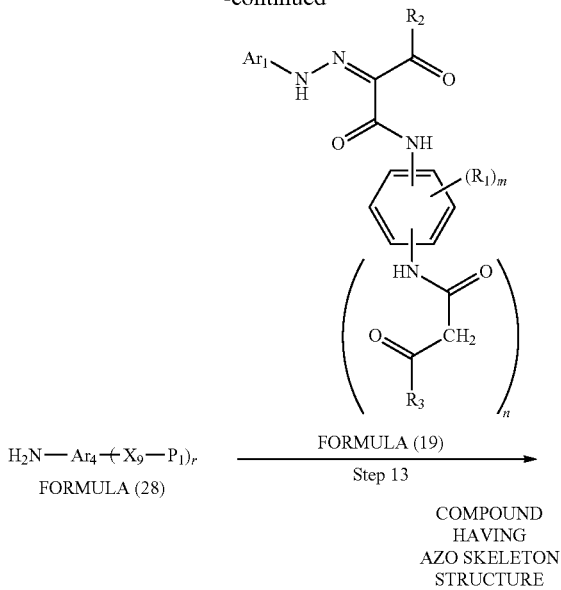

H₂N—Ar₄—(X₉—P₁)ᵣ
FORMULA (28)

FORMULA (19)

Step 13 →

COMPOUND HAVING AZO SKELETON STRUCTURE

[$P_1$ is the same as $P_1$ in the scheme of method (i) above; $R_1$ to $R_3$, $Ar_1$, m, and n in formula (19) are the same as $R_1$ to $R_3$, $Ar_1$, m, and n in formula (19) of the scheme of method (i); $Ar_4$ in formulae (26) to (28) represents an arylene group; $X_8$ in formula (26) represents a substituent that reacts with $P_1$ to give $X_9$ in formula (27); r represents 1 or 2; and $X_9$ in formulae (27) and (28) represents a divalent linking group L formed by the reaction between $X_8$ in formula (26) and $P_1$.]

In the scheme illustrated above, a compound having an azo skeleton structure is synthesized through step 11 of introducing a nitro group-containing arylene group (26) into the polymer portion $P_1$ to synthesize a polymer portion (27) having a nitro group-containing arylene group, step 12 of reducing the polymer portion (27) having a nitro group-containing arylene group to synthesize a polymer portion (28) having an amino group-containing arylene group, and step 13 of performing diazo coupling of the polymer portion (28) having an amino group-containing arylene group and an intermediate (19) which is an acylacetanilide analog.

First, step 11 is described. In step 11, the same method as in step 6 of method (i) above is employed to synthesize a polymer portion (27) having a nitro group-containing arylene group. For example, a polymer portion (27) having a nitro group-containing arylene group with a carboxylic acid ester bond serving as a linking group can be synthesized by reacting a polymer portion $P_1$ having a carboxyl group with a nitro group-containing arylene group (26) with $X_8$ representing a hydroxyl group-containing substituent. A polymer portion (27) having a nitro group-containing arylene group with a sulfonic acid ester bond serving as a linking group can be synthesized by reacting a polymer portion $P_1$ having a hydroxyl group with a nitro group-containing arylene group (26) with $X_8$ representing a substituent containing a sulfonic acid. A polymer portion (27) having a nitro group-containing arylene group with a carboxylic acid amide bond serving as a linking group can be synthesized by reacting a polymer portion $P_1$ having a carboxyl group with a nitro group-containing arylene group (26) with $X_8$ representing a substituent containing an amino group.

There are a wide variety of commercially available products for the nitro group-containing arylene group (26). The nitro group-containing arylene group (26) is also easy to synthesize by common methods.

Next, step 12 is described. In step 12, the same method as step 3 in method (i) above is applied to synthesize a polymer portion (28) having an amino group-containing arylene group.

Next, step 13 is described. In step 13, the same method as step 2 in method (i) above is applied to synthesize a compound having an azo skeleton structure.

The compounds having an azo skeleton structure obtained in the steps of the synthetic methods illustrated above and the compounds represented by formulae (14), (16), (17), (19), (21), (23), (25), (27), and (28) can be purified through a typical isolation or purifying method for organic compounds. Examples of the isolation or purifying method include a recrystallization method and a reprecipitation method that use organic solvents, and column chromatography using silica gel and the like. One or a combination of two or more of these methods may be used to purify the compounds and obtain high-purity compounds.

The compounds represented by formulae (14), (16), (17), (19), (21), (23), and (25) obtained in the steps of the synthetic methods illustrated above were identified and analyzed to determine the purity by nuclear magnetic resonance spectroscopy (ECA-400 produced by JEOL Ltd.), ESI-TOF MS (LC/MSD TOF produced by Agilent Technologies), and HPLC analysis (LC-20A produced by Shimadzu Corporation).

The compounds having an azo skeleton structure obtained by the synthetic methods illustrated above and the polymer portions represented by formulae (27) and (28) were identified and analyzed to determine the molecular weight by size exclusion chromatography (SEC) (HLC8220GPC produced by Tosoh Corporation), nuclear magnetic resonance spectroscopy (ECA-400 produced by JEOL Ltd.), and acid value measurement according to Japanese Industrial Standard (JIS) K-0070 (automatic titrator COM-2500 produced by Hiranuma Sangyo Corporation).

Next, the binder resin of the toner of the present invention is described.

Examples of the binder resin of the toner of the present invention include commonly used binder resins such as styrene-methacrylic acid copolymers, styrene-acrylic acid copolymers, polyester resins, epoxy resins, and styrene-butadiene copolymers. In a method of directly obtaining toner particles by polymerization, monomers that form the binder resin are used. Examples thereof include styrene-based monomers such as styrene, α-methylstyrene, α-ethylstyrene, o-methylstyrene, m-methylstyrene, p-methylstyrene, o-ethylstyrene, m-ethylstyrene, and p-ethylstyrene; methacrylate-based monomers such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and amide methacrylate; acrylate-based monomers such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and amide acrylate; and olefin-based monomers such as butadiene, isoprene, and cyclohexene. These are used alone or as a mixture of two or more so that the theoretical glass transition temperature (Tg) thereof is within the range of 40° C. to 75° C. (refer to J. Brandrup, E. H. Immergut (editor), Polymer Handbook, (USA), third edition, John Wiley & Sons, 1989, pp. 209-277). When the theoretic glass transition temperature is less than 40° C., the storage stability and durability stability of the toner may be degraded. When the theoretic glass transition temperature exceeds 75° C., transparency is degraded when the toner is used to form full color images.

The binder resin of the toner of the present invention may be constituted by a nonpolar resin such as polystyrene and a polar resin such as a polyester resin or a polycarbonate resin so that the in-toner distribution of additives such as a colorant, a charge controller, and a wax can be controlled. For example, in the case where toner particles are directly produced by suspension polymerization or the like, the polar resin is added during a polymerization reaction performed in the dispersing step through the polymerization step. The polar resin is added depending on the balance of polarity between a water-based medium and the polymerizable monomer composition that forms toner particles. In this manner, the resin concentration can be controlled to continuously change from the toner particle surface toward the toner particle center, because, for example, a thin layer of the polar resin can be formed on the surfaces of toner particles. The polar resin used here may be a polar resin that can interact with the compound having an azo skeleton structure, a colorant, and a charge controller so that the state of presence of the colorant in the toner particles can be controlled as desired.

Examples of the magenta pigments that can be used in the toner of the present invention include magenta pigments (for example, quinacridone-based pigments, monoazonaphthol-based pigments, disazonaphthol-based pigments, perylene-based pigments, thioindigo-based pigments, and diketopyrrolopyrrole-based pigments) described in Organic Pigments Handbook published in 2006 (written by Isao Hashimoto) and the magenta pigment may be appropriately selected from these. In particular, quinacridone-based pigments and diketopyrrolopyrrole-based pigments are preferred since they have high affinity to the pigment dispersant of the present invention and offer magenta toners with high coloring properties.

Quinacridone-based pigments and diketopyrrolopyrrole-based pigments for use as a colorant of the toner of the present invention are preferably represented by formulae (8) and (9) below from the viewpoint of affinity to the pigment dispersant of the present invention:

FORMULA (8)

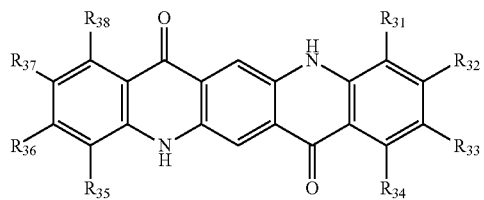

[In formula (8), $R_{31}$ to $R_{38}$ independently represent a hydrogen atom, a chlorine atom, or a methyl group.]

FORMULA (9)

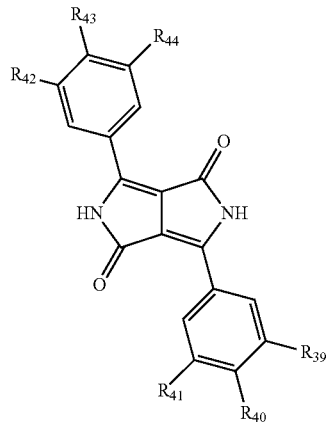

[In formula (9), $R_{39}$ to $R_{44}$ independently represent a hydrogen atom, a chlorine atom, a tert-butyl group, a cyano group, or a phenyl group.]

In formula (8), $R_{31}$ to $R_{38}$ may each be freely selected from the substituents listed above. From the viewpoint of coloring power, $R_{31}$ to $R_{32}$, $R_{34}$ to $R_{36}$, and $R_{38}$ each preferably represent a hydrogen atom. More preferably, $R_{33}$ and $R_{37}$ each represent a hydrogen atom, a chlorine atom or a methyl group.

In formula (9), $R_{39}$ to $R_{44}$ may each be freely selected from the substituents listed above. From the viewpoint of coloring power, $R_{39}$, $R_{41}$ and $R_{42}$, and $R_{44}$ each preferably represent a hydrogen atom. More preferably, $R_{40}$ and $R_{43}$ each represent a hydrogen atom or a phenyl group.

Specific examples of the quinacridone-based pigments represented by formula (8) include C.I. Pigment Red 202, C.I. Pigment Red 122, C.I. Pigment Red 192, and C.I. Pigment Red 209. Specific examples of diketopyrrolopyrrole-based pigments represented by formula (9) include C.I. Pigment Red 255, C.I. Pigment Red 254, and C.I. Pigment Red 264.

In order to obtain a magenta toner having higher coloring power, the magenta pigment used in combination with the compound having an azo skeleton structure of the present invention is preferably C.I. Pigment Red 122, C.I. Pigment Red 202, C.I. Pigment Red 255, or C.I. Pigment Red 264.

These magenta pigments may be used alone or in combination.

The ratio of the content of the magenta pigment to the content of the compound having an azo skeleton structure on a mass basis is preferably in the range of 100:0.1 to 100:100. More preferably, when the specific surface area of the magenta pigment is 300 m$^2$/g or less, this ratio is in the range of 100:0.5 to 100:20 from the viewpoint to dispersibility of the magenta toner.

One or more of the magenta pigments need to be used as the colorant of the toner of the present invention but other colorants may additionally be used as long as the dispersibility of the magenta pigment is not inhibited.

Examples of such colorants that can be additionally used include common magenta colorants.

Examples of the magenta colorant that can be additionally used include fused azo compounds, anthraquinone, basic dye lake compounds, naphthol compounds, benzimidazolone compounds, thioindigo compounds, and perylene compounds. Specific examples thereof include C.I. Pigment Red 2, C.I. Pigment Red 3, C.I. Pigment Red 5, C.I. Pigment Red 6, C.I. Pigment Red 7, C.I. Pigment Red 23, C.I. Pigment Red 48:2, C.I. Pigment Red 48:3, C.I. Pigment Red 48:4, C.I. Pigment Red 57:1, C.I. Pigment Red 81:1, C.I. Pigment Red 144, C.I. Pigment Red 146, C.I. Pigment Red 150, C.I. Pigment Red 166, C.I. Pigment Red 169, C.I. Pigment Red 177, C.I. Pigment Red 184, C.I. Pigment Red 185, C.I. Pigment Red 220, C.I. Pigment Red 221, C.I. Pigment Red 238, and C.I. Pigment Red 269.

The amount of these colorants used differs depending on the type of the colorants. The total colorant content is 0.1 to 60 parts by mass and more preferably 0.5 to 50 parts by mass relative to 100 parts by mass of the binder resin.

During the synthesis of the binder resin, a crosslinking agent may be used to enhance the mechanical strength of the toner particles and control the molecular weight of the molecules constituting the particles.

Examples of the crosslinking agent used in toner particles of the present invention include difunctional crosslinking agents. Examples of the difunctional crosslinking agents include divinylbenzene, bis(4-acryloxypolyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol

200, #400, and #600, dipropylene glycol diacrylate, polypropylene glycol diacrylate, polyester-type diacrylate, and dimethacrylates of these diacrylates.

Examples of the multifunctional crosslinking agent include pentaerythritol triacrylate, trimethylolethane triacrylate, trimethylolpropane triacrylate, tetramethylolmethane tetraacrylate, oligo ester acrylate, and methacrylates thereof, 2,2-bis(4-methacryloxyphenyl)propane, diallyl phthalate, triallyl cyanurate, triallyl isocyanurate, and triallyl trimellitate.

These crosslinking agents are preferably used in an amount in the range of 0.05 to 10 parts by mass and more preferably in an amount in the range of 0.1 to 5 parts by mass relative to 100 parts by mass of the monomer from the viewpoints of fixability of the toner and offset resistance.

A wax component may also be used during synthesis of the binder resin in order to prevent adhesion of the toner to the fixing member.

Examples of the wax component that can be used include petroleum waxes such as paraffin wax, microcrystalline wax, and petrolatum and derivatives thereof, montan wax and derivatives thereof, hydrocarbon wax produced by Fischer-Tropsch processes and derivatives thereof, polyolefin wax such as polyethylene and derivatives thereof, and natural wax such as carnauba wax and candelilla wax and derivatives thereof. Derivatives may refer to oxides, block copolymers with vinyl monomers, and graft modified products. Further examples thereof include alcohols such as higher aliphatic alcohols, fatty acids such as stearic acid and palmitic acid, fatty acid amides, fatty acid esters, hydrogenated castor oil and derivatives thereof, vegetable wax, and animal wax. These may be used alone or in combination.

The total amount of the wax component added is preferably within the range of 2.5 to 15.0 parts by mass and more preferably within the range of 3.0 to 10.0 parts by mass relative to 100 parts by mass of the binder resin. If the amount of wax is smaller than 2.5 parts by mass, oil-less fixing becomes difficult. When the amount exceeds 15.0 parts by mass, the amount of the wax component in the toner particles becomes excessively large, and large quantities of excess wax component may be present on the toner particles surfaces, possibly adversely affecting charging properties.

A charge controller can be blended to the toner of the present invention as needed. The optimum triboelectric charge amount for the development system can be controlled with the charge controller.

Any common charge controller may be used. A charge controller that has high charging speed and is capable of stably retaining a particular amount of charge is preferred. In the case where toner particles are formed directly by polymerization, a charge controller that rarely inhibits polymerization and that is substantially free of matter soluble in water-based dispersion media is particularly preferable.

Examples of the charge controller that negatively charges the toner include polymers or copolymers having a sulfonic acid group, a sulfonic acid base, or a sulfonic acid ester group, salicylic acid derivatives and metal complexes thereof, monoazo metal compounds, acetylacetone metal compounds, aromatic oxycarboxylic acids, aromatic mono- or polycarboxylic acids and metal salts, anhydrides, and esters thereof, phenol derivatives such as bisphenol, urea derivatives, metal-containing naphthoic acid-based compounds, boron compounds, quaternary ammonium salts, calixarene, and resin-based charge controllers. Examples of the charge controller that positively charges the toner include nigrosin and nigrosin products modified with fatty acid metal salts or the like, guanidine compounds, imidazole compounds, tributylbenzylammonium-1-hydroxy-4-naphthosulfonic acid salts, quaternary ammonium salts such as tetrabutylammonium tetrafluoroborate, onium salts such as phosphonium salts of analogs of the foregoing and lake pigments thereof, triphenyl methane dyes and lake pigments thereof (examples of the laking agent include phosphotungstic acid, phosphomolybdic acid, phosphotungstic molybdic acid, tannic acid, lauric acid, gallic acid, ferricyanide, and ferrocyanide), metal salts of higher fatty acids, diorganotin oxides such as dibutyltin oxide, dioctyltin oxide, and dicyclohexyltin oxide, diorganotin borates such as dibutyltin borate and dioctyltin borate, and resin-based charge controllers. These may be used alone or in combination.

An inorganic fine powder serving as a flowing agent may be added to the toner particles of the toner of the present invention. Examples of the inorganic fine powder include silica, titanium oxide, alumina, a complex oxide thereof, and a surface-treated fine powder thereof.

Examples of the method for producing toner particles constituting the toner of the present invention include a grinding method, a suspension polymerization method, a suspension granulation method, and an emulsion polymerization method. From the viewpoints of environmental load during production and controllability of particle size, a production method with which particles are formed in water-based media, such as a suspension polymerization method or a suspension granulation method, is preferred.

In the method for producing toner of the present invention, a compound having an azo skeleton structure and a magenta pigment may be mixed in advance to prepare a pigment composition. In this manner, the dispersibility of the magenta pigment can be improved.

The pigment composition can be produced by a dry process or a wet process. Considering that the compound having an azo skeleton structure has high affinity to water-insoluble solvents, a wet process is preferred since a homogeneous pigment composition can be easily produced. An example of such a method is as follows. A compound having an azo skeleton structure and, if needed, a resin are added to a dispersion medium. A magenta pigment powder is slowly added to the mixture under stirring so that the magenta pigment powder is thoroughly mixed with the dispersion medium. Then mechanical shear force is applied to the resulting mixture with a disperser such as a kneader, a roll mill, a ball mill, a paint shaker, a dissolver, an attritor, a sand mill, or a high-speed mill. As a result, the magenta pigment can be stably and uniformly dispersed into fine particles.

The dispersion medium that can be used in the pigment composition may be any. In order for the compound having an azo skeleton structure to achieve high pigment dispersing effect, the dispersion medium is preferably a water-insoluble solvent. Examples of the water-insoluble solvent include esters such as methyl acetate, ethyl acetate, and propyl acetate, hydrocarbons such as hexane, octane, petroleum ethers, cyclohexane, benzene, toluene, and xylene, and halogen-containing hydrocarbon such as carbon tetrachloride, trichloroethylene, and tetrabromoethane.

The dispersion medium that can be used in the pigment composition may be a polymerizable monomer. Examples thereof include styrene, α-methylstyrene, α-ethylstyrene, o-methylstyrene, m-methylstyrene, p-methylstyrene, p-methoxystyrene, p-phenylstyrene, p-chlorostyrene, 3,4-dichlorostyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, ethylene, propylene, butylene, isobutylene, vinyl chloride, vinylidene chloride, vinyl bromide, vinyl iodide, vinyl acetate, vinyl propionate, vinyl benzoate, methacrylic acid, methyl methacrylate, ethyl methacrylate, propyl methacrylate, butyl methacrylate, n-octyl methacrylate, dodecyl methacrylate, 2-ethylhexyl methacrylate, stearyl methacrylate, behenyl methacrylate, phenyl methacrylate, dimethylaminoethyl methacrylate, diethylaminoethyl methacrylate, acrylic acid, methyl acrylate, ethyl acrylate, n-butyl acrylate, isobutyl acrylate, propyl acrylate, n-octyl acrylate, dodecyl acrylate, 2-ethylhexyl acrylate, stearyl acrylate, behenyl acrylate, 2-chloroethyl acrylate, phenyl acrylate, vinyl methyl ether, vinyl ethyl ether, vinyl isobutyl ether, vinyl methyl ketone, vinyl hexyl ketone, methyl isopropenyl ketone, vinyl naphthalene, acrylonitrile, methacrylonitrile, and acrylamide.

Examples of the resin that can be used in the pigment composition are the same as those that can be used as the binder resin for the toner of the present invention. Examples thereof include styrene-methacrylic acid copolymers, styrene-acrylic acid copolymers, polyester resins, epoxy resins, and styrene-butadiene copolymers. Two or more of these dispersion media may be mixed and used. The pigment composition can be isolated by a common method, for example, filtration, decantation, or centrifugation. The solvent may be removed by washing.

An auxiliary agent may be added to the pigment composition during production. Examples of the auxiliary agent include a surfactant, a dispersant, a filler, a standardizer, a resin, a wax, a defoaming agent, an antistatic agent, an antidust agent, an extender, a shading colorant, a preservative, a drying inhibitor, a rheology controller, a humectant, an antioxidant, a UV absorber, a photostabilizer, and any combination of these. The compound having an azo skeleton structure may be added in advance during production of the bulk pigment.

Toner particles are produced by a suspension polymerization method in the following manner, for example. The pigment composition described above, a polymerizable monomer, a wax component, a polymerization initiator, and the like are mixed to prepare a polymerizable monomer composition. Then the polymerizable monomer composition is dispersed in a water-based medium to form particles of the polymerizable monomer composition. Then the polymerizable monomer in the particles of the polymerizable monomer composition is polymerized in the water-based medium so as to obtain toner particles.

The polymerizable monomer composition in the above-described step may be prepared by mixing a dispersion prepared by dispersing the pigment composition in a first polymerizable monomer with a second polymerizable monomer. In other words, the pigment composition is thoroughly dispersed in the first polymerizable monomer and then mixed with the second polymerizable monomer along with other toner materials so that the magenta pigment can be more satisfactorily dispersed in the toner particles.

Commonly used polymerization initiators can be used as the polymerization initiator used in the suspension polymerization method described above. Examples thereof include azo compounds, organic peroxides, inorganic peroxides, organic metal compounds, and photopolymerization initiators. Specific examples thereof include azo-based polymerization initiators such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl-2,2'-azobis (isobutyrate), organic peroxide-based polymerization initiators such as benzoyl peroxide, di-tert-butyl peroxide, tert-butyl peroxyisopropyl monocarbonate, tert-hexylperoxy benzoate, and tert-butylperoxy benzoate, inorganic peroxide-based polymerization initiators such as potassium persulfate and ammonium persulfate, and initiators based on hydrogen peroxide-ferrous iron, BPO-dimethylaniline, and cerium(IV) salt-alcohol. Examples of the photopolymerization initiator include acetophenones, benzoin ethers, and ketals. These polymerization initiators may be used alone or in combination.

The concentration of the polymerization initiator is preferably 0.1 to 20 parts by mass and more preferably 0.1 to 10 parts by mass relative to 100 parts by mass of the polymerizable monomer. The type of the polymerization initiator depends on the polymerization method. One or a mixture of two or more polymerization initiators is used by considering the 10 hour half-life temperature.

The water-based medium used in the suspension polymerization method above may contain a dispersion stabilizer. Any common inorganic or organic dispersion stabilizer can be used as the dispersion stabilizer. Examples of the inorganic dispersion stabilizer include calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, and alumina. Examples of the organic dispersion stabilizer include polyvinyl alcohol, gelatin, methyl cellulose, methylhydroxypropyl cellulose, ethyl cellulose, sodium salts of carboxymethyl cellulose, and starch. A nonionic, anionic, or cationic surfactant can also be used. Examples thereof include sodium dodecyl sulfate, sodium tetradecyl sulfate, sodium pentadecyl sulfate, sodium octyl sulfate, sodium oleate, sodium laurate, potassium stearate, and calcium oleate.

Of the dispersion stabilizers listed above, sparingly water-soluble inorganic dispersion stabilizers soluble in acids are preferably used in the present invention. In preparing a water-based dispersion medium by using a sparingly water-soluble inorganic dispersion stabilizer in the present invention, 0.2 to 2.0 parts by mass of the dispersion stabilizer may be used relative to 100 parts by mass of the polymerizable monomer from the viewpoint of stability of droplets of the polymerizable monomer composition in the water-based medium. In the present invention, 300 to 3000 parts by mass of water may be used relative to 100 parts by mass of the polymerizable monomer composition to prepare a water-based medium.

In preparing a water-based medium in which the sparingly water-soluble inorganic dispersion stabilizer is dispersed, a commercially available dispersion stabilizer may be directly used to conduct dispersion. However, it is preferable that the sparingly water-soluble inorganic dispersion stabilizer is generated in water under high speed stirring. In this case, dispersion stabilizer particles, that are fine and have uniform particle size, can be obtained. For example, when calcium phosphate is used as the dispersion stabilizer, an aqueous sodium phosphate solution and an aqueous calcium chloride solution may be mixed and stirred at high speed to form fine particles of calcium phosphate. As a result, a desired dispersion stabilizer can be obtained.

Toner particles of the present invention can also be obtained by a suspension granulation method. Since the production process of the suspension granulation method does not include a heating step, the resin and the wax component are suppressed from becoming compatible to each other which would otherwise be the case when a low melting point wax is used, and the decrease in glass transition temperature of the toner caused by becoming compatible can be prevented. The suspension granulation method allows a wide range of options of toner materials for the binder resin and it is easy to use a polyester resin, which is generally considered as offering good fixability, as a main component. Accordingly, the suspension granulation method is advantageous in producing a toner that has a resin composition not suitable for a suspension polymerization method.

Toner particles are produced by the suspension granulation method described above in the following manner. First, the pigment composition, a binder, resin, a wax component, and the like are mixed in a solvent to prepare a solvent composition. The solvent composition is dispersed in a water-based medium to form particles of the solvent composition and to thereby obtain a toner particle suspension. The suspension is heated or evacuated to remove the solvent to obtain toner particles.

The solvent composition in the above-described step may be prepared by mixing a dispersion prepared by dispersing the pigment composition in a first solvent with a second solvent. In other words, the pigment composition is thoroughly dispersed in the first solvent and then mixed with the second solvent along with other toner materials so that the magenta pigment can be more satisfactorily dispersed in the toner particles.

Examples of the solvent that can be used in the suspension granulation method include hydrocarbons such as toluene, xylene, and hexane, halogen-containing hydrocarbons such as methylene chloride, chloroform, dichloroethane, trichloroethane, and carbon tetrachloride, alcohols such as methanol, ethanol, butanol, and isopropyl alcohol, polyhydric alcohols such as ethylene glycol, propylene glycol, diethylene glycol, and triethylene glycol, cellosolves such as methyl cellosolve and ethyl cellosolve, ketones such as acetone, methyl ethyl ketone, and methyl isobutyl ketone, ethers such as benzyl alcohol ethyl ether, benzyl alcohol isopropyl ether, and tetrahydrofuran, and esters such as methyl acetate, ethyl acetate, and butyl acetate. These may be used alone or as a mixture of two or more. Among these, a solvent that has a low boiling point and is capable of sufficiently dissolving the binder resin is preferred in order to facilitate removal of the solvent from the toner particle suspension.

The amount of the solvent used is preferably in the range of 50 to 5000 parts by mass and more preferably in the range of 120 to 1000 parts by mass relative to 100 parts by mass of the binder resin.

The water-based medium used in the suspension granulation method described above may contain a dispersion stabilizer. Any common inorganic or organic dispersion stabilizer can be used as the dispersion stabilizer. Examples of the inorganic dispersion stabilizer include calcium phosphate, calcium carbonate, aluminum hydroxide, calcium sulfate, and barium carbonate. Examples of the organic dispersion stabilizer include surfactants such as polyvinyl alcohol, methyl cellulose, hydroxyethyl cellulose, ethyl cellulose, sodium salts of carboxymethyl cellulose, water-soluble polymers such as polysodium acrylate and polysodium methacrylate, anionic surfactants such as sodium dodecylbenzenesulfonate, sodium octadecyl sulfate, sodium oleate, sodium laurate, and potassium stearate, cationic surfactants such as lauryl amine acetate, stearyl amine acetate, and lauryl trimethyl ammonium chloride, amphionic surfactants such as lauryldimethylamine oxide, and nonionic surfactants such as polyoxyethylene alkyl ether, polyoxyethylene alkyl phenyl ether, and polyoxyethylene alkyl amine.

Relative to 100 parts by mass of the binder resin, 0.01 to 20 parts by mass of the dispersant may be used from the viewpoint of stability of the droplets of the solvent composition in the water-based medium.

The weight-average particle size (hereinafter "D4) of the toner of the present invention is within the range of 3.00 to 15.0 μm and more preferably within the range of 4.00 to 12.0 μm. A high-definition image can be easily obtained while maintaining charge stability if the particle size is within this range.

The ratio of D4 of the toner to the number-average particle size (hereinafter "D1") (hereinafter this ratio is referred to as D4/D1) is 1.35 or less and preferably 1.30 or less in order to suppress fogging and improve transfer efficiency while maintaining high resolution.

D4 and D1 of the toner of the present invention are adjusted in different ways depending on the method for producing the toner particles. In the case where a suspension polymerization method is used to produce toner particles, D4 and D1 can be adjusted by controlling, for example, the dispersant concentration used in preparing the water-based dispersion medium, the rate of stirring during the reaction, and the time of stirring during the reaction.

The toner of the present invention may be magnetic or nonmagnetic. If a magnetic toner is to be used, a magnetic material may be mixed with the toner particles of the toner of the present invention. Examples of the magnetic material include iron oxides such as magnetite, maghemite, and ferrite, iron oxides containing other metal oxides, metals such as Fe, Co, and Ni, and alloys and mixtures of these metals with Al, Co, Cu, Pb, Mg, Ni, Sn, Zn, Sb, Be, Bi, Cd, Ca, Mn, Se, Ti, W, and V. The magnetic material most suited for the purposes of the present invention is fine powder of triiron tetraoxide or γ-diiron trioxide.

These magnetic materials preferably have an average particle size of 0.1 to 2 μm and more preferably 0.1 to 0.3 μm, and preferably exhibit a coercive force of 1.6 to 12 kA/m, a saturation magnetization of 5 to 200 $Am^2/kg$ and more preferably 50 to 100 $Am^2/kg$, and a residual magnetization of 2 to 20 $Am^2/kg$ under application of a 795.8 kA/m magnetic field from the viewpoint of development properties of the toner.

To 100 parts by mass of the binder resin, 10 to 200 parts by mass and preferably 20 to 150 parts by mass of the magnetic material is used.

EXAMPLES

The present invention will now be described in further detail by using Examples and Comparative Examples. The present invention is not limited by the examples below. In the description below, "part" and "%" are on a mass basis unless otherwise noted.

The measurement methods employed in the synthetic examples are as follows.

(1) Determination of Molecular Weight

The molecular weight of a compound having a polymer portion and an azo skeleton structure was calculated on a polystyrene basis by size exclusion chromatography (SEC). The molecular weight was determined by SEC as follows.

A sample was added to an eluent described below so that the sample concentration was 1.0% to prepare a solution. The solution was left standing still for 24 hours at room temperature and filtered through a solvent-resistant membrane filter with a 0.2 μm pore size to prepare a sample solution. The sample solution was measured under the following conditions.

Instrument: High speed GPC device HLC-8220GPC [produced by Tosoh Corporation]
Column: Two column combination of LF-804
Eluant: THF
Flow rate: 1.0 ml/min Oven temperature: 40° C.
Amount of injected sample: 0.025 ml In calculating the molecular weight of the sample, molecular weight calibration curves obtained from standard polystyrene resins [products of Tosoh Corporation, TSK standard polystyrene F-850, F-450, F-288, F-128, F-80, F-40, F-20, F-10, F-4, F-2, F-1, A-5000, A-2500, A-1000, and A-500] were used.

(2) Acid Value Measurement

The acid value of the compound having a polymer portion and an azo skeleton structure was determined by the following method.

The basic procedure was carried out according to JIS K-0070.

1) First, 0.5 to 2.0 g of the sample is accurately weighed. This mass is assumed to be M (g).
2) The sample is placed in a 50 ml beaker and dissolved by addition of 25 ml of a tetrahydrofuran/ethanol (2:1) mixed solution.
3) Titration is conducted with a potentiometric titrator by using a 0.1 mol/l ethanol solution of KOH. For example, automatic titrator COM-2500 produced by Hiranuma Sangyo Corporation can be used.
4) The amount of the KOH solution used in this step is assumed to be S (ml). At the same time, the blank is measured and the amount of the KOH solution used is assumed to be B (ml).

5) The acid value is calculated by the following formula where f represents a factor of the KOH solution.

$$Acidvalue[\text{mg KOH/g}] = \frac{(S-B) \times f \times 5.61}{M}$$

(3) Composition Analysis

The structure of the compound having a polymer portion and an azo skeleton structure is identified by using the following instrument.

$^1$H NMR

ECA-400 produced by JEOL Ltd. (solvent used: deuterated chloroform)

Example 1

A compound having an azo skeleton was obtained through the following method.

Production Example of Compound (116)

A compound (116) having an azo skeleton represented by structural formula below was produced by the following scheme.

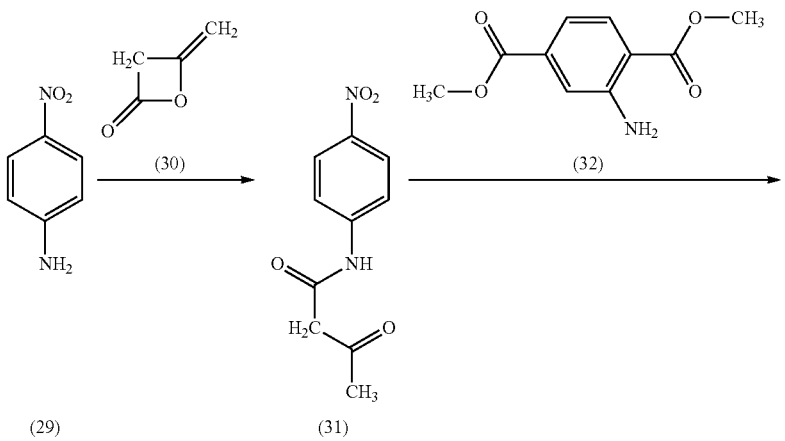

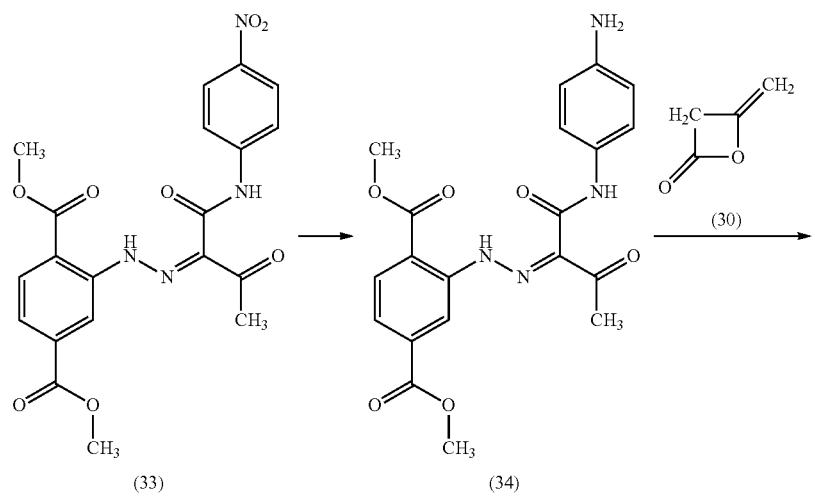

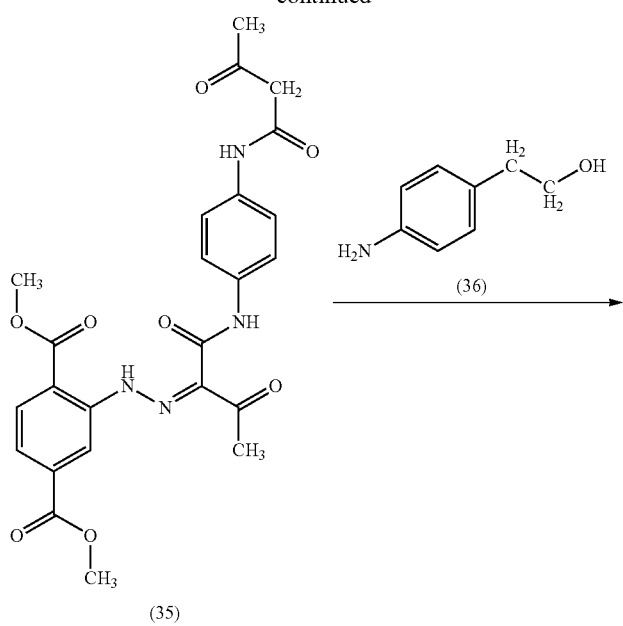
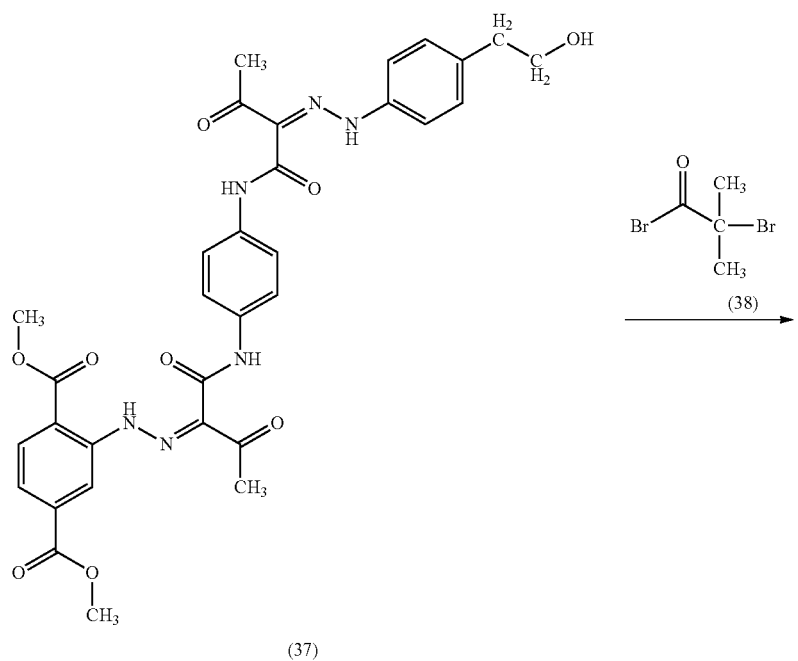

-continued

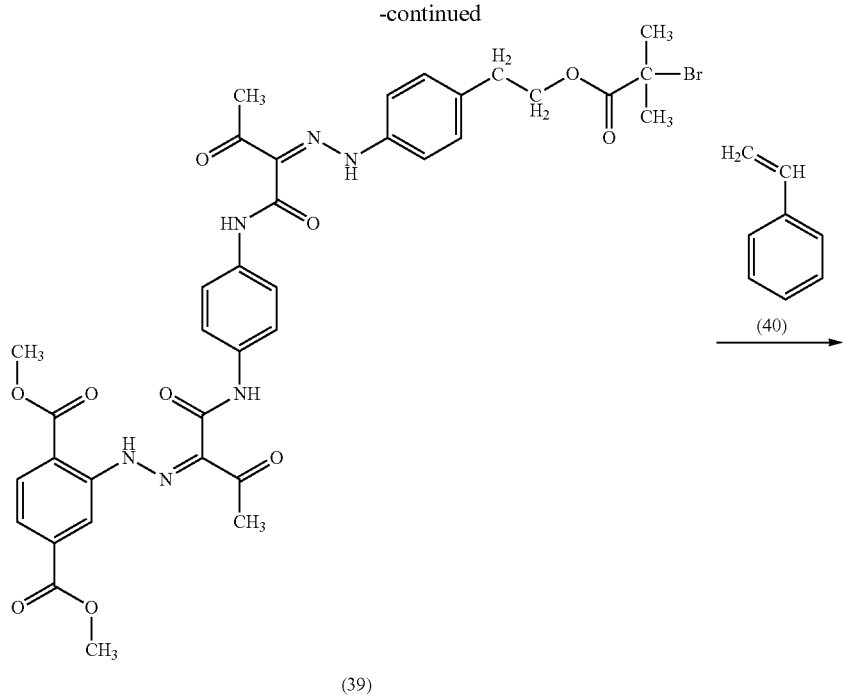

(39)

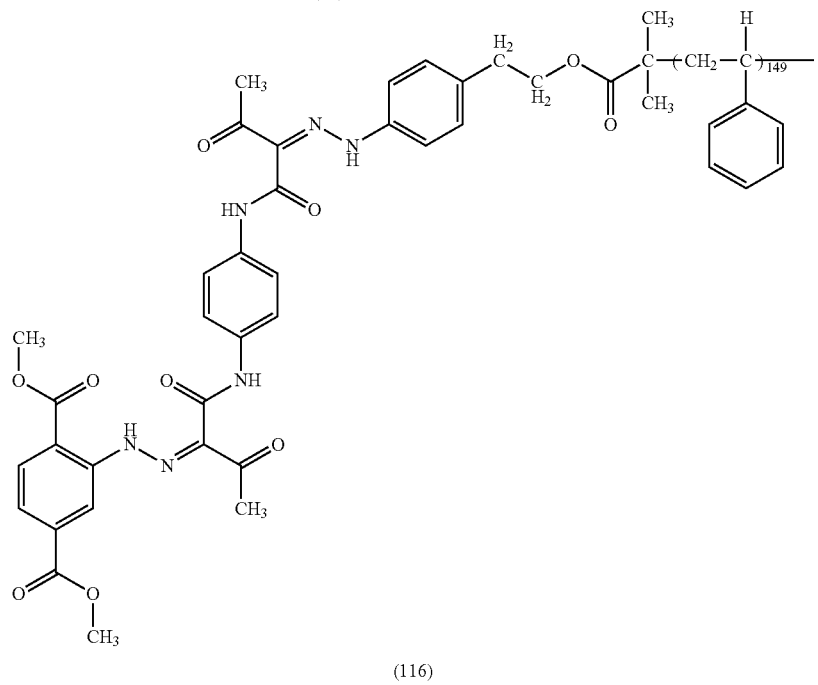

(116)

First, 3.11 parts of p-nitroaniline (29) was added to 30 parts of chloroform, the mixture was cooled with ice to 10° C. or lower, and 1.89 parts of diketene (30) was added thereto, followed by stirring for 2 hours at 65° C. After completion of the reaction, chloroform extraction and condensation were performed to obtain 4.70 parts (yield: 94.0%) of a compound (31).

Next, 40.0 parts of methanol and 5.29 parts of concentrated hydrochloric acid were added to 4.25 parts of dimethyl 2-aminoterephthalate (32) and the mixture was cooled with ice to 10° C. or lower. To the resulting solution, 2.10 parts of sodium nitrite dissolved in 6.00 parts of water was added and the reaction was carried out at the same temperature for 1 hour. Next, 0.990 parts of sulfamic acid was added thereto, followed by stirring for 20 minutes (diazonium salt solution). To 70.0 of methanol, 4.51 parts of the compound (31) was added. The mixture was cooed with ice to 10° C. or lower and the diazonium salt solution was added to the mixture. Thereto, 5.83 parts of sodium acetate dissolved in 7.00 parts of water was added and the reaction was carried out for 2 hours at 10° C. or lower. After completion of the reaction, 300 parts of water was added and stirring was conducted for 30 minutes. Solid matter was filtered out and purified by a recrystallization method in N,N-dimethylformamide. As a result, 8.71 parts (yield: 96.8%) of a compound (33) was obtained.

Next, 8.58 parts of the compound (33) and 0.40 parts of palladium-active carbon (5% palladium) were added to 150 parts of N,N-dimethylformamide and the resulting mixture was stirred in a hydrogen gas atmosphere (reaction pressure: 0.1 to 0.4 MPa) at 40° C. for 3 hours. After completion of the reaction, the solution was filtered and condensed to obtain 6.99 parts (yield: 87.5%) of a compound (34).

Next, 6.50 parts of the compound (34) was added to 30.0 parts of chloroform and the resulting mixture was cooled with ice to 10° C. or lower. To the mixture, 0.95 parts of diketene (30) was added, followed by stirring at 65° C. for 2 hours. After completion of the reaction, chloroform extraction and condensation were conducted to obtain 7.01 parts (yield: 94.2%) of an azo compound intermediate (35).

Next, 15.0 parts of methanol and 1.48 parts of concentrated hydrochloric acid were added to 1.78 parts of 2-(4-aminophenyl)ethanol (36) and the resulting mixture was cooed with ice to 10° C. or lower. To the resulting solution, 1.08 parts of sodium nitrite dissolved in 3.00 parts of water was added and the reaction was carried out at the same temperature for 1 hour. To the resulting solution, 0.380 parts of sulfamic acid was added, followed by further stirring for 20 minutes (diazonium salt solution). To 70.0 parts of N,N-dimethylformamide, 7.18 parts of potassium carbonate dissolved in 7.00 parts of water and 6.50 parts of the compound (35) were added. The resulting mixture was cooled with ice to 10° C. or lower and the diazonium salt solution was added thereto. The reaction was carried out for 2 hours at 10° C. or lower. After completion of the reaction, 300 parts of water was added, followed by stirring for 30 minutes. Solid matter was filtered out and purified by a recrystallization method from N,N-dimethylformamide. As a result, 7.62 parts (yield: 91.0%) of a compound (37) was obtained.

Next, 2.00 parts of the compound (37) was added to 20.0 parts of chloroform. The resulting mixture was cooled with ice to 10° C. or lower and 0.855 parts of 2-bromoisobutyrylbromide (38) was added thereto, followed by stirring at 65° C. for 2 hours. After completion of the reaction, chloroform extraction and condensation were conducted to obtain 2.26 parts (yield: 92.0%) of an intermediate (39).

Next, 0.684 parts of the compound (39), 27.3 parts of styrene (40), 0.305 parts of N,N,N',N'',N''-pentamethyldiethylenetriamine, and 0.124 parts of copper(I) bromide were added to 10.0 parts of N,N-dimethylformamide. Then stirring was conducted in a nitrogen atmosphere at 100° C. for 7.5 hours. After completion of the reaction, chloroform extraction and purification through methanol reprecipitation were conducted to obtain 8.50 parts (yield: 85.0%) of a compound (116).

The product obtained as such was analyzed by the instruments described above to confirm the structure. The analytic results are as follows.

Analytic Results of the Compound (116) Having an Azo Skeleton

[1] Results of Molecular Weight Measurement (GPC)
Weight-average molecular weight (Mw)=15117, number-average molecular weight (Mn)=12910

[2] Results of Acid Value Measurement
0 mgKOH/g

[3] Results of $^1$H NMR (400 MHz, CDCl$_3$, Room Temperature) (See FIG. 1)
δ [ppm]=15.65 (s, 1H), 14.77 (s, 1H), 11.40 (s, 1H), 11.41 (s, 1H), 8.62 (s, 1H), 8.15 (d, 1H), 7.79 (d, 1H), 7.74 (d, 2H), 7.64 (d, 2H), 7.37-6.27 (m, 738H), 4.07 (s, 3H), 3.98 (s, 3H), 3.73 (br, 2H), 2.72-2.52 (m, 9H), 2.47-1.05 (m, 458H), 1.01-0.78 (m, 6H)

Production Example of Compound (129)
A compound (129) having an azo skeleton was produced by the following scheme.

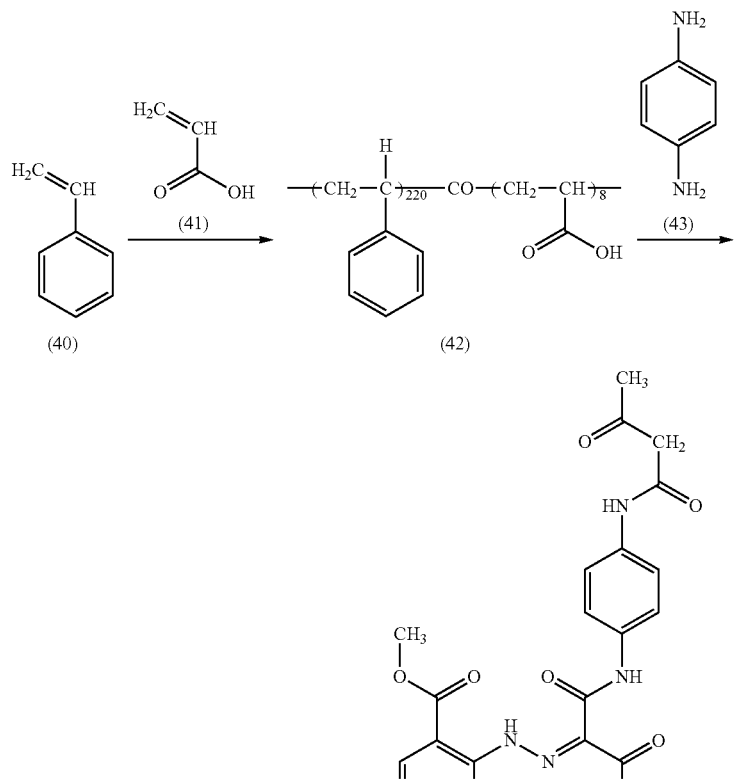

-continued

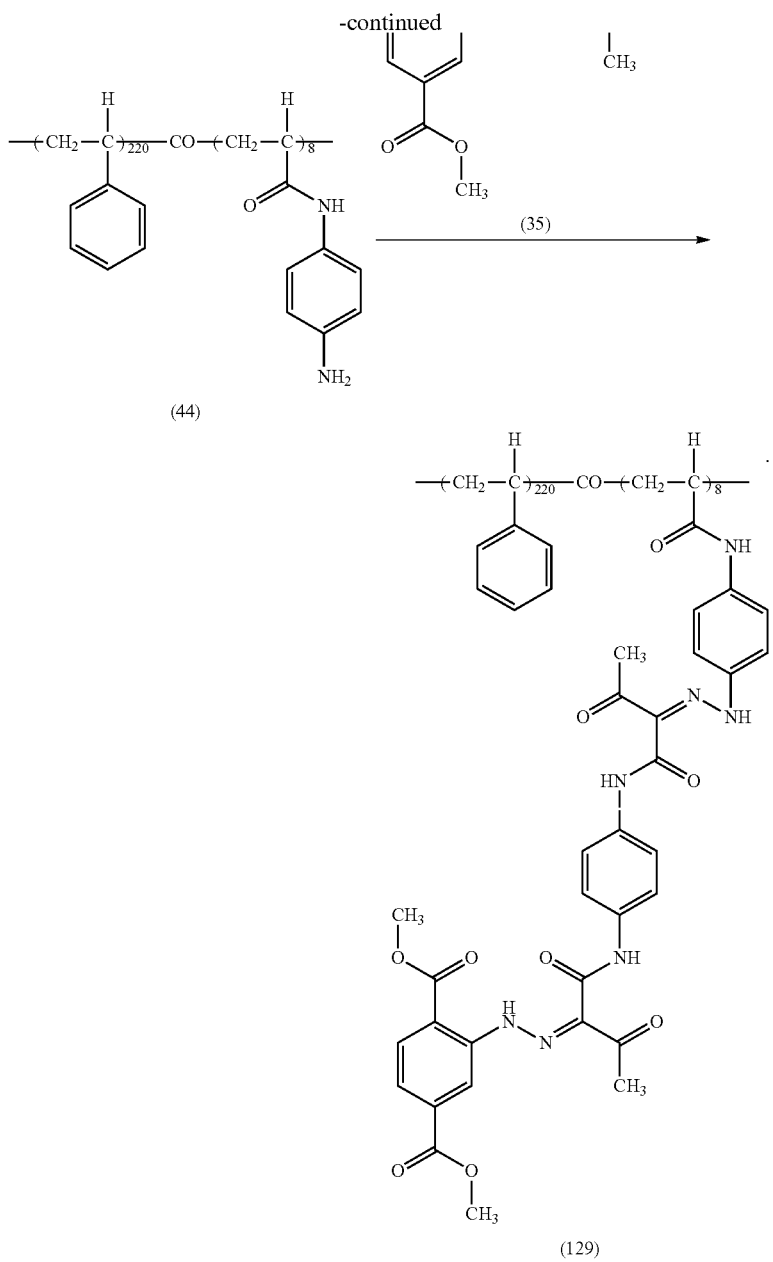

First, 100 parts of propylene glycol monomethyl ether was heated under nitrogen purge and refluxed at a liquid temperature of 120° C. or higher. Thereto, a mixture of 190 parts of styrene (40), 10.0 parts of acrylic acid (41), and 1.00 part of tert-butylperoxybenzoate [organic peroxide-based polymerization initiator produced by NOF Corporation, trade name: PERBUTYL Z] was added dropwise for 3 hours. After completion of the dropwise addition, the solution was stirred for 3 hours and distilled at normal pressure while heating the solution to a liquid temperature of 170° C. After reaching the liquid temperature of 170° C., distillation was conducted at a reduced pressure of 1 hPa for 1 hour to remove the solvent and obtain a resin solid product. The solid product was dissolved in tetrahydrofuran and purified by reprecipitation in n-hexane to obtain 185 parts (yield: 92.5%) of a compound (42).

To 15.0 parts of chloroform, 3.00 parts of the compound (42) and 184 parts of oxalyl chloride were added, followed by stirring in a nitrogen gas atmosphere at room temperature for 5 hours. To the resulting solution, 0.644 parts of p-phenylenediamine (43) dissolved in 10.0 parts of chloroform and 5.00 parts of N,N-dimethylformamide was added dropwise, followed by stirring in a nitrogen gas atmosphere at room temperature for 2 hours. After completion of the reaction, the solution was fractionated with chloroform/water, condensed, and purified through reprecipitation in methanol. As a result, 2.98 parts (yield: 90.3%) of a compound (44) was obtained.

Next, 10.0 parts of tetrahydrofuran and 0.252 parts of concentrated hydrochloric acid were added to 1.00 part of the compound (44) and the resulting mixture was cooled with ice to 0° C. or lower. To this solution, 0.0900 parts of sodium nitrite dissolved in 0.270 parts of water was added and the reaction was carried out at the same temperature for 1 hour. Then 0.063 parts of sulfamic acid was added, followed by further stirring for 20 minutes (diazonium salt solution). To 15.0 parts of N,N-dimethylformamide, 0.446 parts of potassium carbonate dissolved in 1.50 parts of water and 0.354 parts of the compound (35) were added. The resulting mixture was cooled with ice to 10° C. or lower, the diazonium salt solution was added thereto, and the reaction was carried out at 10° C. or lower for 4 hours. After completion of the reaction, 300 parts of water was added, followed by stirring for 30 minutes. Solid matter was filtered out, dissolved in chloroform, and purified through reprecipitation in methanol. As a result, 0.970 parts (yield: 97.0%) of a compound (129) was obtained.

The product obtained as such was analyzed by the instruments described above to confirm the structure. The analytic results are as follows.

Analytic Results of the Compound (129) Having an Azo Skeleton

[1] Results of Molecular Weight Measurement (GPC)

Weight-average molecular weight (Mw)=32442, number-average molecular weight (Mn)=18329

[2] Results of Acid Value Measurement 0 mgKOH/g

Figure 2:
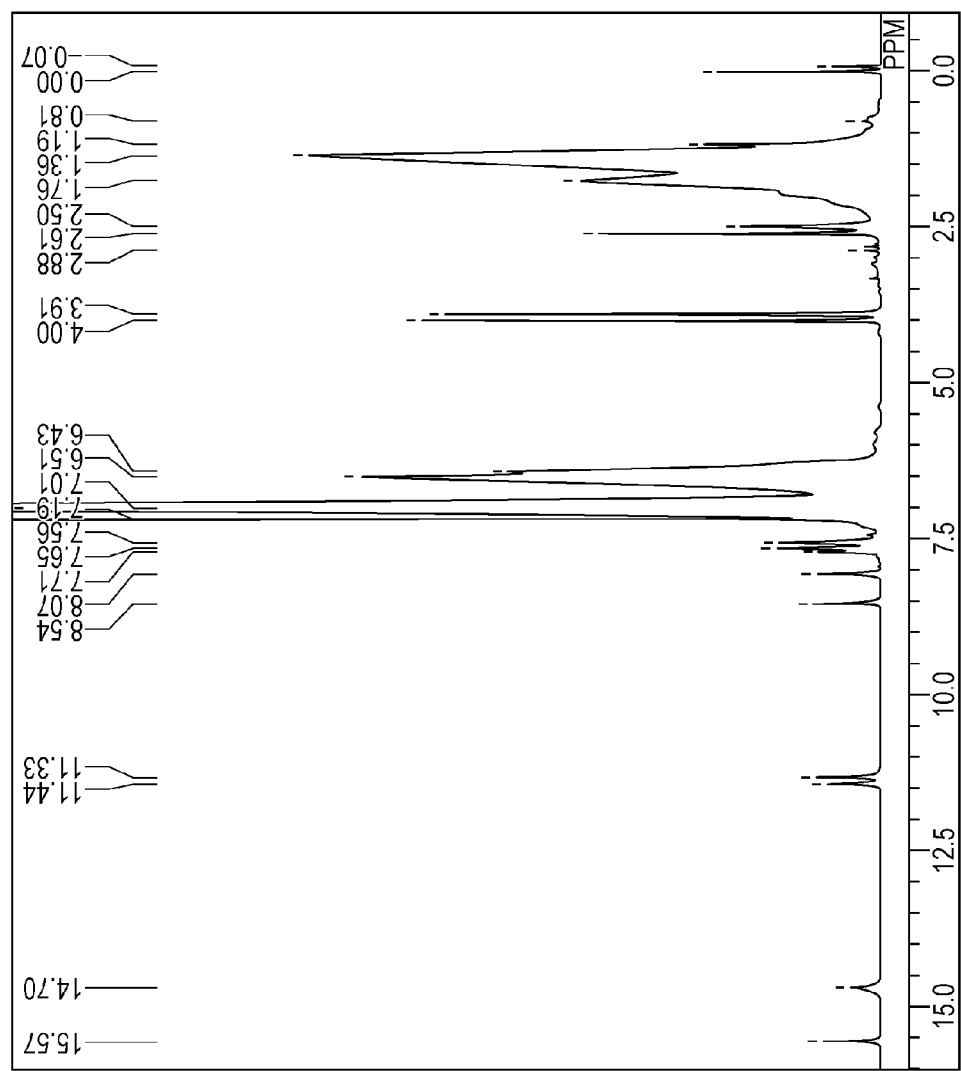
FIG. 2 is a graph showing a $^1$H NMR spectrum of a compound (129) having an azo skeleton in $CDCl_3$ at room temperature at 400 MHz.

[3] Results of $^1$H NMR (400 MHz, CDCl$_3$, Room Temperature) (See FIG. 2)

δ [ppm]=15.57 (s, 1H), 14.70 (s, 1H), 11.44 (s, 1H), 11.33 (s, 1H), 8.54 (s, 1H), 8.07 (d, 1H), 7.71 (d, 1H), 7.65 (d, 2H), 7.56 (d, 2H), 7.19-6.43 (m, 136H), 4.00 (s, 3H), 3.91 (s, 3H), 2.61 (s, 3H), 2.50 (s, 3H), 1.76-0.81 (m, 97H)

Production Example of Compound (174)

A compound (174) having an azo skeleton was produced by the following scheme.

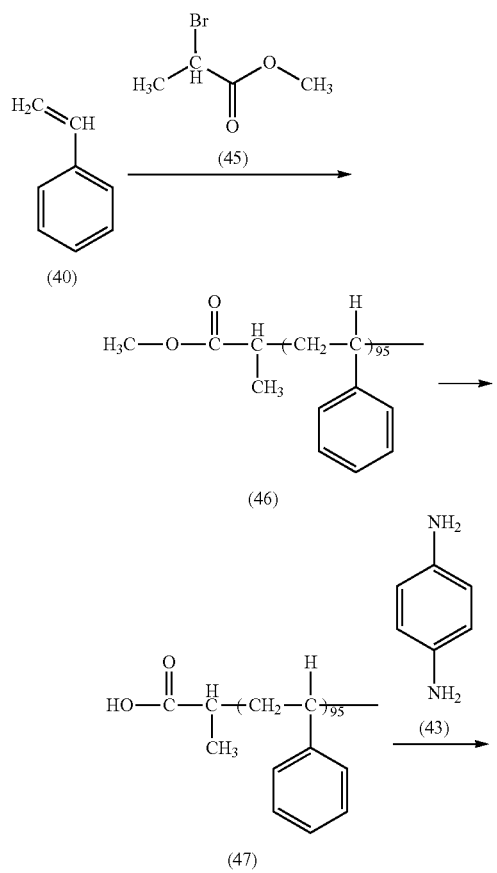

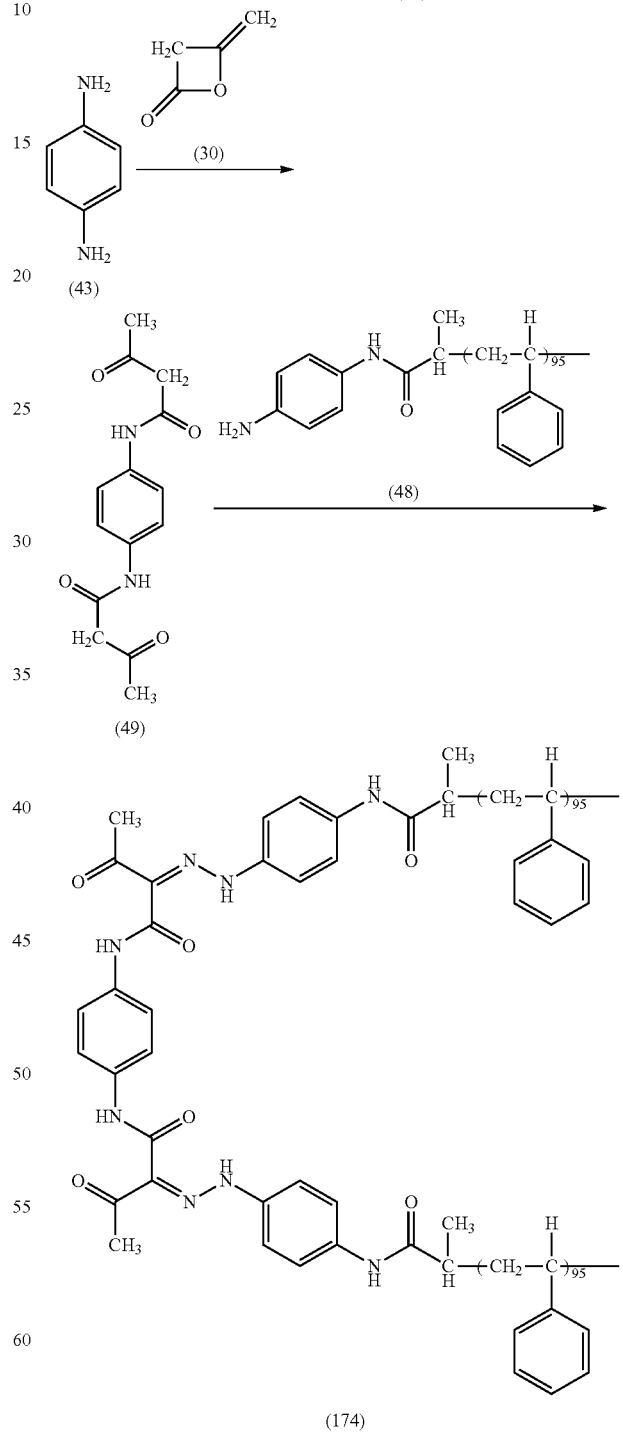

To 0.395 parts of methyl 2-bromopropionate (45), 60.0 parts of styrene (40), 1.47 parts of N,N,N',N'',N''-pentamethyldiethylenetriamine, and 0.493 parts of copper(I) bromide were added, followed by stirring in a nitrogen gas atmosphere at 100° C. for 5 hours. After completion of the reaction, chloroform extraction and purification through reprecipitation in methanol were conducted. As a result, 52.4 parts (yield: 81.9%) of a compound (46) was obtained.

To 150 parts of dioxane, 1.00 parts of the compound (46) was added. The resulting mixture was stirred at 110° C. and a mixture of 5.00 parts of concentrated hydrochloric acid and 30 parts of dioxane was added thereto, followed by stirring in a nitrogen gas atmosphere at 110° C. for 5 hours. After completion of the reaction, chloroform extraction and purification through reprecipitation in methanol were conducted. As a result, 0.98 parts (yield: 98.0%) of a compound (47) was obtained.

Next, 1.00 parts of the compound (47) and 0.0160 parts of oxalyl chloride were added to 5.00 parts of chloroform and the resulting mixture was stirred in a nitrogen gas atmosphere at room temperature for 5 hours. To the resulting solution, 0.0670 parts of p-phenylenediamine (43) dissolved in 10.0 of chloroform and 5.00 parts of N,N-dimethylformamide was added dropwise, followed by stirring in a nitrogen gas atmosphere at 60° C. for 2 hours. After completion of the reaction, the solution was fractionated with chloroform/water, condensed, and purified through reprecipitation in methanol. As a result, 0.970 parts (yield: 97.0%) of a compound (48) was obtained.

Next, 50.0 parts of p-phenylenediamine (43) and 35.0 parts of acetone were added to 300 parts of chloroform. The resulting mixture was cooled with ice to 10° C. or lower and 72.0 parts of diketene (30) was added thereto, followed by stirring at 65° C. for 2 hours. After completion of the reaction, chloroform extraction and condensation were conducted to obtain 121 parts (yield: 97.4%) of a compound (49).

Next, to 4.00 parts of the compound (49), 40.0 parts of THF and 0.127 parts of concentrated hydrochloric acid were added, and the resulting mixture was cooled with ice to 10° C. or lower. To the resulting solution, 0.005 parts of sodium nitrite dissolved in 1.70 parts of water was added and the reaction was carried out at the same temperature for 1 hour. Then 0.0320 parts of sulfamic acid was added, followed by further stirring for 20 minutes (diazonium salt solution). To 70.0 parts of methanol, 0.230 parts of the potassium sulfate dissolved in 1.00 part of water, and 0.0460 parts of the compound (48) were added and the resulting mixture was cooled with ice to 10° C. or lower. The diazonium salt solution was added thereto and the reaction was carried out at 10° C. or lower for 2 hours. After completion of the reaction, 300 parts of water was added thereto, followed by stirring for 30 minutes. Solid matter was filtered out and purified through reprecipitation in methanol. As a result, 3.80 parts (yield: 95.0%) of a compound (174) was obtained.

Analytic Results of the Compound (174) Having an Azo Skeleton

[1] Results of Molecular Weight Measurement (GPC)

Weight-average molecular weight (Mw)=31686, number-average molecular weight (Mn)=22633

[2] Results of Acid Value Measurement 0 mgKOH/g

Figure 3:
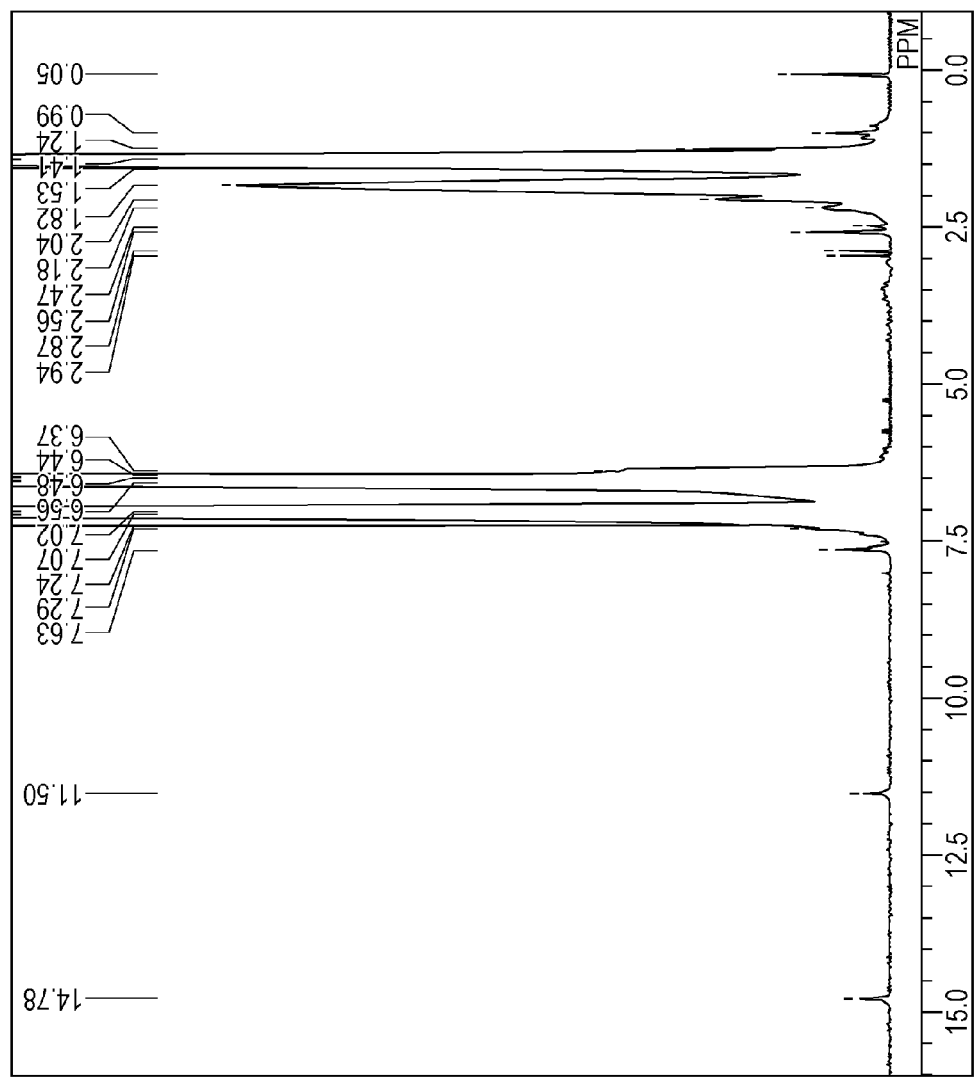
FIG. 3 is a graph showing a $^1$H NMR spectrum of a compound (174) having an azo skeleton in CDCl$_3$ at room temperature at 400 MHz.

[3] Results of $^1$H NMR (400 MHz, CDCl$_3$, Room Temperature) (See FIG. 3)

δ [ppm]=14.78 (s, 2H), 11.50 (s, 2H), 7.63 (d, 4H), 7.29-6.37 (m, 1192H), 2.56 (s, 6H), 2.18-0.99 (m, 839H)

Production Example of Compound (176)

A compound (176) having an azo skeleton represented by a structure below was produced by the following scheme.

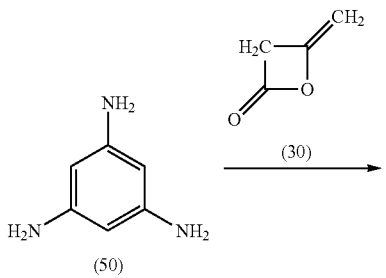

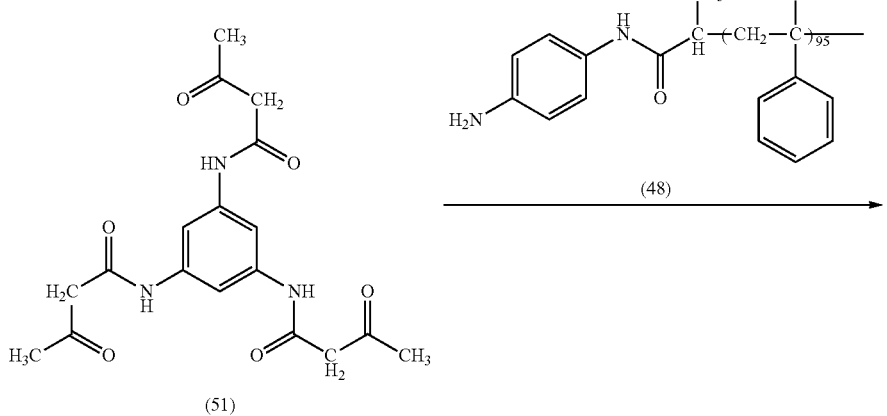

-continued

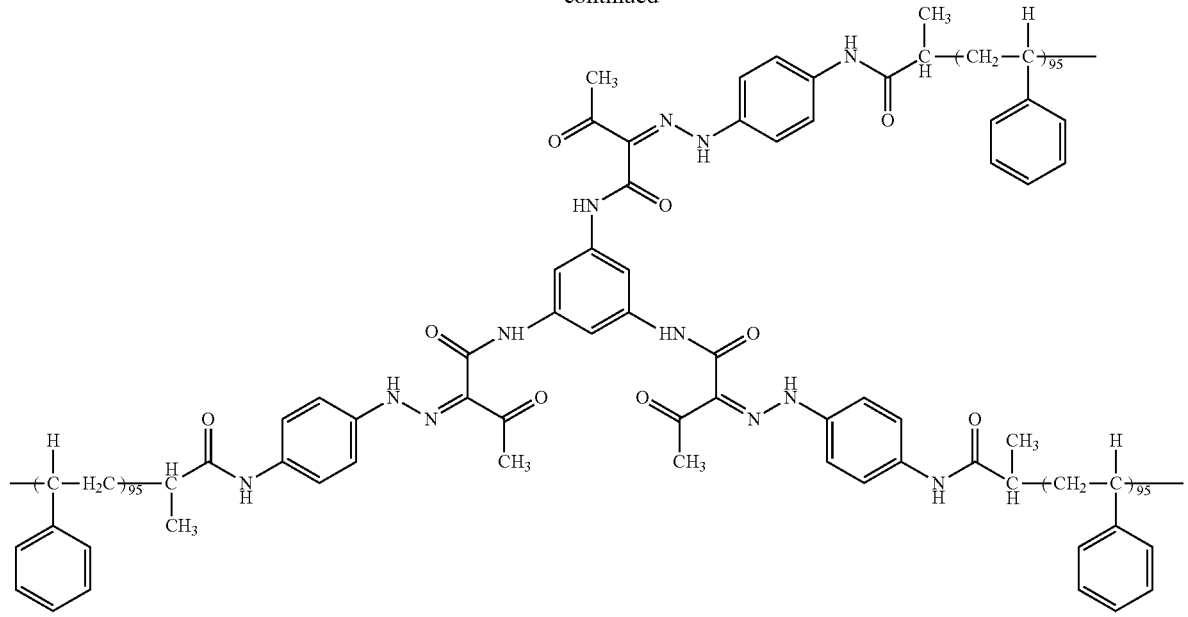

First, a compound (48) was obtained by the same operation as Production Example of compound (174).

Next, to 10.0 parts of N,N-dimethylformamide, 0.500 parts of 1,3,5-triaminobenzene (50) and 0.345 parts of triethylamine were added, followed by stirring at room temperature. Next, 0.949 parts of diketene (30) was added thereto, followed by stirring at 50° C. for 2 hours. After completion of the reaction, 300 parts of water was added, followed by stirring for 30 minutes and solid matter was filtered out. As a result, 1.41 parts (yield: 92.8%) of a compound (51) was obtained.

Next, to 4.00 of the compound (48), 20 parts of DMF, 20.0 parts of THF, and 0.130 parts of concentrated hydrochloric acid were added. The resulting mixture was cooled with ice to 10° C. or lower. To this solution, 0.0450 parts of sodium nitrite dissolved in 0.136 parts of water was added and the reaction was carried out at the same temperature for 1 hour. Thereto, 0.0320 parts of sulfamic acid was added, followed by further stirring for 20 minutes (diazonium salt solution). To 15.0 of DMF, 0.225 parts of potassium acetate dissolved in 1.00 part of water and 0.0440 parts of the compound (51) were added and the resulting mixture was cooled with ice to 10° C. or lower. Thereto, the diazonium salt solution was added and the reaction was carried out at 10° C. or lower for 2 hours. After completion of the reaction, 300 parts of water was added, followed by stirring for 30 minutes, and solid matter was filtered out and purified through recrystallization in N,N-dimethylformamide so as to obtain 3.78 parts (yield: 94.5%) of a compound (176).

Analytic Results of the Compound (176) Having an Azo Skeleton

[1] Results of Molecular Weight Measurement (GPC)

Weight-average molecular weight (Mw)=48989, number-average molecular weight (Mn)=28481

[2] Results of Acid Value Measurement 0 mgKOH/g

Figure 4:
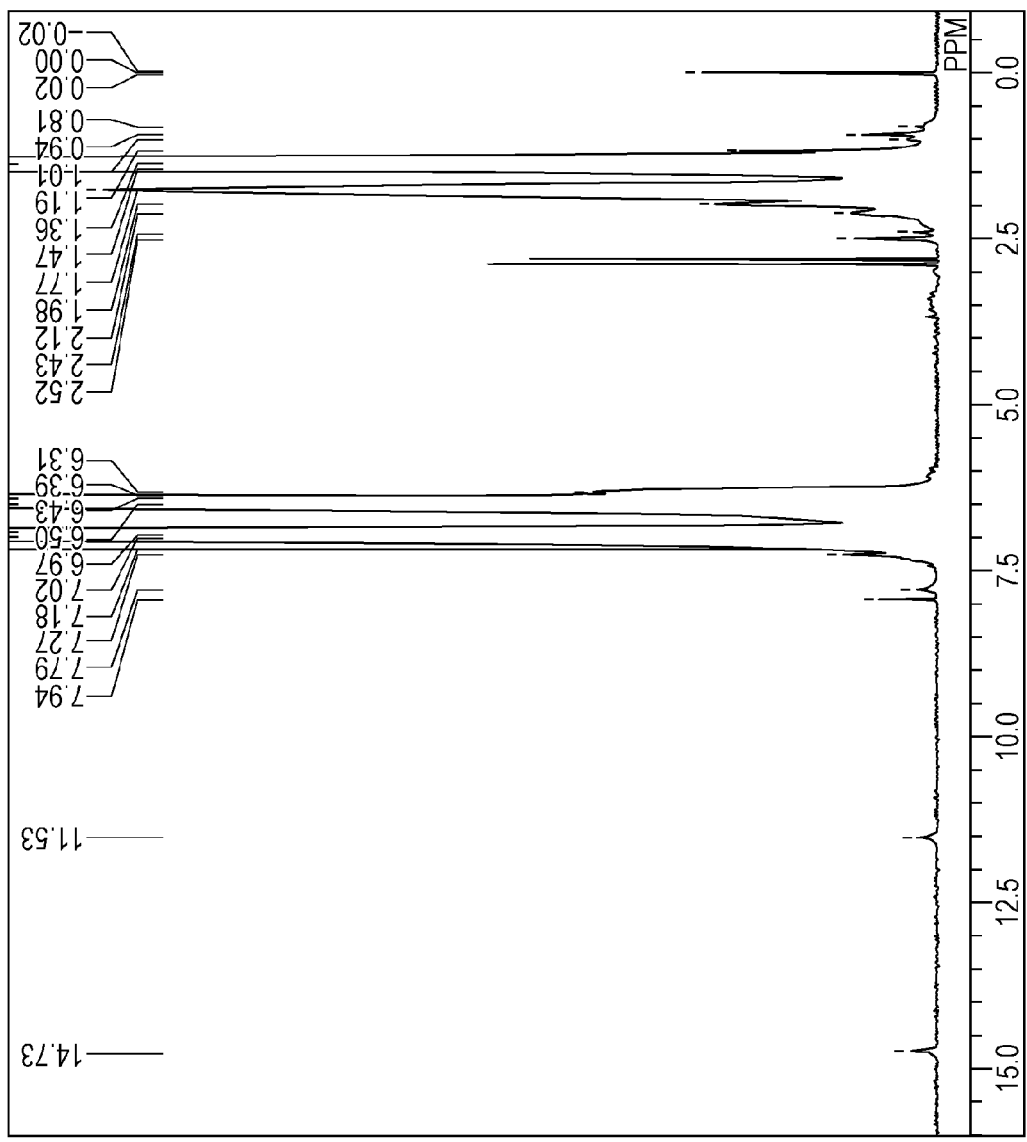
FIG. 4 is a graph showing a $^1$H NMR spectrum of a compound (176) having an azo skeleton in CDCl$_3$ at room temperature at 400 MHz.

[3] Results of $^1$H NMR (400 MHz, $CDCl_3$, Room Temperature) (See FIG. 4)

δ [ppm]=14.73 (s, 3H), 11.53 (s, 3H), 7.79 (s, 3H), 7.27-6.31 (m, 2175H), 2.52 (s, 9H), 2.12-0.81 (m, 1461H)

The same operation as the synthetic example of the compounds (116), (129), (174), and (176) having azo skeletons was performed to produce compounds (101) to (115), (117) to (128), (130) to (173), (175), and (177) to (179) having azo skeletons.

The polymer portion is shown in Table 1 and the compounds having azo skeletons are shown in Tables 2-1 to 2-4 below.

TABLE 1

| Polymer portion number | Sequential arrangement of monomers | No. of X | No. of $Y_1$ | No. of $Y_2$ | No. of Z | $R_{46}$ | $R_{47}$ | $R_{48}$ | $R_{49}$ | $R_{50}$ | $R_{51}$ |
|---|---|---|---|---|---|---|---|---|---|---|---|
| R-1 | α-W-polyX | 95 | 0 | 0 | 0 | H | — | — | — | — | — |
| R-2 | α-W-polyX | 149 | 0 | 0 | 0 | H | — | — | — | — | — |
| R-3 | α-W-poly$Y_1$ | 0 | 101 | 0 | 0 | — | H | $COOC_4H_9(n)$ | — | — | — |
| R-4 | α-W-poly(X-co-$Y_1$) | 71 | 18 | 0 | 0 | H | H | $COOC_4H_9(n)$ | — | — | — |
| R-5 | α-W-poly(X-co-$Y_1$) | 18 | 88 | 0 | 0 | H | H | $COOC_4H_9(n)$ | — | — | — |
| R-6 | α-W-poly(X-co-$Y_1$) | 71 | 18 | 0 | 0 | H | H | $CONH_2$ | — | — | — |
| R-7 | α-W-poly(X-co-$Y_1$) | 71 | 18 | 0 | 0 | H | H | $COOCH_3$ | — | — | — |
| R-8 | α-W-poly(X-co-$Y_1$) | 71 | 18 | 0 | 0 | H | H | COOBn | — | — | — |
| R-9 | poly(X-co-$Y_1$-co-Z) | 141 | 30 | 0 | 11 | H | H | $COOC_4H_9(n)$ | — | — | H |
| R-10 | poly(X-co-$Y_1$-co-Z) | 15 | 11 | 0 | 7 | $CH_3$ | $CH_3$ | $COOC_4H_9(n)$ | — | — | H |
| R-11 | poly(X-co-$Y_1$-co-Z) | 220 | 4 | 0 | 4 | H | — | $COOCH_3$ | — | — | H |
| R-12 | poly(X-co-$Y_1$-co-Z) | 57 | 5 | 0 | 3 | H | H | $COOCH_2CH(C_2H_5)C_4H_9$ | — | — | H |
| R-13 | poly(X-co-$Y_1$-co-Z) | 49 | 4 | 0 | 2 | H | H | $COOC_{18}H_{37}(n)$ | — | — | H |

TABLE 1-continued

| Polymer portion number | Sequential arrangement of monomers | No. of X | No. of Y$_1$ | No. of Y$_2$ | No. of Z | R$_{46}$ | R$_{47}$ | R$_{48}$ | R$_{49}$ | R$_{50}$ | R$_{51}$ |
|---|---|---|---|---|---|---|---|---|---|---|---|
| R-14 | poly(X-co-Y$_1$-co-Z) | 58 | 3 | 0 | 3 | H | H | COOC$_{22}$H$_{45}$(n) | — | — | H |
| R-15 | poly(X-co-Y$_1$-co-Y$_2$-co-Z) | 75 | 13 | 3 | 3 | H | H | COOCH$_3$ | H | COOC$_{22}$H$_{45}$(n) | H |
| R-16 | poly(X-co-Y$_1$-co-Y$_2$-co-Z) | 59 | 28 | 4 | 3 | H | H | COOC$_4$H$_9$(n) | H | COOC$_{22}$H$_{45}$(n) | H |
| R-17 | poly(X-co-Z) | 220 | 0 | 0 | 8 | H | — | — | — | — | H |
| R-18 | poly(X-co-Z) | 1174 | 0 | 0 | 384 | H | — | — | — | — | H |
| R-19 | poly(Y$_1$-co-Z) | 0 | 90 | 0 | 10 | — | H | COOC$_4$H$_9$(n) | — | — | H |
| R-20 | polyX-b-polyZ | 84 | 0 | 0 | 5 | H | — | — | — | — | H |
| R-21 | poly(X-co-Y$_1$)-b-polyZ | 74 | 14 | 0 | 2 | H | H | COOC$_4$H$_9$(n) | — | — | H |

In Table 1, the prefix α represents the terminal group on the left of the structure. W represents a COOH group. X, Y$_1$, Y$_2$, and Z respectively represent structures indicated below. Bn represents an unsubstituted benzyl group. (n) indicates that the alkyl group is linear.

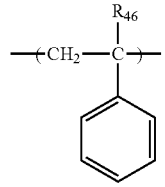

X

[in formula (X), R$_{46}$ represents a hydrogen atom or an alkyl group]

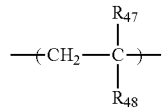

Y$_1$

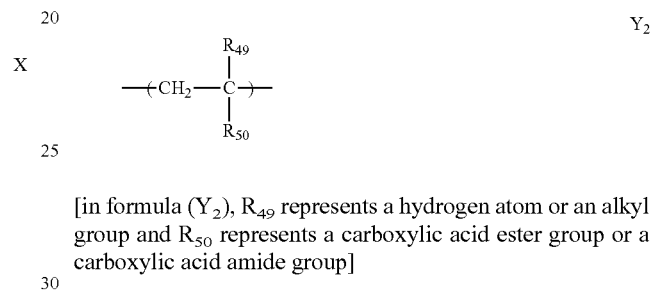

[in formula (Y$_1$), R$_{47}$ represents a hydrogen atom or an alkyl group and R$_{48}$ represents a carboxylic acid ester group or a carboxylic acid amide group]

Y$_2$

[in formula (Y$_2$), R$_{49}$ represents a hydrogen atom or an alkyl group and R$_{50}$ represents a carboxylic acid ester group or a carboxylic acid amide group]

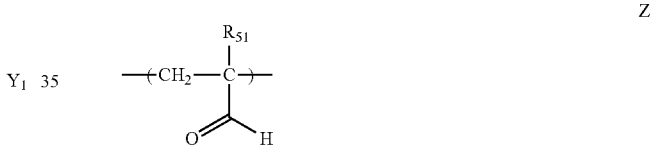

Z

[in formula (Z), R$_{51}$ represents a hydrogen atom or an alkyl group]

TABLE 2-1

| Compound | Polymer portion | Linking position to polymer portion | m | n | Number of introduced units | Substitution positions of acetamide groups | R$_1$ | R$_9$ | R$_{10}$ |
|---|---|---|---|---|---|---|---|---|---|
| 101 | R-1 | W | 4 | 1 | 1 | 1,4- | 2,3,5,6-H | CH$_3$ | CH$_3$ |
| 102 | R-3 | W | 4 | 1 | 1 | 1,4- | 2,3,5,6-H | CH$_3$ | CH$_3$ |
| 103 | R-4 | W | 4 | 1 | 1 | 1,4- | 2,3,5,6-H | CH$_3$ | CH$_3$ |
| 104 | R-5 | W | 4 | 1 | 1 | 1,4- | 2,3,5,6-H | CH$_3$ | CH$_3$ |
| 105 | R-6 | W | 4 | 1 | 1 | 1,4- | 2,3,5,6-H | CH$_3$ | CH$_3$ |
| 106 | R-7 | W | 4 | 1 | 1 | 1,4- | 2,3,5,6-H | CH$_3$ | CH$_3$ |
| 107 | R-8 | W | 4 | 1 | 1 | 1,4- | 2,3,5,6-H | CH$_3$ | CH$_3$ |
| 108 | R-1 | W | 4 | 1 | 1 | 1,4- | 2,3,5,6-H | CH$_3$ | CH$_3$ |
| 109 | R-4 | W | 4 | 1 | 1 | 1,4- | 2,3,5,6-H | CH$_3$ | CH$_3$ |
| 110 | R-1 | W | 4 | 1 | 1 | 1,4- | 2,3,5,6-H | CH$_3$ | CH$_3$ |
| 111 | R-4 | W | 4 | 1 | 1 | 1,4- | 2,3,5,6-H | CH$_3$ | CH$_3$ |
| 112 | R-1 | W | 4 | 1 | 1 | 1,4- | 2,3,5,6-H | CH$_3$ | CH$_3$ |
| 113 | R-4 | W | 4 | 1 | 1 | 1,4- | 2,3,5,6-H | CH$_3$ | CH$_3$ |
| 114 | R-1 | W | 4 | 1 | 1 | 1,4- | 2,3,5,6-H | CH$_3$ | CH$_3$ |
| 115 | R-4 | W | 4 | 1 | 1 | 1,4- | 2,3,5,6-H | CH$_3$ | CH$_3$ |
| 116 | R-2 | W | 4 | 1 | 1 | 1,4- | 2,3,5,6-H | CH$_3$ | CH$_3$ |
| 117 | R-4 | W | 4 | 1 | 1 | 1,4- | 2,3,5,6-H | CH$_3$ | CH$_3$ |
| 118 | R-9 | Z | 4 | 1 | 1 | 1,4- | 2,3,5,6-H | CH$_3$ | CH$_3$ |
| 119 | R-9 | Z | 4 | 1 | 11 | 1,4- | 2,3,5,6-H | CH$_3$ | CH$_3$ |
| 120 | R-10 | Z | 4 | 1 | 2 | 1,4- | 2,3,5,6-H | CH$_3$ | CH$_3$ |

TABLE 2-1-continued

| Compound | R$_{11}$ | R$_{12}$ | R$_{13}$ | R$_{14}$ | R$_{15}$ | R$_{16}$ | R$_{17}$ | R$_{18}$ | R$_{19}$ | R$_{20}$ |
|---|---|---|---|---|---|---|---|---|---|---|
| 101 | COOCH$_3$ | H | H | COOCH$_3$ | H | H | H | L$_1$ | H | H |
| 102 | COOCH$_3$ | H | H | COOCH$_3$ | H | H | H | L$_1$ | H | H |
| 103 | COOCH$_3$ | H | H | COOCH$_3$ | H | H | H | L$_1$ | H | H |
| 104 | COOCH$_3$ | H | H | COOCH$_3$ | H | H | H | L$_1$ | H | H |
| 105 | COOCH$_3$ | H | H | COOCH$_3$ | H | H | H | L$_1$ | H | H |
| 106 | COOCH$_3$ | H | H | COOCH$_3$ | H | H | H | L$_1$ | H | H |
| 107 | COOCH$_3$ | H | H | COOCH$_3$ | H | H | H | L$_1$ | H | H |
| 108 | COOCH$_3$ | H | H | COOCH$_3$ | H | H | H | L$_2$ | H | H |
| 109 | COOCH$_3$ | H | H | COOCH$_3$ | H | H | H | L$_2$ | H | H |
| 110 | COOCH$_3$ | H | H | COOCH$_3$ | H | H | H | L$_3$ | H | H |
| 111 | COOCH$_3$ | H | H | COOCH$_3$ | H | H | H | L$_3$ | H | H |
| 112 | COOCH$_3$ | H | H | COOCH$_3$ | H | H | H | L$_4$ | H | H |
| 113 | COOCH$_3$ | H | H | COOCH$_3$ | H | H | H | L$_4$ | H | H |
| 114 | COOCH$_3$ | H | H | COOCH$_3$ | H | H | H | L$_5$ | H | H |
| 115 | COOCH$_3$ | H | H | COOCH$_3$ | H | H | H | L$_5$ | H | H |
| 116 | COOCH$_3$ | H | H | COOCH$_3$ | H | H | H | L$_6$ | H | H |
| 117 | COOCH$_3$ | H | H | COOCH$_3$ | H | H | H | L$_6$ | H | H |
| 118 | COOCH$_3$ | H | H | COOCH$_3$ | H | H | H | L$_7$ | H | H |
| 119 | COOCH$_3$ | H | H | COOCH$_3$ | H | H | H | L$_7$ | H | H |
| 120 | COOCH$_3$ | H | H | COOCH$_3$ | H | H | H | L$_7$ | H | H |

TABLE 2-2

| Compound | Polymer portion | Linking position to polymer portion | m | n | Number of introduced units | Substitution positions of acetamide groups | R$_1$ | R$_9$ | R$_{10}$ |
|---|---|---|---|---|---|---|---|---|---|
| 121 | R-10 | Z | 4 | 1 | 7 | 1,4- | 2,3,5,6-H | CH$_3$ | CH$_3$ |
| 122 | R-11 | Z | 4 | 1 | 4 | 1,4- | 2,3,5,6-H | CH$_3$ | CH$_3$ |
| 123 | R-12 | Z | 4 | 1 | 3 | 1,4- | 2,3,5,6-H | CH$_3$ | CH$_3$ |
| 124 | R-13 | Z | 4 | 1 | 2 | 1,4- | 2,3,5,6-H | CH$_3$ | CH$_3$ |
| 125 | R-14 | Z | 4 | 1 | 3 | 1,4- | 2,3,5,6-H | CH$_3$ | CH$_3$ |
| 126 | R-15 | Z | 4 | 1 | 3 | 1,4- | 2,3,5,6-H | CH$_3$ | CH$_3$ |
| 127 | R-16 | Z | 4 | 1 | 3 | 1,4- | 2,3,5,6-H | CH$_3$ | CH$_3$ |
| 128 | R-11 | Z | 4 | 1 | 6 | 1,4- | 2,3,5,6-H | CH$_3$ | CH$_3$ |
| 129 | R-11 | Z | 4 | 1 | 8 | 1,4- | 2,3,5,6-H | CH$_3$ | CH$_3$ |
| 130 | R-12 | Z | 4 | 1 | 197 | 1,4- | 2,3,5,6-H | CH$_3$ | CH$_3$ |
| 131 | R-13 | Z | 4 | 1 | 8 | 1,4- | 2,3,5,6-H | CH$_3$ | CH$_3$ |
| 132 | R-14 | Z | 4 | 1 | 5 | 1,4- | 2,3,5,6-H | CH$_3$ | CH$_3$ |
| 133 | R-15 | Z | 4 | 1 | 1 | 1,4- | 2,3,5,6-H | CH$_3$ | CH$_3$ |
| 134 | R-1 | W | 4 | 1 | 1 | 1,4- | 2,3,5,6-H | CH$_3$ | CH$_3$ |
| 135 | R-1 | W | 4 | 1 | 1 | 1,4- | 2,3,5,6-H | C$_6$CH$_{13}$(n) | Ph |
| 136 | R-1 | W | 4 | 1 | 1 | 1,4- | 2-OH 3,6-H 5-Cl | CH$_3$ | CH$_3$ |
| 137 | R-1 | W | 4 | 1 | 1 | 1,4- | 2-OCH$_3$ 3,5,6-H | CH$_3$ | CH$_3$ |
| 138 | R-1 | W | 4 | 1 | 1 | 1,4- | 2,3,5,6-H | CH$_3$ | CH$_3$ |
| 139 | R-1 | W | 4 | 1 | 1 | 1,4- | 2-CF$_3$ 3,5,6-H | CH$_3$ | CH$_3$ |
| 140 | R-1 | W | 4 | 1 | 1 | 1,4- | 2-CN 3,5,6-H | CH$_3$ | CH$_3$ |

| Compound | R$_{11}$ | R$_{12}$ | R$_{13}$ | R$_{14}$ | R$_{15}$ | R$_{16}$ | R$_{17}$ | R$_{18}$ | R$_{19}$ | R$_{20}$ |
|---|---|---|---|---|---|---|---|---|---|---|
| 121 | COOCH$_3$ | H | H | COOCH$_3$ | H | H | H | L$_7$ | H | H |
| 122 | COOCH$_3$ | H | H | COOCH$_3$ | H | H | H | L$_7$ | H | H |
| 123 | COOCH$_3$ | H | H | COOCH$_3$ | H | H | H | L$_7$ | H | H |
| 124 | COOCH$_3$ | H | H | COOCH$_3$ | H | H | H | L$_7$ | H | H |
| 125 | COOCH$_3$ | H | H | COOCH$_3$ | H | H | H | L$_7$ | H | H |
| 126 | COOCH$_3$ | H | H | COOCH$_3$ | H | H | H | L$_7$ | H | H |
| 127 | COOCH$_3$ | H | H | COOCH$_3$ | H | H | H | L$_7$ | H | H |
| 128 | COOCH$_3$ | H | H | COOCH$_3$ | H | H | H | L$_7$ | H | H |

TABLE 2-2-continued

| | | | | | | | | | | |
|---|---|---|---|---|---|---|---|---|---|---|
| 129 | COOCH$_3$ | H | H | COOCH$_3$ | H | H | H | L$_7$ | H | H |
| 130 | COOCH$_3$ | H | H | COOCH$_3$ | H | H | H | L$_7$ | H | H |
| 131 | COOCH$_3$ | H | H | COOCH$_3$ | H | H | H | L$_7$ | H | H |
| 132 | COOCH$_3$ | H | H | COOCH$_3$ | H | H | H | L$_7$ | H | H |
| 133 | COOCH$_3$ | H | H | COOCH$_3$ | H | H | H | L$_7$ | H | H |
| 134 | COOCH$_3$ | H | H | COOCH$_3$ | H | H | H | L$_7$ | H | H |
| 135 | COOCH$_3$ | H | H | COOCH$_3$ | H | H | H | L$_8$ | H | H |
| 136 | COOCH$_3$ | H | H | COOCH$_3$ | H | H | H | L$_8$ | H | H |
| 137 | COOCH$_3$ | H | H | COOCH$_3$ | H | H | H | L$_8$ | H | H |
| 138 | COOCH$_3$ | H | H | COOCH$_3$ | H | H | H | L$_8$ | H | H |
| 139 | COOCH$_3$ | H | H | COOCH$_3$ | H | H | H | L$_8$ | H | H |
| 140 | COOCH$_3$ | H | H | COOCH$_3$ | H | H | H | L$_8$ | H | H |

TABLE 2-3

| Compound | Polymer portion | Linking position to polymer portion | m | n | Number of introduced units | Substitution positions of acetamide groups | R$_1$ | R$_9$ | R$_{10}$ | R$_{11}$ |
|---|---|---|---|---|---|---|---|---|---|---|
| 141 | R-1 | W | 4 | 1 | 1 | 1,4- | 2,3,5,6-H | CH$_3$ | CH$_3$ | CH$_3$ |
| 142 | R-1 | W | 4 | 1 | 1 | 1,4- | 2,3,5,6-H | CH$_3$ | CH$_3$ | H |
| 143 | R-1 | W | 4 | 1 | 1 | 1,4- | 2,3,5,6-H | CH$_3$ | CH$_3$ | H |
| 144 | R-1 | W | 4 | 1 | 1 | 1,4- | 2,3,5,6-H | CH$_3$ | CH$_3$ | H |
| 145 | R-1 | W | 4 | 1 | 1 | 1,4- | 2,3,5,6-H | CH$_3$ | CH$_3$ | COOH |
| 146 | R-1 | W | 4 | 1 | 1 | 1,4- | 2,3,5,6-H | CH$_3$ | CH$_3$ | COOC$_2$H$_5$ |
| 147 | R-1 | W | 4 | 1 | 1 | 1,4- | 2,3,5,6-H | CH$_3$ | CH$_3$ | COOPr(n) |
| 148 | R-1 | W | 4 | 1 | 1 | 1,4- | 2,3,5,6-H | CH$_3$ | CH$_3$ | COOPr(i) |
| 149 | R-1 | W | 4 | 1 | 1 | 1,4- | 2,3,5,6-H | CH$_3$ | CH$_3$ | CONH$_2$ |
| 150 | R-1 | W | 4 | 1 | 1 | 1,4- | 2,3,5,6-H | CH$_3$ | CH$_3$ | CONHCH$_3$ |
| 151 | R-1 | W | 4 | 1 | 1 | 1,4- | 2,3,5,6-H | CH$_3$ | CH$_3$ | CONHC$_2$H$_5$ |
| 152 | R-1 | W | 4 | 1 | 1 | 1,4- | 2,3,5,6-H | CH$_3$ | CH$_3$ | CONHPr(i) |
| 153 | R-1 | W | 4 | 1 | 1 | 1,4- | 2,3,5,6-H | CH$_3$ | CH$_3$ | CONHPr(n) |
| 154 | R-1 | W | 4 | 1 | 1 | 1,4- | 2,3,5,6-H | CH$_3$ | CH$_3$ | CON(C$_2$H$_5$)$_2$ |
| 155 | R-4 | W | 4 | 1 | 1 | 1,4- | 2,3,5,6-H | CH$_3$ | CH$_3$ | H |
| 156 | R-1 | W | 4 | 1 | 1 | 1,4- | 2,3,5,6-H | CH$_3$ | CH$_3$ | CONH$_2$ |
| 157 | R-1 | W | 4 | 1 | 1 | 1,4- | 2,3,5,6-H | CH$_3$ | CH$_3$ | H |
| 158 | R-1 | W | 4 | 1 | 1 | 1,4- | 2,3,5,6-H | CH$_3$ | CH$_3$ | H |
| 159 | R-1 | W | 4 | 1 | 1 | 1,4- | 2,3,5,6-H | CH$_3$ | CH$_3$ | H |
| 160 | R-1 | W | 4 | 1 | 1 | 1,4- | 2,3,5,6-H | CH$_3$ | CH$_3$ | H |

| Compound | R$_{12}$ | R$_{13}$ | R$_{14}$ | R$_{15}$ | R$_{16}$ | R$_{17}$ | R$_{18}$ | R$_{19}$ | R$_{20}$ |
|---|---|---|---|---|---|---|---|---|---|
| 141 | H | Cl | H | H | H | H | L$_8$ | H | H |
| 142 | CF$_3$ | H | H | H | H | H | L$_8$ | H | H |
| 143 | H | OCH$_2$CH$_3$ | H | H | H | H | L$_8$ | H | H |
| 144 | CN | H | H | H | H | H | L$_8$ | H | H |
| 145 | H | H | COOH | H | H | H | L$_8$ | H | H |
| 146 | H | H | COOC$_2$H$_5$ | H | H | H | L$_8$ | H | H |
| 147 | H | H | COOPr(n) | H | H | H | L$_8$ | H | H |
| 148 | H | H | COOPr(i) | H | H | H | L$_8$ | H | H |
| 149 | H | H | CONH$_2$ | H | H | H | L$_8$ | H | H |
| 150 | H | H | CONHCH$_3$ | H | H | H | L$_8$ | H | H |
| 151 | H | H | CONHC$_2$H$_5$ | H | H | H | L$_8$ | H | H |
| 152 | H | H | CONHPr(i) | H | H | H | L$_8$ | H | H |
| 153 | H | H | CONHPr(n) | H | H | H | L$_8$ | H | H |
| 154 | H | H | CON(C$_2$H$_5$)$_2$ | H | H | H | L$_8$ | H | H |
| 155 | CONH$_2$ | H | H | H | H | H | L$_8$ | H | H |
| 156 | H | H | H | H | H | H | L$_8$ | H | H |

TABLE 2-3-continued

| | | | | | | | | | |
|---|---|---|---|---|---|---|---|---|---|
| 157 | CONH$_2$ | H | H | H | H | H | L$_8$ | H | H |
| 158 | H | CONH$_2$ | H | H | H | H | L$_8$ | H | H |
| 159 | CONH$_2$ | H | H | OCH3 | H | H | L$_8$ | H | H |
| 160 | CONHC$_6$H$_5$ | H | H | OCH3 | H | H | L$_8$ | H | H |

TABLE 2-4

| Compound | Polymer portion | Linking position to polymer portion | m | n | Number of introduced units | Substitution positions of acetamide groups | R$_1$ | R$_9$ | R$_{10}$ | R$_{11}$ |
|---|---|---|---|---|---|---|---|---|---|---|
| 161 | R-1 | W | 4 | 1 | 1 | 1,4- | 2,3,5,6-H | CH$_3$ | CH$_3$ | H |
| 162 | R-1 | W | 4 | 1 | 1 | 1,4- | 2,3,5,6-H | CH$_3$ | CH$_3$ | H |
| 163 | R-1 | W | 4 | 1 | 1 | 1,4- | 2,3,5,6-H | CH$_3$ | CH$_3$ | H |
| 164 | R-1 | W | 4 | 1 | 1 | 1,4- | 2,3,5,6-H | CH$_3$ | CH$_3$ | H |
| 165 | R-1 | W | 4 | 1 | 1 | 1,4- | 2,3,5,6-H | CH$_3$ | CH$_3$ | COOCH$_3$ |
| 166 | R-1 | W | 4 | 1 | 1 | 1,4- | 2,3,5,6-H | CH$_3$ | CH$_3$ | H |
| 167 | R-1 | W | 4 | 1 | 1 | 1,4- | 2,3,5,6-H | CH$_3$ | CH$_3$ | H |
| 168 | R-1 | W | 4 | 1 | 1 | 1,4- | 2,3,5,6-H | CH$_3$ | CH$_3$ | H |
| 169 | R-1 | W | 4 | 1 | 1 | 1,3- | 2,3,5,6-H | CH$_3$ | CH$_3$ | COOCH$_3$ |
| 170 | R-1 | W | 4 | 1 | 1 | 1,2- | 2,3,5,6-H | CH$_3$ | CH$_3$ | COOCH$_3$ |
| 171 | R-1 | W | 4 | 1 | 1 | 1,4- | 2,3,5,6-H | CH$_3$ | CH$_3$ | COOCH$_3$ |
| 172 | R-1 | W | 4 | 1 | 1 | 1,4- | 2,3,5,6-H | CH$_3$ | CH$_3$ | COOCH$_3$ |
| 173 | R-1 | W | 4 | 1 | 1 | 1,4- | 2,3,5,6-H | CH$_3$ | CH$_3$ | COOCH$_3$ |
| 174 | R-1 | W | 4 | 1 | 1 | 1,4- | 2,3,5,6-H | CH$_3$ | CH$_3$ | H |
| 175 | R-1 | W | 4 | 1 | 1 | 1,4- | 2,3,5,6-H | CH$_3$ | CH$_3$ | H |
| 176 | R-1 | W | 3 | 2 | 1 | 1,3,5- | 2,4,6-H | CH$_3$ | CH$_3$ | H |
| 177 | R-1 | W | 3 | 2 | 1 | 1,2,3- | 4,5,6-H | CH$_3$ | CH$_3$ | H |
| 178 | R-1 | W | 3 | 2 | 1 | 1,2,5- | 2-CH$_3$ 6-H | CH$_3$ | CH$_3$ | H |
| 179 | R-1 | W | 3 | 2 | 1 | 1,3,5- | 2,6-H | CH$_3$ | CH$_3$ | H |

| Compound | R$_{12}$ | R$_{13}$ | R$_{14}$ | R$_{15}$ | R$_{16}$ | R$_{17}$ | R$_{18}$ | R$_{19}$ | R$_{20}$ |
|---|---|---|---|---|---|---|---|---|---|
| 161 | CONHC$_6$H$_5$ | H | H | H | H | H | L$_8$ | H | H |
| 162 | CONHCH$_3$ | H | H | H | H | H | L$_8$ | H | H |
| 163 | NHCOCH$_3$ | H | H | H | H | H | L$_8$ | H | H |
| 164 | CONH$_2$ | H | H | OH | H | H | L$_8$ | H | H |
| 165 | H | H | H | H | H | H | L$_8$ | H | H |
| 166 | COOCH$_3$ | H | H | H | H | H | L$_8$ | H | H |
| 167 | H | COOCH$_3$ | H | H | H | H | L$_8$ | H | H |
| 168 | COOCH$_3$ | H | COOCH$_3$ | H | H | H | L$_8$ | H | H |
| 169 | H | H | COOCH$_3$ | H | H | H | L$_8$ | H | H |
| 170 | H | H | COOCH$_3$ | H | H | H | L$_8$ | H | H |
| 171 | H | H | COOCH$_3$ | H | H | L$_8$ | H | H | H |
| 172 | H | H | COOCH$_3$ | H | L$_8$ | H | H | H | H |
| 173 | H | H | COOCH$_3$ | H | L$_8$ | H | L$_8$ | H | H |
| 174 | H | L$_8$ | H | H | H | H | L$_8$ | H | H |
| 175 | L$_8$ | H | L$_8$ | H | L$_8$ | H | L$_8$ | H | H |
| 176 | H | L$_8$ | H | H | H | H | L$_8$ | H | H |
| 177 | H | L$_8$ | H | H | H | H | L$_8$ | H | H |
| 178 | H | L$_8$ | H | H | H | H | L$_8$ | H | H |
| 179 | L$_8$ | H | L$_8$ | H | L$_8$ | H | L$_8$ | L$_8$ | H |

In Tables 2-1 to 2-4, m, n, R$_1$, and R$_9$ to R$_{20}$ respectively represent m, n, R$_1$ and R$_9$ to R$_{20}$ in formula (3) below; Pr represents an unsubstituted propyl group; Ph represents an unsubstituted phenyl group; (n) and (i) respectively represent a linear alkyl group and a branched alkyl group; a compound in which the bonding portion to the polymer portion is "W" forms a linking group L by bonding with a COOH group represented by W in the polymer portion shown in Table 1; a compound in which the "linking moiety to the polymer portion" is indicated by "W" forms a linking group L by bonding with a COOH group represented by "W" in the polymer portion described in Table 1 and a compound in which the linking moiety to the polymer portion is indicated by "Z" forms a linking group L by bonding with a COOH group in the monomer "Z" in the polymer portion described in Table 1; L$_1$ to L$_8$ in Table 2 each represent a linking group L to the polymer resin and are represented by the structural formula below:

FORMULA (3)

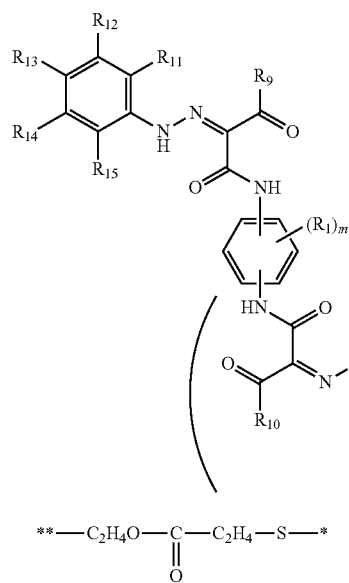

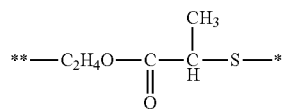

$L_1$

[in formula ($L_1$), "*" represents a linking moiety linking to the polymer portion indicated in Table 1 and "**" represents a linking moiety in the azo skeleton structure represented by formula (1)]

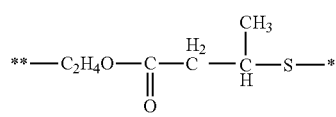

$L_2$

[in formula ($L_2$), "*" represents a linking moiety linking to the polymer portion indicated in Table 1 and "**" represents a linking moiety in the azo skeleton structure represented by formula (1)]

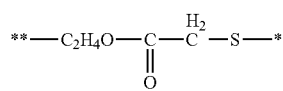

$L_3$

[in formula ($L_3$), "*" represents a linking moiety linking to the polymer portion indicated in Table 1 and "**" represents a linking moiety in the azo skeleton structure represented by formula (1)]

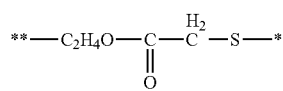

$L_4$

[in formula ($L_4$), "*" represents a linking moiety linking to the polymer portion indicated in Table 1 and "**" represents a linking moiety in the azo skeleton structure represented by formula (1)]

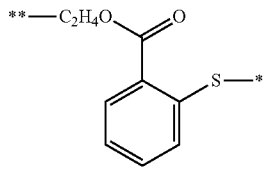

$L_5$

[in formula ($L_5$), "*" represents a linking moiety linking to the polymer portion indicated in Table 1 and "**" represents a linking moiety in the azo skeleton structure represented by formula (1)]

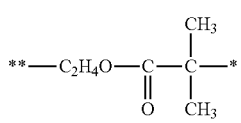

$L_6$

[in formula ($L_6$), "*" represents a linking moiety linking to the polymer portion indicated in Table 1 and "**" represents a linking moiety in the azo skeleton structure represented by formula (1)]

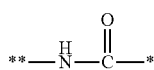

$L_7$

[in formula ($L_7$), "*" represents a linking moiety linking to the polymer portion indicated in Table 1 and "**" represents a linking moiety in the azo skeleton structure represented by formula (1)]

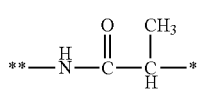

$L_8$

[in formula ($L_8$), "*" represents a linking moiety linking to the polymer portion indicated in Table 1 and "**" represents a linking moiety in the azo skeleton structure represented by formula (1)].

Example 2

A magenta pigment dispersion containing a magenta pigment and a compound having an azo skeleton was prepared by the following method in a toner production process that involves a suspension polymerization method.

Preparation Example 1 of Magenta Pigment Dispersion

Mixed were 30.0 parts of a pigment represented by formula (52) below serving as a colorant, 3.0 parts of the compound (101) having an azo skeleton structure, 180 parts of styrene as a water-insoluble solvent, and 130 parts of glass beads (1 mm in diameter). The resulting mixture was dispersed in an attritor (produced by Nippon Coke & Engineering Co., Ltd.) for 3 hours and filtered through a mesh to obtain a magenta pigment dispersion (DIS1).

FORMULA (52)

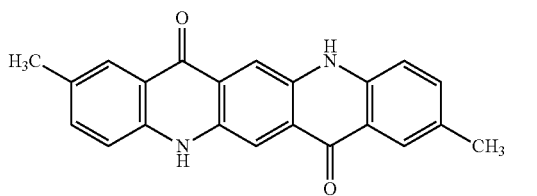

Preparation Example 2 of Magenta Pigment Dispersion

Magenta pigment dispersions (DIS2) to (DIS79) were obtained as in Preparation Example 1 of magenta pigment dispersion except that the compound (101) having an azo skeleton structure was changed to compounds (102) to (179) having azo skeleton structures.

Preparation Example 3 of Magenta Pigment Dispersion

Magenta pigment dispersions (DIS80), (DIS81), and (DIS82) were obtained as in Preparation Example 1 of magenta pigment dispersion except that the pigment represented by formula (52) above was changed to pigments represented by formulae (53), (54), and (55) below.

FORMULA (53)

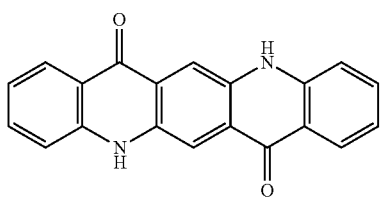

FORMULA (54)

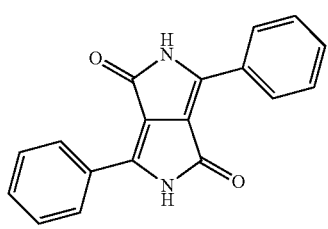

FORMULA (55)

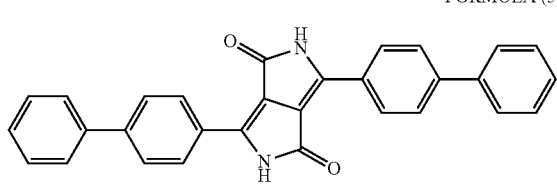

Comparative Example 1

A magenta pigment dispersion that serves as a standard of evaluation and a magenta pigment dispersion for comparison were prepared by the following method.

Preparation Example 1 of Magenta Pigment Dispersion for Standard

A magenta pigment dispersion (DIS83) for standard was obtained as in Preparation Example 1 of magenta pigment dispersion in Example 2 except that the compound (101) having an azo skeleton structure was not added.

Preparation Example 2 of Magenta Pigment Dispersion for Standard

Magenta pigment dispersions (DIS84) to (DIS86) were obtained as in Preparation Example 3 of magenta pigment dispersion in Example 2 except that the compound (101) having an azo skeleton structure was not added.

Preparation Example 1 of Magenta Pigment Dispersion for Comparison

A magenta pigment dispersion (DIS87) was obtained as in Preparation Example 1 of magenta pigment dispersion of Example 2 except that the compound (101) having an azo skeleton structure was changed to DA-703-50 (product of produced by Kusumoto Chemicals Ltd.) (comparative compound 1) described in Japanese Patent Laid-Open No. 2006-30760.

Preparation Example 2 of Magenta Pigment Dispersion for Comparison

Magenta pigments dispersions (DIS88) to (DIS90) for comparison were obtained as in Preparation Example 3 of magenta pigment dispersion of Example 2 except that the compound (101) having an azo skeleton structure was changed to comparative compound 1.

Example 3

The magenta pigment dispersions prepared as above were evaluated by the following method.

Evaluation of Dispersibility in Magenta Pigment Dispersion

The magenta pigment dispersibility of the compound having an azo skeleton structure of the present invention was evaluated by performing a gloss test on coating films of magenta pigment dispersions. That is, a magenta pigment dispersion taken in a syringe was discharged on a sheet of super art paper (SA Kinfuji 180 kg, 80×160 produced by Oji Holdings Corporation) so as to draw a straight line and spread with a wire bar (#10) to evenly coat the art paper. The gloss after drying (angle of reflection: 75°) was measured with a Gloss Meter VG7000 (produced by Nippon Denshoku Industries Co., Ltd.) and evaluated based on the standard below. The flatness and the gloss of the coating film improve as the magenta pigment is dispersed more finely.

The gloss improvement rates for the magenta pigment dispersions (DIS1) to (DIS79) and (DIS87) that used a magenta pigment represented by formula (52) as a colorant were determined on the basis of the gloss value of the magenta pigment dispersion (DIS83) for standard.

The gloss improvement rates for the magenta pigment dispersions (DIS80) and (DIS88) that used a magenta pigment represented by formula (53) as a colorant were determined on the basis of the gloss value of the magenta pigment dispersion (DIS84) for standard.

The gloss improvement rates for the magenta pigment dispersions (DIS81) and (DIS89) that used a magenta pigment represented by formula (54) as a colorant were determined on the basis of the gloss value of the magenta pigment dispersion (DIS85) for standard.

The gloss improvement rates for the magenta pigment dispersions (DIS82) and (DIS90) that used a magenta pigment represented by formula (55) as a colorant were determined on the basis of the gloss value of the magenta pigment dispersion (DIS86) for standard.

The evaluation standard for the pigment dispersions is as follows.

A: The gloss value improvement rate was 30% or more.
B: The gloss value improvement rate was 20% or more but less than 30%.
C: The gloss value improvement rate was 10% or more but less than 20%.
D: The gloss value improvement rate was less than 10%.

The magenta pigment dispersibility was evaluated as satisfactory as long as the gloss rate improvement rate was 10% or more.

The evaluation results for the magenta pigment dispersions are shown in Table 3.

TABLE 3

| Magenta pigment dispersion | Compound | Magenta pigment | Gloss (gloss value) |
|---|---|---|---|
| DIS1 | 101 | Formula(52) | A(70) |
| DIS2 | 102 | Formula(52) | A(72) |
| DIS3 | 103 | Formula(52) | A(74) |
| DIS4 | 104 | Formula(52) | A(73) |
| DIS5 | 105 | Formula(52) | A(69) |
| DIS6 | 106 | Formula(52) | A(75) |
| DIS7 | 107 | Formula(52) | A(74) |
| DIS8 | 108 | Formula(52) | A(76) |
| DIS9 | 109 | Formula(52) | A(71) |
| DIS10 | 110 | Formula(52) | A(71) |
| DIS11 | 111 | Formula(52) | A(70) |
| DIS12 | 112 | Formula(52) | A(73) |
| DIS13 | 113 | Formula(52) | A(74) |
| DIS14 | 114 | Formula(52) | A(75) |
| DIS15 | 115 | Formula(52) | A(70) |
| DIS16 | 116 | Formula(52) | A(76) |
| DIS17 | 117 | Formula(52) | A(71) |
| DIS18 | 118 | Formula(52) | A(70) |
| DIS19 | 119 | Formula(52) | A(75) |
| DIS20 | 120 | Formula(52) | A(71) |
| DIS21 | 121 | Formula(52) | A(70) |
| DIS22 | 122 | Formula(52) | A(74) |
| DIS23 | 123 | Formula(52) | A(73) |
| DIS24 | 124 | Formula(52) | A(75) |
| DIS25 | 125 | Formula(52) | A(72) |
| DIS26 | 126 | Formula(52) | A(76) |
| DIS27 | 127 | Formula(52) | A(70) |
| DIS28 | 128 | Formula(52) | A(75) |
| DIS29 | 129 | Formula(52) | A(74) |
| DIS30 | 130 | Formula(52) | A(65) |
| DIS31 | 131 | Formula(52) | A(73) |
| DIS32 | 132 | Formula(52) | A(70) |
| DIS33 | 133 | Formula(52) | A(70) |
| DIS34 | 134 | Formula(52) | A(72) |
| DIS35 | 135 | Formula(52) | A(72) |
| DIS36 | 136 | Formula(52) | A(74) |
| DIS37 | 137 | Formula(52) | A(71) |
| DIS38 | 138 | Formula(52) | A(73) |
| DIS39 | 139 | Formula(52) | A(69) |
| DIS40 | 140 | Formula(52) | A(75) |
| DIS41 | 141 | Formula(52) | A(67) |
| DIS42 | 142 | Formula(52) | A(64) |
| DIS43 | 143 | Formula(52) | A(66) |
| DIS44 | 144 | Formula(52) | A(64) |
| DIS45 | 145 | Formula(52) | A(70) |
| DIS46 | 146 | Formula(52) | A(72) |
| DIS47 | 147 | Formula(52) | A(66) |
| DIS48 | 148 | Formula(52) | A(65) |
| DIS49 | 149 | Formula(52) | A(77) |
| DIS50 | 150 | Formula(52) | A(71) |
| DIS51 | 151 | Formula(52) | A(70) |
| DIS52 | 152 | Formula(52) | A(65) |
| DIS53 | 153 | Formula(52) | A(65) |
| DIS54 | 154 | Formula(52) | A(64) |
| DIS55 | 155 | Formula(52) | A(67) |
| DIS56 | 156 | Formula(52) | A(66) |
| DIS57 | 157 | Formula(52) | A(78) |
| DIS58 | 158 | Formula(52) | A(72) |
| DIS59 | 159 | Formula(52) | A(77) |
| DIS60 | 160 | Formula(52) | A(76) |
| DIS61 | 161 | Formula(52) | A(64) |
| DIS62 | 162 | Formula(52) | A(70) |
| DIS63 | 163 | Formula(52) | A(65) |
| DIS64 | 164 | Formula(52) | A(77) |
| DIS65 | 165 | Formula(52) | A(71) |
| DIS66 | 166 | Formula(52) | A(73) |
| DIS67 | 167 | Formula(52) | A(74) |
| DIS68 | 168 | Formula(52) | A(70) |
| DIS69 | 169 | Formula(52) | A(72) |
| DIS70 | 170 | Formula(52) | A(73) |
| DIS71 | 171 | Formula(52) | A(73) |
| DIS72 | 172 | Formula(52) | A(77) |
| DIS73 | 173 | Formula(52) | A(72) |
| DIS74 | 174 | Formula(52) | A(65) |
| DIS75 | 175 | Formula(52) | A(67) |
| DIS76 | 176 | Formula(52) | A(66) |
| DIS77 | 177 | Formula(52) | A(68) |
| DIS78 | 178 | Formula(52) | A(64) |
| DIS79 | 179 | Formula(52) | B(67) |
| DIS80 | 101 | Formula(53) | A(69) |
| DIS81 | 101 | Formula(54) | A(80) |
| DIS82 | 101 | Formula(55) | A(75) |
| DIS83 | None | Formula(52) | Standard(42) |
| DIS84 | None | Formula(53) | Standard(45) |
| DIS85 | None | Formula(54) | Standard(42) |
| DIS86 | None | Formula(55) | Standard(39) |
| DIS87 | Comparative compound 1 | Formula(52) | B(54) |
| DIS88 | Comparative compound 1 | Formula(53) | B(55) |
| DIS89 | Comparative compound 1 | Formula(54) | C(48) |
| DIS90 | Comparative compound 1 | Formula(55) | B(50) |

Example 4

A toner of the present invention was produced by the following suspension polymerization method.

Toner Production Example 1

To a 2 L four neck flask equipped with a high speed stirrer T.K. Homomixer (produced by PRIMIX Corporation), 710 parts of ion exchange water and 450 parts of a 0.1 mol/l aqueous $Na_3PO_4$ solution were added. The speed of rotation was adjusted to 12000 rpm and the mixture was heated to 60° C. Thereto, 68 parts of a 1.0 mol/l aqueous $CaCl_2$ solution was slowly added to prepare a water-based medium containing fine sparingly water-soluble dispersion stabilizer $Ca_3(PO_4)_2$. Then the composition below was heated to 60° C. and evenly dissolved and dispersed in a high sped stirrer T.K. Homomixer (produced by PRIMIX Corporation) at 5000 rpm.

| | |
|---|---|
| magenta pigment dispersion (DIS1) | 132 parts |
| styrene monomer | 46 parts |
| n-butyl acrylate monomer | 34 parts |
| polar resin [saturated polyester resin (terephthalic acid-propylene oxide-modified bisphenol A, acid value: 15, peak molecular weight: 6000)] | 10 parts |
| ester wax (maximum endothermic peak in DSC = 70° C., Mn = 704) | 25 parts |
| aluminum salicylate compound [produced by Orient Chemical Industries Co., Ltd., trade name: BONTRON E-108] | 2 parts |
| divinylbenzene monomer | 0.1 parts |

To this composition, 10 parts of 2,2'-azobis(2,4-dimethylvaleronitrile) serving as a polymerization initiator was added and the resulting mixture was placed in the water-based medium and formed into particles while retaining a rotation speed of 12000 rpm for 15 minutes. Then the high speed stirrer was changed to an impeller stirrer equipped with a stirring blade, the polymerization was continued at a liquid temperature of 60° C. for 5 hours, and then the liquid temperature was increased to 80° C. The polymerization was continued for 8 hours. After termination of the polymerization, the remaining monomers were distilled away at a reduced pressure at 80° C. and the reaction product was cooled to 30° C. As a result, a polymer fine particle dispersion was obtained.

The polymer fine particle dispersion obtained was placed in a washing container. Thereto, diluted hydrochloric acid was added under stirring. Stirring was conducted for 2 hours at pH of 1.5, a compound of calcium and a phosphoric acid containing $Ca_3(PO_4)_2$ was dissolved in the dispersion, and the resulting mixture was filtered to conduct solid liquid separation. As a result, polymer fine particles were obtained. The polymer fine particles were again placed in water to again form a dispersion. Then the dispersion was separated into solid and liquid through a filter. This re-dispersing of the polymer fine particles in water and solid liquid separation were repeated until the compound of phosphoric acid and calcium containing $Ca_3(PO_4)_2$ was satisfactorily removed. Then polymer fine particles after final solid liquid separation were thoroughly dried with a drier to obtain toner particles.

In a Henschel mixer, (produced by Nippon Coke & Engineering Co., Ltd.), 100 parts of the toner particles obtained, 1.0 parts of hydrophobic silica fine powder surface-treated with hexamethyldisilazane (number-average particle size of primary particles: 7 nm), 0.15 parts of rutile-type titanium oxide fine powder (number-average particle size of primary particles: 45 nm), and 0.5 parts of a rutile-type titanium oxide fine powder (number-average particle size of primary particles: 200 nm) were dry-mixed for 5 minutes. As a result, a toner (TNR1) was obtained.

Toner Production Example 2

Toners (TNR2) to (TNR79) of the present invention were obtained as in Toner Production Example 1 except that the magenta pigment dispersion (DIS1) in Toner Production Example 1 was changed to magenta pigment dispersions (DIS2) to (DIS79).

Toner Production Example 3

Toners (TNR80) to (TNR82) of the present invention were obtained as in Toner Production Example 1 except that the magenta pigment dispersion (DIS1) in Toner Production Example 1 was changed to magenta pigment dispersions (DIS80) to (DIS82).

Comparative Example 2

A toner used as the standard for evaluation and a toner for comparison for the toners of the present invention produced in Example 4 were produced by the following method.

Production Example 1 of Toner for Standard

A toner (TNR83) for standard was obtained as in Toner Production Example 1 except that the magenta pigment dispersion (DIS1) in Toner Production Example 1 was changed to magenta pigment dispersion (DIS83).

Production Example 2 of Toner for Standard

Toners (TNR84) to (TNR86) for standard were obtained as in Toner Production Example 1 except that the magenta pigment dispersion (DIS1) in Toner Production Example 1 was changed to magenta pigment dispersions (DIS84) to (DIS86).

Production Example 1 of Toner for Comparison

A toner (TNR87) for comparison was obtained as in Toner Production Example 1 except that the magenta pigment dispersion (DIS1) in Toner Production Example 1 was changed to magenta pigment dispersion (DIS87).

Production Example 2 of Toner for Comparison

Toners (TNR88) to (TNR90) for comparison were obtained as in Toner Production Example 1 except that the magenta pigment dispersion (DIS1) in Toner Production Example 1 was changed to magenta pigment dispersions (DIS88) to (DIS90).

Example 5

A toner of the present invention was produced by the following suspension granulation method.

Toner Production Example 4

Mixed were 180 parts of ethyl acetate, 30 parts of Pigment Red 122, 3.0 parts of the compound (101) having a azo skeleton structure, and 130 parts of glass beads (1 mm in diameter). The resulting mixture was dispersed in an attritor (produced by Nippon Coke & Engineering Co., Ltd.) for 3 hours and filtered through a mesh to obtain a magenta pigment dispersion.

The composition below was dispersed in a ball mill for 24 hours to obtain 200 parts of a toner composition mixed liquid.

| | |
|---|---|
| magenta pigment dispersion | 96.0 parts |
| polar resin [saturated polyester resin (a polycondensate of propylene oxide-modified bisphenol A and phthalic acid, Tg = 75.9° C., Mw = 11000, Mn = 4200, acid value: 11)] | 85.0 parts |
| hydrocarbon wax (Fischer-Tropsch wax, maximum endothermic peak in DSC: = 80° C., Mw = 750) | 9.0 parts |
| aluminum salicylate compound [BONTRON E-108 produced by Orient Chemical Industries Co., Ltd.] | 2.0 parts |
| ethyl acetate (solvent) | 10.0 parts |

The following composition was dispersed in a ball mill for 24 hours to dissolve carboxy methyl cellulose and obtain a water-based medium

| | |
|---|---|
| calcium carbonate (coated with acrylic acid-based copolymer) | 20.0 parts |
| carboxy methyl cellulose [CELLOGEN BS-H, produced by Dai-ichi Kogyo Seiyaku Co., Ltd.] | 0.5 parts |
| ion exchange water | 99.5 parts |

In a high speed stirrer T.K. Homomixer (produced by PRIMIX Corporation), 1200 parts of the water-based medium was placed and 1000 parts of the toner composition mixed liquid was added thereto while stirring the content with a rotating blade at a peripheral velocity of 20 m/sec. Stirring was conducted for 1 minute while retaining 25° C. so as to obtain a suspension.

While stirring 2200 parts of the suspension with FULLZONE impeller (produced by KOBELCO ECO-SOLUTIONS Co., Ltd.) at a peripheral velocity of 45 m/min, the liquid temperature was retained constant at 40° C. and the gas phase on the suspension surface was forcibly suctioned through a blower to start removing the solvent. Fifteen minutes after start of solvent removal, 75 parts of ammonia water diluted to 1% as an ionic substance was added; 1 hour after start of solvent removal, 25 parts of the ammonia water was added; 2 hours after start of solvent removal, 25 parts of the ammonia water was added; and lastly 3 hours after start of solvent removal, 25 parts of the ammonia water was added so that the total amount of the ammonia water added was 150 parts. The liquid temperature was retained at 40° C. for 17 hours after start of the solvent removal. As a result, a toner dispersion obtained by removing the solvent (ethyl acetate) from the suspended particles was obtained.

To 300 parts of the toner dispersion obtained by the solvent removal step, 80 parts of 10 mol/l hydrochloric acid was added. The resulting mixture was neutralized with a 0.1 mol/l aqueous sodium hydroxide solution and washed four times with ion exchange water by suction filtration to obtain a toner cake. The toner cake was dried in a vacuum drier and passed through a 45 µm sieve to obtain toner particles. The subsequent operation was the same as Toner Production Example 1 and a toner (TNR91) was obtained.

Toner Production Example 5

Toners (TNR92) to (TNR169) of the present invention were obtained as in Toner Production Example 4 except that the compound (101) having an azo skeleton structure was changed to compounds (102) to (179).

Toner Production Example 6

Toners (TNR170) to (TNR172) of the present invention were obtained as in Toner Production Example 5 except that the magenta pigment represented by formula (52) was changed to those represented by formulae (53) to (55).

Comparative Example 3

A toner used as the standard for evaluation and a toner for comparison for the toners of the present invention produced in Example 5 were produced by the following method.
Production Example 3 of Toner for Standard
A toner (TNR173) for standard was obtained as in Toner Production Example 4 except that the compound (101) having an azo skeleton structure was not added.
Production Example 4 of Toner for Standard
Toners (TNR174) to (TNR176) for standard were obtained as in Toner Production Example 6 except that the compound (101) having an azo skeleton structure was not added.
Production Example 3 of Toner for Comparison
A toner (TNR177) for comparison was obtained as in Toner Production Example 4 except that the compound (101) having an azo skeleton structure was changed to DA-703-50 (product of produced by Kusumoto Chemicals Ltd.) described in Japanese Patent Laid-Open No. 2006-30760.
Production Example 4 of Toner for Comparison
Toners (TNR178) to (TNR180) for comparison were obtained as in Production Example 3 of toner for comparison except that the magenta pigment represented by formula (52) in Production Example 3 of toner for comparison was changed to those represented by formulae (53) to (55).

Example 6

Toners obtained in the present invention were evaluated by the following method.

The toners (TNR1) to (TNR90) and (TNR91) to (TNR180) were used to output image samples and the image properties described below were compared and evaluated. In comparing the image properties, a modified model of LBP-5300 (produced by Canon Kabushiki Kaisha) was used as an image forming apparatus (hereinafter referred to as LBP) to feed paper. The apparatus was modified by changing a development blade in a process cartridge (referred to as CRG hereinafter) to a SUS blade having a thickness of 8 µm. The apparatus was also modified to apply a blade bias of −200 V relative to development bias applied to a development roller, which served as a toner bearing member.
Measurement of Weight-Average Particle Size D4 and Number-Average Particle Size D1 of Toner Coulter Multisizer (produced by Beckman Coulter Inc.) was used and an interface (produced by Nikkaki Bios Co., Ltd.) for outputting number distribution and volume distribution and a personal computer were connected thereto. The electrolyte used was a 1% aqueous NaCl solution using sodium chloride. For example, ISOTON R-II (produced by Beckman Coulter Inc.) can be used. A specific measurement procedure is described in catalog (February 2002 version) of Coulter Multisizer published by Coulter and operation manuals for analyzers. For example, the procedure may be as follows.

To 100 to 150 ml of the aqueous electrolyte solution, 2 to 20 mg of a measurement sample was added. The electrolyte in which the sample was suspended was dispersed with an ultrasonic disperser for about 1 to 3 minutes and the volume and number of the toner particles 2.0 µm or more and 64.0 µm or less in size were measured by using 100 µm apertures of Coulter Multisizer. The obtained data was distributed into 16 channels to determine the weight-average particle size D4, the number-average particle size D1, and the D4/D1 ratio.
Evaluation of Coloring Power of Toner In a normal temperature, normal humidity (N/N (23.5° C., 60% RH)) environment, a solid image with a toner amount of 0.5 mg/cm$^2$ on a transfer paper (75 g/m$^2$ paper) was formed. A reflection densitometer Spectrolino (produced by Gretag-Macbeth) was used to measure the density of the solid image. The coloring power of the toner was evaluated on the basis of the solid image density improvement rate.

The solid image density improvement rate for the toners (TNR1) to (TNR82) was determined on the basis of the solid image density for the toners (TNR83) to (TNR86) for evaluation.

The solid image density improvement rate for the toners (TNR90) to (TNR172) was determined on the basis of the solid image density for the toners (TNR173) to (TNR176) for evaluation.

The evaluation standard of the solid image density improvement rate is as follows.
A: The solid image density improvement rate was 20% or more.
B: The solid image density improvement rate was 10% or more but less than 20%.
C: The solid image density improvement rate was 5% or more but less than 10%.
D: The solid image density improvement rate was less than 5%.

The coloring power was considered satisfactory as long as the solid image density improvement rate was 5% or more.

The results of coloring power evaluation of the toners prepared by suspension polymerization are shown in Tables 4-1 and 4-2 and the results of coloring power evaluation of the toners prepared by suspension granulation are shown in Tables 5-1 and 5-2.
Evaluation of Toner Fogging In a normal temperature, normal humidity (N/N (23.5° C., 60% RH)) environment and in a high-temperature, high-humidity (H/H (30° C., 80% RH)) environment, an image output test of making 10,000 printouts of an image having a printing ratio of 2% was conducted on transfer paper (75 g/m$^2$ paper). At the end of the test, an image having a white background portion was output. The whiteness (reflectance Ds (%)) of the white background portion of the printout image was measured with REFLECTMETER MODEL TC-6DS (produced by Nippon Denshoku Industries Co., Ltd.) and the difference between this whiteness and the whiteness (average reflectance Dr (%)) of the transfer paper was determined [=Dr (%)−Ds (%)] and assumed to be the fogging density (%). The fogging at the end of the test was evaluated.
A: Less than 1.0%
B: 1.0% or more but less than 2.0%
C: 2.0% or more but less than 3.0%
D: 3.0% or more The fogging density was evaluated as practically acceptable as long as the fogging density was less than 3%.

The evaluation results concerning fogging of the toners produced by suspension polymerization are shown in Tables 4-1 and 4-2 and the evaluation results concerning fogging of the toners produced by suspension granulation are shown in Tables 5-1 and 5-2.

Evaluation of Toner Transfer Efficiency

In a high-temperature, high-humidity (H/H (30° C., 80% RH)) environment, an image output test of making 10,000 printouts of an image having a printing ratio of 2% was conducted on transfer paper (75 g/m² paper). At the end of the test, the transfer efficiency was confirmed. A solid image having a toner amount of 0.65 mg/cm² was developed on a drum and then transferred to a sheet of transfer paper (75 g/m² paper) to obtain an unfixed image. The transfer efficiency was determined on the basis of the difference in mass between the amount of the toner on the drum and the amount of the toner on the transfer paper. The transfer efficiency was assumed to be 100% when all of the toner on the drum was transferred onto the transfer paper. The evaluation standard for the transfer efficiency was as follows.

A: The transfer efficiency was 95% or more.
B: The transfer efficiency was 90% or more but less than 95%.
C: The transfer efficiency was 80% or more but less than 90%.
D: The transfer efficiency was less than 80%.

The transfer efficiency was considered satisfactory if the transfer efficiency was 80% or more.

The evaluation results of transfer efficiency of the toners produced by suspension polymerization are shown in Tables 4-1 and 4-2 and the evaluation results of transfer efficiency of the toners produced by suspension granulation are shown in Tables 5-1 and 5-2.

Comparative Example 5

The coloring power, fogging, and transfer efficiency of the toners (TNR87) to (TNR90), (TNR177) to (TNR180) for comparison were evaluated as in Example 6.

The solid image density improvement rate of the toners (TNR87) to (TNR90) for comparison was evaluated on the basis of the solid image density of the toners (TNR83) to (TNR86) for standard.

The solid image density improvement rate of the toners (TNR177) to (TNR180) for comparison was evaluated on the basis of the solid image density of the toners (TNR173) to (TNR176) for standard.

The evaluation results for the toners for comparison prepared by suspension polymerization are shown in Tables 4-1 and 4-2 and the evaluation results for the toners for comparison prepared by suspension granulation are shown in Tables 5-1 and 5-2.

TABLE 4-1

| Toner | Pigment dispersion | Compound | Magenta pigment | D4 [μm] | D4/D1 | Coloring power | Fogging [N/N] | Fogging [H/H] | Transfer property |
|---|---|---|---|---|---|---|---|---|---|
| TNR1 | DIS1 | 101 | Formula(52) | 6.30 | 1.17 | A | A | A | A |
| TNR2 | DIS2 | 102 | Formula(52) | 6.27 | 1.13 | A | A | A | A |
| TNR3 | DIS3 | 103 | Formula(52) | 6.19 | 1.19 | A | A | A | A |
| TNR4 | DIS4 | 104 | Formula(52) | 6.27 | 1.16 | A | A | A | A |
| TNR5 | DIS5 | 105 | Formula(52) | 6.15 | 1.20 | A | A | A | A |
| TNR6 | DIS6 | 106 | Formula(52) | 6.32 | 1.23 | A | A | A | A |
| TNR7 | DIS7 | 107 | Formula(52) | 6.28 | 1.19 | A | A | A | A |
| TNR8 | DIS8 | 108 | Formula(52) | 6.42 | 1.22 | A | A | A | A |
| TNR9 | DIS9 | 109 | Formula(52) | 6.29 | 1.22 | A | A | A | A |
| TNR10 | DIS10 | 110 | Formula(52) | 6.32 | 1.18 | A | A | A | A |
| TNR11 | DIS11 | 111 | Formula(52) | 6.23 | 1.21 | A | A | A | A |
| TNR12 | DIS12 | 112 | Formula(52) | 6.21 | 1.20 | A | A | A | A |
| TNR13 | DIS13 | 113 | Formula(52) | 6.09 | 1.18 | A | A | A | A |
| TNR14 | DIS14 | 114 | Formula(52) | 6.14 | 1.20 | A | A | A | A |
| TNR15 | DIS15 | 115 | Formula(52) | 6.36 | 1.18 | A | A | A | A |
| TNR16 | DIS16 | 116 | Formula(52) | 6.11 | 1.22 | A | A | A | A |
| TNR17 | DIS17 | 117 | Formula(52) | 6.35 | 1.20 | A | A | A | A |
| TNR18 | DIS18 | 118 | Formula(52) | 6.28 | 1.17 | A | A | A | A |
| TNR19 | DIS19 | 119 | Formula(52) | 6.06 | 1.15 | A | A | A | A |
| TNR20 | DIS20 | 120 | Formula(52) | 6.13 | 1.15 | A | A | A | A |
| TNR21 | DIS21 | 121 | Formula(52) | 6.25 | 1.18 | A | A | A | A |
| TNR22 | DIS22 | 122 | Formula(52) | 6.04 | 1.20 | A | A | A | A |
| TNR23 | DIS23 | 123 | Formula(52) | 6.12 | 1.16 | A | A | A | A |
| TNR24 | DIS24 | 124 | Formula(52) | 6.19 | 1.18 | A | A | A | A |
| TNR25 | DIS25 | 125 | Formula(52) | 6.13 | 1.15 | A | A | A | A |
| TNR26 | DIS26 | 126 | Formula(52) | 6.08 | 1.19 | A | A | A | A |
| TNR27 | DIS27 | 127 | Formula(52) | 6.05 | 1.14 | A | A | A | A |
| TNR28 | DIS28 | 128 | Formula(52) | 6.38 | 1.21 | A | A | A | A |
| TNR29 | DIS29 | 129 | Formula(52) | 6.10 | 1.23 | A | A | A | A |
| TNR30 | DIS30 | 130 | Formula(52) | 6.44 | 1.28 | B | B | B | B |
| TNR31 | DIS31 | 131 | Formula(52) | 6.24 | 1.12 | A | A | A | A |
| TNR32 | DIS32 | 132 | Formula(52) | 6.09 | 1.15 | A | A | A | A |
| TNR33 | DIS33 | 133 | Formula(52) | 6.36 | 1.21 | A | A | A | A |
| TNR34 | DIS34 | 134 | Formula(52) | 6.32 | 1.15 | A | A | A | A |
| TNR35 | DIS35 | 135 | Formula(52) | 6.16 | 1.18 | A | A | A | A |
| TNR36 | DIS36 | 136 | Formula(52) | 6.09 | 1.23 | A | A | A | A |

TABLE 4-1-continued

| Toner | Pigment dispersion | Compound | Magenta pigment | D4 [μm] | D4/D1 | Coloring power | Fogging [N/N] | Fogging [H/H] | Transfer property |
|---|---|---|---|---|---|---|---|---|---|
| TNR37 | DIS37 | 137 | Formula(52) | 6.17 | 1.20 | A | A | A | A |
| TNR38 | DIS38 | 138 | Formula(52) | 6.26 | 1.18 | A | A | A | A |
| TNR39 | DIS39 | 139 | Formula(52) | 6.16 | 1.12 | A | A | A | A |
| TNR40 | DIS40 | 140 | Formula(52) | 6.27 | 1.20 | A | A | A | A |
| TNR41 | DIS41 | 141 | Formula(52) | 6.42 | 1.26 | B | B | B | B |
| TNR42 | DIS42 | 142 | Formula(52) | 6.39 | 1.29 | B | B | B | B |
| TNR43 | DIS43 | 143 | Formula(52) | 6.62 | 1.24 | B | B | B | B |
| TNR44 | DIS44 | 144 | Formula(52) | 6.36 | 1.25 | B | B | B | B |
| TNR45 | DIS45 | 145 | Formula(52) | 6.26 | 1.21 | A | A | A | A |

TABLE 4-2

| Toner | Pigment dispersion | Compound | Magenta pigment | D4 [μm] | D4/D1 | Coloring power | Fogging [N/N] | Fogging [H/H] | Transfer property |
|---|---|---|---|---|---|---|---|---|---|
| TNR46 | DIS46 | 146 | Formula(52) | 6.29 | 1.19 | A | A | A | A |
| TNR47 | DIS47 | 147 | Formula(52) | 6.33 | 1.17 | B | B | B | B |
| TNR48 | DIS48 | 148 | Formula(52) | 6.19 | 1.18 | B | B | B | B |
| TNR49 | DIS49 | 149 | Formula(52) | 6.27 | 1.20 | A | A | A | A |
| TNR50 | DIS50 | 150 | Formula(52) | 6.22 | 1.15 | A | A | A | A |
| TNR51 | DIS51 | 151 | Formula(52) | 6.35 | 1.18 | A | A | A | A |
| TNR52 | DIS52 | 152 | Formula(52) | 6.22 | 1.32 | B | B | B | B |
| TNR53 | DIS53 | 153 | Formula(52) | 6.38 | 1.25 | B | B | B | B |
| TNR54 | DIS54 | 154 | Formula(52) | 6.20 | 1.23 | B | B | B | B |
| TNR55 | DIS55 | 155 | Formula(52) | 6.48 | 1.30 | B | B | B | B |
| TNR56 | DIS56 | 156 | Formula(52) | 6.27 | 1.29 | B | B | B | B |
| TNR57 | DIS57 | 157 | Formula(52) | 6.17 | 1.18 | A | A | A | A |
| TNR58 | DIS58 | 158 | Formula(52) | 6.08 | 1.21 | A | A | A | A |
| TNR59 | DIS59 | 159 | Formula(52) | 6.21 | 1.16 | A | A | A | A |
| TNR60 | DIS60 | 160 | Formula(52) | 6.47 | 1.23 | A | A | A | A |
| TNR61 | DIS61 | 161 | Formula(52) | 6.48 | 1.30 | B | B | B | B |
| TNR62 | DIS62 | 162 | Formula(52) | 6.21 | 1.17 | A | A | A | A |
| TNR63 | DIS63 | 163 | Formula(52) | 6.39 | 1.31 | B | B | B | B |
| TNR64 | DIS64 | 164 | Formula(52) | 6.18 | 1.15 | A | A | A | A |
| TNR65 | DIS65 | 165 | Formula(52) | 6.28 | 1.19 | A | A | A | A |
| TNR66 | DIS66 | 166 | Formula(52) | 6.26 | 1.15 | A | A | A | A |
| TNR67 | DIS67 | 167 | Formula(52) | 6.17 | 1.24 | A | A | A | A |
| TNR68 | DIS68 | 168 | Formula(52) | 6.30 | 1.18 | A | A | A | A |
| TNR69 | DIS69 | 169 | Formula(52) | 6.26 | 1.22 | A | A | A | A |
| TNR70 | DIS70 | 170 | Formula(52) | 6.31 | 1.26 | A | A | A | A |
| TNR71 | DIS71 | 171 | Formula(52) | 6.27 | 1.19 | A | A | A | A |
| TNR72 | DIS72 | 172 | Formula(52) | 6.13 | 1.21 | A | A | A | A |
| TNR73 | DIS73 | 173 | Formula(52) | 6.30 | 1.25 | A | A | A | A |
| TNR74 | DIS74 | 174 | Formula(52) | 6.40 | 1.29 | B | B | B | B |
| TNR75 | DIS75 | 175 | Formula(52) | 6.37 | 1.23 | B | B | B | B |
| TNR76 | DIS76 | 176 | Formula(52) | 6.44 | 1.25 | B | B | B | B |
| TNR77 | DIS77 | 177 | Formula(52) | 6.11 | 1.28 | B | B | B | B |
| TNR78 | DIS78 | 178 | Formula(52) | 6.30 | 1.22 | B | B | B | B |
| TNR79 | DIS79 | 179 | Formula(52) | 6.14 | 1.28 | B | B | B | B |
| TNR80 | DIS80 | 101 | Formula(53) | 6.06 | 1.18 | A | A | A | A |
| TNR81 | DIS81 | 101 | Formula(54) | 6.25 | 1.22 | A | A | A | A |
| TNR82 | DIS82 | 101 | Formula(55) | 6.11 | 1.18 | A | A | A | A |
| TNR83 | DIS83 | None | Formula(52) | 6.82 | 1.32 | D | D | D | D |
| TNR84 | DIS84 | None | Formula(53) | 6.51 | 1.25 | D | D | D | D |
| TNR85 | DIS85 | None | Formula(54) | 6.68 | 1.29 | D | D | D | D |
| TNR86 | DIS86 | None | Formula(55) | 6.60 | 1.23 | D | D | D | D |
| TNR87 | DIS87 | Comparative compound 1 | Formula(52) | 7.25 | 1.38 | D | D | D | D |
| TNR88 | DIS88 | Comparative compound 1 | Formula(53) | 6.92 | 1.33 | D | D | D | D |
| TNR89 | DIS89 | Comparative compound 2 | Formula(54) | 7.01 | 1.31 | D | D | D | D |
| TNR90 | DIS90 | Comparative compound 3 | Formula(55) | 6.73 | 1.34 | D | D | D | D |

TABLE 5-1

| Toner | Compound | Magenta pigment | D4 [μm] | D4/D1 | Coloring power | Fogging [N/N] | Fogging [H/H] | Transfer property |
|---|---|---|---|---|---|---|---|---|
| TNR91 | 101 | Formula(52) | 6.19 | 1.21 | A | A | A | A |
| TNR92 | 102 | Formula(52) | 6.34 | 1.24 | A | A | A | A |
| TNR93 | 103 | Formula(52) | 6.30 | 1.17 | A | A | A | A |
| TNR94 | 104 | Formula(52) | 6.27 | 1.20 | A | A | A | A |
| TNR95 | 105 | Formula(52) | 6.13 | 1.22 | A | A | A | A |
| TNR96 | 106 | Formula(52) | 6.31 | 1.21 | A | A | A | A |
| TNR97 | 107 | Formula(52) | 6.39 | 1.19 | A | A | A | A |
| TNR98 | 108 | Formula(52) | 6.32 | 1.20 | A | A | A | A |
| TNR99 | 109 | Formula(52) | 6.38 | 1.21 | A | A | A | A |
| TNR100 | 110 | Formula(52) | 6.22 | 1.19 | A | A | A | A |
| TNR101 | 111 | Formula(52) | 6.27 | 1.20 | A | A | A | A |
| TNR102 | 112 | Formula(52) | 6.20 | 1.19 | A | A | A | A |
| TNR103 | 113 | Formula(52) | 6.13 | 1.18 | A | A | A | A |
| TNR104 | 114 | Formula(52) | 6.08 | 1.22 | A | A | A | A |
| TNR105 | 115 | Formula(52) | 6.19 | 1.24 | A | A | A | A |
| TNR106 | 116 | Formula(52) | 6.16 | 1.18 | A | A | A | A |
| TNR107 | 117 | Formula(52) | 6.25 | 1.17 | A | A | A | A |
| TNR108 | 118 | Formula(52) | 6.22 | 1.24 | A | A | A | A |
| TNR109 | 119 | Formula(52) | 6.14 | 1.21 | A | A | A | A |
| TNR110 | 120 | Formula(52) | 6.33 | 1.18 | A | A | A | A |
| TNR111 | 121 | Formula(52) | 6.21 | 1.19 | A | A | A | A |
| TNR112 | 122 | Formula(52) | 6.11 | 1.17 | A | A | A | A |
| TNR113 | 123 | Formula(52) | 6.13 | 1.15 | A | A | A | A |
| TNR114 | 124 | Formula(52) | 6.08 | 1.16 | A | A | A | A |
| TNR115 | 125 | Formula(52) | 6.04 | 1.19 | A | A | A | A |
| TNR116 | 126 | Formula(52) | 6.02 | 1.17 | A | A | A | A |
| TNR117 | 127 | Formula(52) | 6.08 | 1.15 | A | A | A | A |
| TNR118 | 128 | Formula(52) | 6.36 | 1.24 | A | A | A | A |
| TNR119 | 129 | Formula(52) | 6.19 | 1.22 | A | A | A | A |
| TNR120 | 130 | Formula(52) | 6.24 | 1.32 | B | B | B | B |
| TNR121 | 131 | Formula(52) | 6.33 | 1.27 | A | A | A | A |
| TNR122 | 132 | Formula(52) | 6.07 | 1.21 | A | A | A | A |
| TNR123 | 133 | Formula(52) | 6.30 | 1.20 | A | A | A | A |
| TNR124 | 134 | Formula(52) | 6.24 | 1.24 | A | A | A | A |
| TNR125 | 135 | Formula(52) | 6.19 | 1.26 | A | A | A | A |
| TNR126 | 136 | Formula(52) | 6.26 | 1.19 | A | A | A | A |
| TNR127 | 137 | Formula(52) | 6.28 | 1.26 | A | A | A | A |
| TNR128 | 138 | Formula(52) | 6.11 | 1.19 | A | A | A | A |
| TNR129 | 139 | Formula(52) | 6.23 | 1.23 | A | A | A | A |
| TNR130 | 140 | Formula(52) | 6.30 | 1.24 | A | A | A | A |
| TNR131 | 141 | Formula(52) | 6.25 | 1.29 | B | B | B | B |
| TNR132 | 142 | Formula(52) | 6.49 | 1.30 | B | B | B | B |
| TNR133 | 143 | Formula(52) | 6.52 | 1.31 | B | B | B | B |
| TNR134 | 144 | Formula(52) | 6.32 | 1.33 | B | B | B | B |
| TNR135 | 145 | Formula(52) | 6.33 | 1.21 | A | A | A | A |

TABLE 5-2

| Toner | Compound | Magenta pigment | D4 [μm] | D4/D1 | Coloring power | Fogging [N/N] | Fogging [H/H] | Transfer property |
|---|---|---|---|---|---|---|---|---|
| TNR136 | 146 | Formula(52) | 6.35 | 1.21 | A | A | A | A |
| TNR137 | 147 | Formula(52) | 6.47 | 1.28 | B | B | B | B |
| TNR138 | 148 | Formula(52) | 6.39 | 1.30 | B | B | B | B |
| TNR139 | 149 | Formula(52) | 6.09 | 1.18 | A | A | A | A |
| TNR140 | 150 | Formula(52) | 6.39 | 1.22 | A | A | A | A |
| TNR141 | 151 | Formula(52) | 6.31 | 1.24 | A | A | A | A |
| TNR142 | 152 | Formula(52) | 6.13 | 1.33 | B | B | B | B |
| TNR143 | 153 | Formula(52) | 6.27 | 1.30 | B | B | B | B |
| TNR144 | 154 | Formula(52) | 6.22 | 1.28 | B | B | B | B |
| TNR145 | 155 | Formula(52) | 6.38 | 1.27 | B | B | B | B |
| TNR146 | 156 | Formula(52) | 6.43 | 1.30 | B | B | B | B |
| TNR147 | 157 | Formula(52) | 6.32 | 1.16 | A | A | A | A |
| TNR148 | 158 | Formula(52) | 6.14 | 1.21 | A | A | A | A |
| TNR149 | 159 | Formula(52) | 6.23 | 1.28 | A | A | A | A |
| TNR150 | 160 | Formula(52) | 6.36 | 1.19 | A | A | A | A |
| TNR151 | 161 | Formula(52) | 6.31 | 1.32 | B | B | B | B |
| TNR152 | 162 | Formula(52) | 6.30 | 1.27 | A | A | A | A |
| TNR153 | 163 | Formula(52) | 6.24 | 1.29 | B | B | B | B |
| TNR154 | 164 | Formula(52) | 6.26 | 1.26 | A | A | A | A |

TABLE 5-2-continued

| Toner | Compound | Magenta pigment | D4 [μm] | D4/D1 | Coloring power | Fogging [N/N] | Fogging [H/H] | Transfer property |
|---|---|---|---|---|---|---|---|---|
| TNR155 | 165 | Formula(52) | 6.25 | 1.25 | A | A | A | A |
| TNR156 | 166 | Formula(52) | 6.32 | 1.21 | A | A | A | A |
| TNR157 | 167 | Formula(52) | 6.11 | 1.25 | A | A | A | A |
| TNR158 | 168 | Formula(52) | 6.32 | 1.26 | A | A | A | A |
| TNR159 | 169 | Formula(52) | 6.32 | 1.28 | A | A | A | A |
| TNR160 | 170 | Formula(52) | 6.14 | 1.19 | A | A | A | A |
| TNR161 | 171 | Formula(52) | 6.22 | 1.26 | A | A | A | A |
| TNR162 | 172 | Formula(52) | 6.17 | 1.22 | A | A | A | A |
| TNR163 | 173 | Formula(52) | 6.14 | 1.19 | A | A | A | A |
| TNR164 | 174 | Formula(52) | 6.30 | 1.25 | B | B | B | B |
| TNR165 | 175 | Formula(52) | 6.29 | 1.31 | B | B | B | B |
| TNR166 | 176 | Formula(52) | 6.41 | 1.30 | B | B | B | B |
| TNR167 | 177 | Formula(52) | 6.37 | 1.32 | B | B | B | B |
| TNR168 | 178 | Formula(52) | 6.44 | 1.31 | B | B | B | B |
| TNR169 | 179 | Formula(52) | 6.58 | 1.32 | B | B | B | B |
| TNR170 | 101 | Formula(53) | 6.12 | 1.23 | A | A | A | A |
| TNR171 | 101 | Formula(54) | 6.28 | 1.29 | A | A | A | A |
| TNR172 | 101 | Formula(55) | 6.11 | 1.18 | A | A | A | A |
| TNR173 | None | Formula(52) | 6.69 | 1.35 | D | D | D | D |
| TNR174 | None | Formula(53) | 6.53 | 1.33 | D | D | D | D |
| TNR175 | None | Formula(54) | 6.48 | 1.30 | D | D | D | D |
| TNR176 | None | Formula(55) | 6.42 | 1.27 | D | D | D | D |
| TNR177 | Comparative compound 1 | Formula(52) | 6.38 | 1.29 | D | D | D | D |
| TNR178 | Comparative compound 1 | Formula(53) | 6.40 | 1.27 | D | D | D | D |
| TNR179 | Comparative compound 1 | Formula(54) | 6.59 | 1.34 | D | D | D | D |
| TNR180 | Comparative compound 1 | Formula(55) | 6.61 | 1.30 | D | D | D | D |

Table 3 clearly shows that the dispersibility of the magenta pigment into the binder resin is improved by using a compound having an azo skeleton structure.

Tables 4-1 and 4-2 clearly show that use of a compound having an azo skeleton structure improves dispersibility of the magenta pigment into the binder resin and thus a magenta toner with satisfactory coloring power is provided. Use of a compound having an azo skeleton structure also suppresses fogging and a magenta toner that has high transfer efficiency is provided. Tables 5-1 and 5-2 clearly show that even when suspension granulation is employed, the dispersibility of the magenta pigment into the binder resin is improved, fogging is suppressed, and a toner having satisfactory coloring power as well as high transfer efficiency is provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-043073 filed Feb. 29, 2012, which is hereby incorporated by reference herein in its entirety.

What is claimed is:

1. A magenta toner comprising toner particles, each of which contains
a binder resin;
a compound and
a magenta pigment
the compound has a structure, a polymer portion of which has a monomer unit represented by formula (2) and is bound to a structure represented by formula (1);

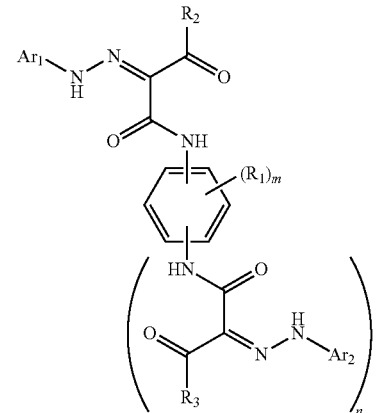

FORMULA (1)

where, in formula (1), at least one of $R_2$, $R_3$, $Ar_1$, and $Ar_2$ is bound to the polymer portion directly or through a linking group, wherein each $R_1$ independently represents a hydrogen atom, a halogen atom, an alkyl group, an alkoxy group, a trifluoromethyl group, a cyano group, or a hydroxyl group;

$R_2$ and $R_3$ not bound to the polymer portion independently represent a monovalent group selected from the group consisting of an alkyl group, a phenyl group, an $OR_4$ group, and an $NR_5R_6$ group; $R_4$ to $R_6$ independently represent a hydrogen atom, an alkyl group, a phenyl group, or an aralkyl group;

$Ar_1$ and $Ar_2$ not bound to the polymer portion independently represent an aryl group;

wherein
any one of $R_2$ and $R_3$ bound to the polymer portion independently represents a divalent group, a hydrogen atom of which is removed from the corresponding monovalent group of any one of $R_2$ and $R_3$;
any one of $Ar_1$ and $Ar_2$ bound to the polymer portion independently represents a divalent group, a hydrogen atom of which is removed from the corresponding aryl group of any one of $Ar_1$ and $Ar_2$;
m represents an integer of 3 or 4;
n represents an integer of 1 or 2; and
n+m=5,

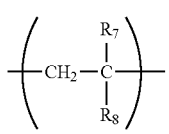

FORMULA (2)

where, in formula (2),
$R_7$ represents a hydrogen atom or an alkyl group; and
$R_8$ represents a phenyl group, a carboxyl group, a carboxylic acid ester group, or a carboxylic acid amide group.

2. The magenta toner according to claim 1, wherein the structure represented by formula (1) is a structure represented by formula (3) below

FORMULA (3)

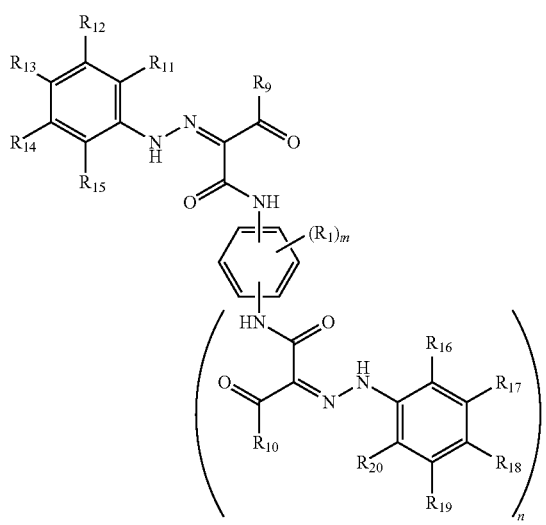

where, in formula (3),
each $R_1$ independently represents a hydrogen atom, a halogen atom, an alkyl group, an alkoxy group, a trifluoromethyl group, a cyano group, or a hydroxyl group;
$R_9$ and $R_{10}$ independently represent an alkyl group, a phenyl group, an $OR_4$ group, or an $NR_5R_6$ group; $R_4$ to $R_6$ each independently represent a hydrogen atom, an alkyl group, a phenyl group, or an aralkyl group;
$R_{11}$ to $R_{20}$ independently represent a linking group or a monovalent group selected from the group consisting of a hydrogen atom, a $COOR_{21}$ group, a $CONR_{22}R_{23}$ group, a $NHCOR_{24}$ group, and an $OR_{25}$ group; $R_{21}$ to $R_{25}$ each independently represent a hydrogen atom, an alkyl group, an aryl group, or an aralkyl group;
wherein at least one of $R_{11}$ to $R_{20}$ is the linking group that binds to the polymer portion;
m represents an integer of 3 or 4;
n represents an integer of 1 or 2; and
n+m=5.

3. The magenta toner according to claim 1, wherein the structure represented by formula (1) is a structure represented by formula (4) below

FORMULA (4)

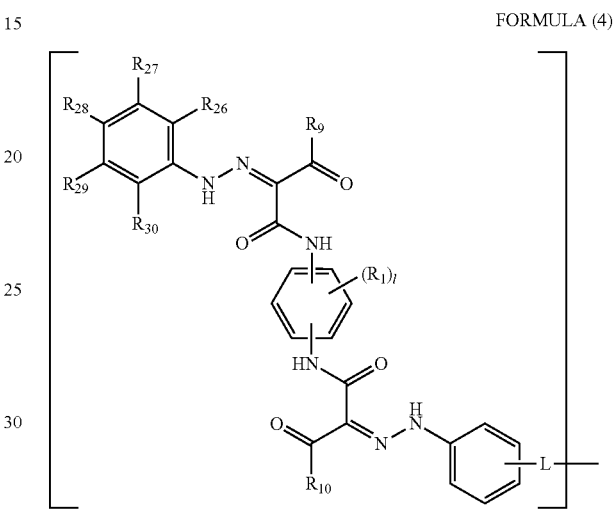

where, in formula (4),
each $R_1$ independently represents a hydrogen atom, a halogen atom, an alkyl group, an alkoxy group, a trifluoromethyl group, a cyano group, or a hydroxyl group; $R_9$ and $R_{10}$ each independently represent an alkyl group, a phenyl group, an $OR_4$ group, or an $NR_5R_6$ group; $R_4$ to $R_6$ independently represent a hydrogen atom, an alkyl group, a phenyl group, or an aralkyl group;

$R_{26}$ to $R_{30}$ independently represent a hydrogen atom, a $COOR_{21}$ group, a $CONR_{22}R_{23}$ group, a $NHCOR_{24}$ group, or an $OR_{25}$ group; $R_{21}$ to $R_{25}$ independently represent a hydrogen atom, an alkyl group, an aryl group, or an aralkyl group;

l represents 4; and

L represents a divalent linking group that binds to the polymer portion.

4. The magenta toner according to claim 3, wherein the structure represented by formula (1) is a structure represented by formula (4) where at least one of $R_{26}$ to $R_{30}$ in formula (4) represents a $COOR_{21}$ group or a $CONR_{22}R_{23}$ group; $R_{21}$ to $R_{23}$ independently represent a hydrogen atom, an alkyl group, an aryl group, or an aralkyl group; and $R_1$ represents a hydrogen atom.

5. The magenta toner according to claim 1, wherein the structure represented by formula (1) is a structure represented by formula (6) below

FORMULA (6)

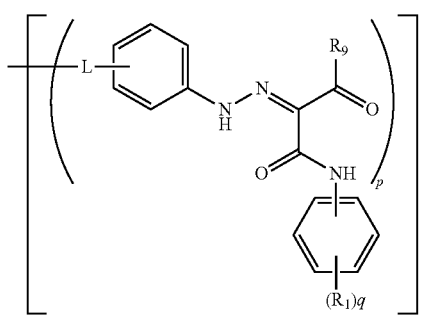

where, in formula (6),
each $R_1$ independently represents a hydrogen atom, a halogen atom, an alkyl group, an alkoxy group, a trifluoromethyl group, a cyano group, or a hydroxyl group;
each $R_9$ independently represents an alkyl group, a phenyl group, an $OR_4$ group, or an $NR_5R_6$ group; $R_4$ to $R_6$ each independently represent a hydrogen atom, an alkyl group, a phenyl group, or an aralkyl group;
p represents an integer of 2 or 3;
q represents an integer of 3 or 4;
p+q=6; and
L represents a divalent linking group that binds to the polymer portion

FORMULA (7)

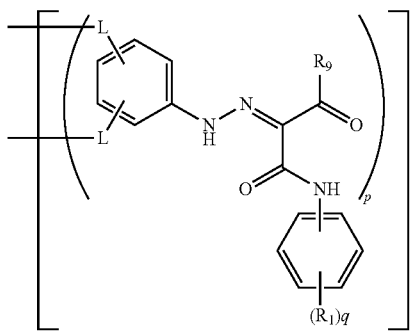

6. The magenta toner according to claim 5, wherein the structure represented by formula (1) is a structure represented by formula (6) where $R_1$ in formula (6) represents a hydrogen atom and q represents 3 or 4.

7. The magenta toner according to claim 1, wherein at least one of $R_2$, $R_3$, $Ar_1$, and $Ar_2$ in formula (1) is bound to the polymer portion through a carboxylic acid ester bond or a carboxylic acid amide bond.

8. The magenta toner according to claim 1, wherein the magenta pigment is a pigment represented by formula (8):

FORMULA (8)

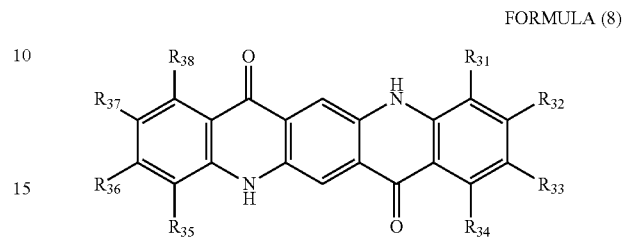

where, in formula (8), $R_{31}$ to $R_{38}$ independently represent a hydrogen atom, a chlorine atom, or a methyl group.

9. The magenta toner according to claim 1, wherein the magenta pigment is a pigment represented by formula (9):

FORMULA (9)

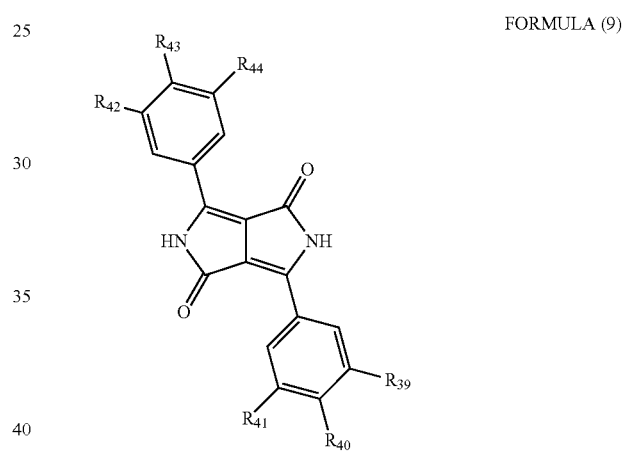

where, in formula (9), $R_{39}$ to $R_{44}$ independently represent a hydrogen atom, a chlorine atom, a tert-butyl group, a cyano group, or a phenyl group.

10. The magenta toner according to claim 1, wherein the toner particles are prepared by a suspension polymerization method or a suspension granulation method.

* * * * *